(12) United States Patent
Kataoka

(10) Patent No.: US 12,482,496 B2
(45) Date of Patent: Nov. 25, 2025

(54) NONCONTACT COMMUNICATION DEVICE, MAGNETIC TAPE DRIVE, NONCONTACT COMMUNICATION SYSTEM, METHOD FOR OPERATING NONCONTACT COMMUNICATION DEVICE, AND PROGRAM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 255 days.

(21) Appl. No.: 18/173,784

(22) Filed: Feb. 24, 2023

(65) Prior Publication Data

US 2023/0206954 A1   Jun. 29, 2023

Related U.S. Application Data

(63) Continuation of application No. PCT/JP2021/028837, filed on Aug. 3, 2021.

(30) Foreign Application Priority Data

Sep. 29, 2020  (JP) .................. 2020-163982

(51) Int. Cl.
  *G11B 23/30*  (2006.01)
  *G11B 33/10*  (2006.01)
(52) U.S. Cl.
  CPC .............. *G11B 23/30* (2013.01); *G11B 33/10* (2013.01)

(58) Field of Classification Search
  None
  See application file for complete search history.

(56) References Cited

U.S. PATENT DOCUMENTS 6,910,634 B1 *  6/2005  Inose ............... G06K 19/07783
                                                    235/486
7,457,637 B2 * 11/2008  Deguchi ............ G06K 7/10336
                                                    455/562.1

(Continued)

FOREIGN PATENT DOCUMENTS

CN    102405477 A   4/2012
JP   2002-189994 A  7/2002

(Continued)

OTHER PUBLICATIONS

English language translation of the following: Office action dated Sep. 19, 2023 from the JPO in a Japanese patent application No. 2020-163982 corresponding to the instant patent application.

(Continued)

*Primary Examiner* — Fred Tzeng
(74) *Attorney, Agent, or Firm* — SOLARIS Intellectual Property Group, PLLC

(57) ABSTRACT

A noncontact communication device includes an antenna, and a processor configured to couple a noncontact storage medium mounted in a magnetic tape cartridge and the antenna by electromagnetic induction to perform communication with the noncontact storage medium. The processor is configured to perform communication in each of a plurality of communication standards, and perform communication with the noncontact storage medium in a communication standard corresponding to the noncontact storage medium among the plurality of communication standards.

19 Claims, 37 Drawing Sheets

(56) References Cited

U.S. PATENT DOCUMENTS

| | | | |
|---|---|---|---|
| 10,944,447 B1* | 3/2021 | Kerselaers | H04B 17/336 |
| 11,107,505 B2* | 8/2021 | Nakashio | G11B 23/04 |
| 11,373,681 B2* | 6/2022 | Tochikubo | G11B 15/43 |
| 2004/0101275 A1* | 5/2004 | Abe | H04N 21/4334 |
| 2004/0120066 A1* | 6/2004 | Hashimoto | G11B 23/042 |
| 2005/0078406 A1* | 4/2005 | Topham | G11B 15/68 360/92.1 |
| 2006/0174738 A1* | 8/2006 | Hatano | B26D 7/015 83/13 |
| 2006/0196941 A1* | 9/2006 | Miura | G06K 19/07796 235/492 |
| 2006/0250252 A1 | 11/2006 | Nagai et al. | |
| 2009/0066998 A1* | 3/2009 | Kato | H04W 4/024 358/1.15 |
| 2012/0092786 A1 | 4/2012 | Takeuchi | |
| 2018/0068291 A1* | 3/2018 | Kakino | G06Q 30/04 |
| 2018/0351407 A1* | 12/2018 | Ogishima | H02J 7/0068 |
| 2019/0068248 A1* | 2/2019 | Kanno | H04B 5/48 |
| 2020/0083962 A1* | 3/2020 | Gommé | H04B 10/00 |
| 2020/0391112 A1* | 12/2020 | Yone | G06T 11/203 |
| 2021/0004218 A1* | 1/2021 | Ilincic | G06Q 20/356 |
| 2021/0012174 A1* | 1/2021 | Ono | G11B 23/087 |
| 2021/0012804 A1* | 1/2021 | Nakashio | G11B 23/30 |
| 2021/0034943 A1* | 2/2021 | Nakano | G11B 23/042 |
| 2021/0217441 A1* | 7/2021 | Nakashio | G11B 5/00813 |
| 2021/0241793 A1* | 8/2021 | Anno | G11B 23/027 |
| 2021/0375317 A1* | 12/2021 | Nakano | G06K 19/0723 |
| 2023/0153563 A1* | 5/2023 | Kataoka | H04B 1/59 235/492 |
| 2023/0161994 A1* | 5/2023 | Kataoka | G11B 5/78 235/492 |

FOREIGN PATENT DOCUMENTS

| | | |
|---|---|---|
| JP | 2002-342725 A | 11/2002 |
| JP | 2005-260521 A | 9/2005 |
| JP | 2005-341146 A | 12/2005 |
| JP | 2006-157593 A | 6/2006 |

OTHER PUBLICATIONS

International Search Report issued in International Application No. PCT/JP2021/028837 on Oct. 19, 2021.

Written Opinion of the ISA issued in International Application No. PCT/JP2021/028837 on Oct. 19, 2021.

English language translation of the following: Notice dated Aug. 23, 2025 from the SIPO in a Chinese patent application No. 202180066362.9 corresponding to the instant patent application. This office action translation is submitted now in order to supplement the understanding of the cited references which are being disclosed in the instant Information Disclosure Statement.

* cited by examiner

NONCONTACT COMMUNICATION DEVICE, MAGNETIC TAPE DRIVE, NONCONTACT COMMUNICATION SYSTEM, METHOD FOR OPERATING NONCONTACT COMMUNICATION DEVICE, AND PROGRAM

CROSS-REFERENCE TO RELATED APPLICATIONS

This application is a continuation application of International Application No. PCT/JP2021/028837, filed on Aug. 3, 2021, the disclosure of which is incorporated herein by reference in its entirety. Further, this application claims priority from Japanese Patent Application No. 2020-163982, filed on Sep. 29, 2020, the disclosure of which is incorporated herein by reference in its entirety.

BACKGROUND

1. Technical Field

A technique of the present disclosure relates to a noncontact communication device, a magnetic tape drive, a noncontact communication system, a method for operating a noncontact communication device, and a program.

2. Related Art

JP2002-189994A discloses a communication device that performs data transmission and reception with respect to a noncontact semiconductor memory having a storage unit attached to a recording medium housing along with a recording medium and configured to store information regarding the recording medium, and a communication unit configured to execute data transfer to the storage unit in a noncontact manner. The communication device described in JP2002-189994A is a communication device for a noncontact semiconductor memory comprising communication processing means having a plurality of communication processing units, each communication processing unit being configured to execute data transmission processing and data reception processing with respect to the noncontact semiconductor memory in a different predetermined communication method, switching means for switching the communication processing unit to be operated among the communication processing units of the communication processing means, and a plurality of antenna means provided corresponding to the communication processing units of the communication processing means.

SUMMARY

An embodiment according to the technique of the present disclosure provides a noncontact communication device, a magnetic tape drive, a noncontact communication system, a method for operating a noncontact communication device, and a program that enable a noncontact communication device to perform noncontact communication with noncontact storage mediums of various communication standards, compared to a case where a noncontact communication device performs noncontact communication with a noncontact storage medium using only one communication standard.

A first aspect according to the technique of the present disclosure is a noncontact communication device comprising an antenna, and a processor configured to couple a noncontact storage medium mounted in a magnetic tape cartridge and the antenna by electromagnetic induction to perform communication with the noncontact storage medium, in which the processor is configured to perform communication in each of a plurality of communication standards, and perform communication with the noncontact storage medium in a communication standard corresponding to the noncontact storage medium among the plurality of communication standards.

A second aspect according to the technique of the present disclosure is the noncontact communication device according to the first aspect, in which the processor is configured to specify a communication standard set for the noncontact storage medium among the plurality of communication standards based on a response obtained from the noncontact storage medium with a command for requesting the response to the noncontact storage medium being transmitted to the noncontact storage medium through the antenna, and perform communication with the noncontact storage medium in the specified communication standard.

A third aspect according to the technique of the present disclosure is the noncontact communication device according to the second aspect, in which the response includes information that is able to specify the communication standard set for the noncontact storage medium.

A fourth aspect according to the technique of the present disclosure is the noncontact communication device according to any one of the first aspect to the third aspect, in which the processor is configured to perform, in a case where the plurality of communication standards are selectively set for the noncontact storage medium in response to an instruction given from an outside, communication with the noncontact storage medium in a communication standard set for the noncontact storage medium among the plurality of communication standards.

A fifth aspect according to the technique of the present disclosure is the noncontact communication device according to the first aspect, in which the processor is configured to acquire a feature that is physically given to the magnetic tape cartridge and is able to specify a communication standard set for the noncontact storage medium, specify a communication standard corresponding to the noncontact storage medium among the plurality of communication standards based on the acquired feature, and perform communication with the noncontact storage medium in the specified communication standard.

A sixth aspect according to the technique of the present disclosure is the noncontact communication device according to the fifth aspect, in which the feature is detected by a physical sensor.

A seventh aspect according to the technique of the present disclosure is the noncontact communication device according to the fifth aspect or the sixth aspect, in which the feature is at least a shape between a shape and a size of the magnetic tape cartridge.

An eighth aspect according to the technique of the present disclosure is the noncontact communication device according to the fifth aspect or the sixth aspect, in which the feature is a mark that is able to specify the communication standard set for the noncontact storage medium.

A ninth aspect according to the technique of the present disclosure is the noncontact communication device according to any one of the first aspect to the eighth aspect, in which the noncontact communication device is a reader/writer that is mounted in a drive into which the magnetic tape cartridge is loaded.

A tenth aspect according to the technique of the present disclosure is the noncontact communication device according to any one of the first aspect to the eighth aspect, in which the noncontact communication device is a reader/writer for inspection of the magnetic tape cartridge.

An eleventh aspect according to the technique of the present disclosure is the noncontact communication device according to any one of the first aspect to the eighth aspect, in which the noncontact communication device is a reader/writer for diagnosis of the magnetic tape cartridge.

A twelfth aspect according to the technique of the present disclosure is the noncontact communication device according to any one of the first aspect to the eighth aspect, in which the noncontact communication device is a reader/writer for production management of the magnetic tape cartridge.

A thirteenth aspect according to the technique of the present disclosure is the noncontact communication device according to the twelfth aspect, in which the reader/writer for production management is a reader/writer that is used for management of a history of the magnetic tape cartridge passing through a plurality of manufacturing steps.

A fourteenth aspect according to the technique of the present disclosure is the noncontact communication device according to any one of the first aspect to the thirteenth aspect, in which the processor is configured to fix the communication standard used in the communication among the plurality of communication standards in response to an instruction given from an outside.

A fifteenth aspect according to the technique of the present disclosure is a magnetic tape drive comprising the noncontact communication device according to any one of the first aspect to the fourteenth aspect, and a magnetic head, in which the noncontact storage medium is mounted in a magnetic tape cartridge, the magnetic tape cartridge accommodates a magnetic tape, and the magnetic head performs at least one of recording or reading of data with respect to the magnetic tape pulled out from the magnetic tape cartridge.

A sixteenth aspect according to the technique of the present disclosure is a noncontact communication system comprising the noncontact communication device according to any one of the first aspect to the fourteenth aspect, and the noncontact storage medium.

A seventeenth aspect according to the technique of the present disclosure is a method for operating a noncontact communication device including an antenna, and a processor configured to couple a noncontact storage medium mounted in a magnetic tape cartridge and the antenna by electromagnetic induction to perform communication with the noncontact storage medium, the processor being configured to perform communication in each of a plurality of communication standards, the method comprising performing communication with the noncontact storage medium in a communication standard corresponding to the noncontact storage medium among the plurality of communication standards.

An eighteenth aspect according to the technique of the present disclosure is a program causing a computer, which is applied to a noncontact communication device including an antenna, and a processor configured to couple a noncontact storage medium mounted in a magnetic tape cartridge and the antenna by electromagnetic induction to perform communication with the noncontact storage medium, to execute specific processing, the processor being configured to perform communication in each of a plurality of communication standards, the specific processing comprising performing communication with the noncontact storage medium in a communication standard corresponding to the noncontact storage medium among the plurality of communication standards.

BRIEF DESCRIPTION OF THE DRAWINGS

Exemplary embodiments of the technology of the disclosure will be described in detail based on the following figures, wherein.

DETAILED DESCRIPTION OF THE PREFERRED EMBODIMENTS

Hereinafter, an example of an embodiment of a noncontact communication device, a magnetic tape drive, a noncontact communication system, a method for operating a noncontact communication device, and a program according to the technique of the present disclosure will be described referring to the accompanying drawings.

First, terms that are used in the following description will be described.

CPU is an abbreviation for "Central Processing Unit". RAM is an abbreviation for "Random Access Memory". DRAM is an abbreviation for "Dynamic Random Access Memory". SRAM is an abbreviation for "Static Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". IBM is an abbreviation for "International Business Machines Corporation". CM is an abbreviation for "Cartridge Memory". EL is an abbreviation for "Electro-Luminescence". QR is an abbreviation for "Quick Response".

Figure 1:
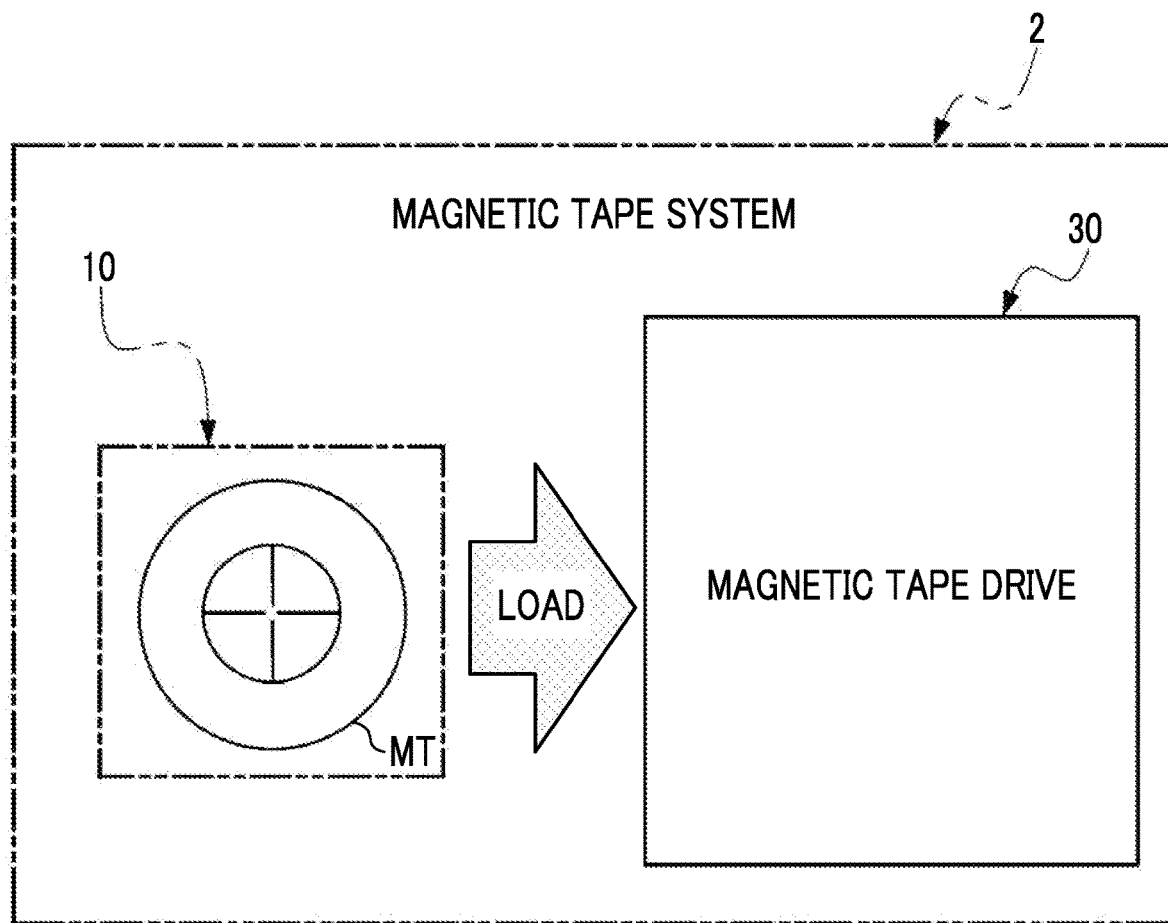
FIG. 1 is a block diagram showing an example of the configuration of a magnetic tape system.

As shown in FIG. 1 as an example, a magnetic tape system 2 is an example of a "noncontact communication system" according to the technique of the present disclosure, and comprises a magnetic tape cartridge 10 and a magnetic tape drive 30. The magnetic tape cartridge 10 is loaded into the magnetic tape drive 30. The magnetic tape cartridge 10 accommodates the magnetic tape MT. The magnetic tape drive 30 pulls out the magnetic tape MT from the magnetic tape cartridge 10 loaded thereinto, and records data on the magnetic tape MT or reads data from the magnetic tape MT while making the pulled-out magnetic tape MT run.

Next, an example of the configuration of the magnetic tape cartridge 10 will be described referring to FIGS. 2 to 4. In the following description, for convenience of description, in FIGS. 2 to 4, a loading direction of the magnetic tape cartridge 10 into the magnetic tape drive 30 (see FIG. 5) is indicated by an arrow A, a direction of the arrow A is referred to as a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In the following description, for convenience of description, in FIGS. 2 to 4, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

In the following description, for convenience of description, in FIGS. 2 to 4, a direction opposite to the direction of the arrow B is referred to as a left direction, and a side in the left direction of the magnetic tape cartridge 10 is referred to as a left side of the magnetic tape cartridge 10. In the following description of the structure, "left" indicates the left side of the magnetic tape cartridge 10.

In the following description, for convenience of description, in FIGS. 2 to 4, a direction perpendicular to the direction of the arrow A and the direction of the arrow B is indicated by an arrow C, a direction of the arrow C is referred to as an up direction of the magnetic tape cartridge 10, and a side in the up direction of the magnetic tape cartridge 10 is referred to as an upside of the magnetic tape cartridge 10. In the following description of the structure, "up" indicates the upside of the magnetic tape cartridge 10.

In the following description, for convenience of description, in FIGS. 2 to 4, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

In the following description, for convenience of description, in FIGS. 2 to 4, a direction opposite to the up direction of the magnetic tape cartridge 10 is referred to as a down direction of the magnetic tape cartridge 10, and a side in the down direction of the magnetic tape cartridge 10 is referred to as a downside of the magnetic tape cartridge 10. In the following description of the structure, "down" indicates the downside of the magnetic tape cartridge 10.

In the following description, although LTO will be described as the specification of the magnetic tape cartridge 10 as an example, this is merely an example, and the specification of the magnetic tape cartridge 10 may conform to the specification of a magnetic tape cartridge of IBM3592.

Figure 2:
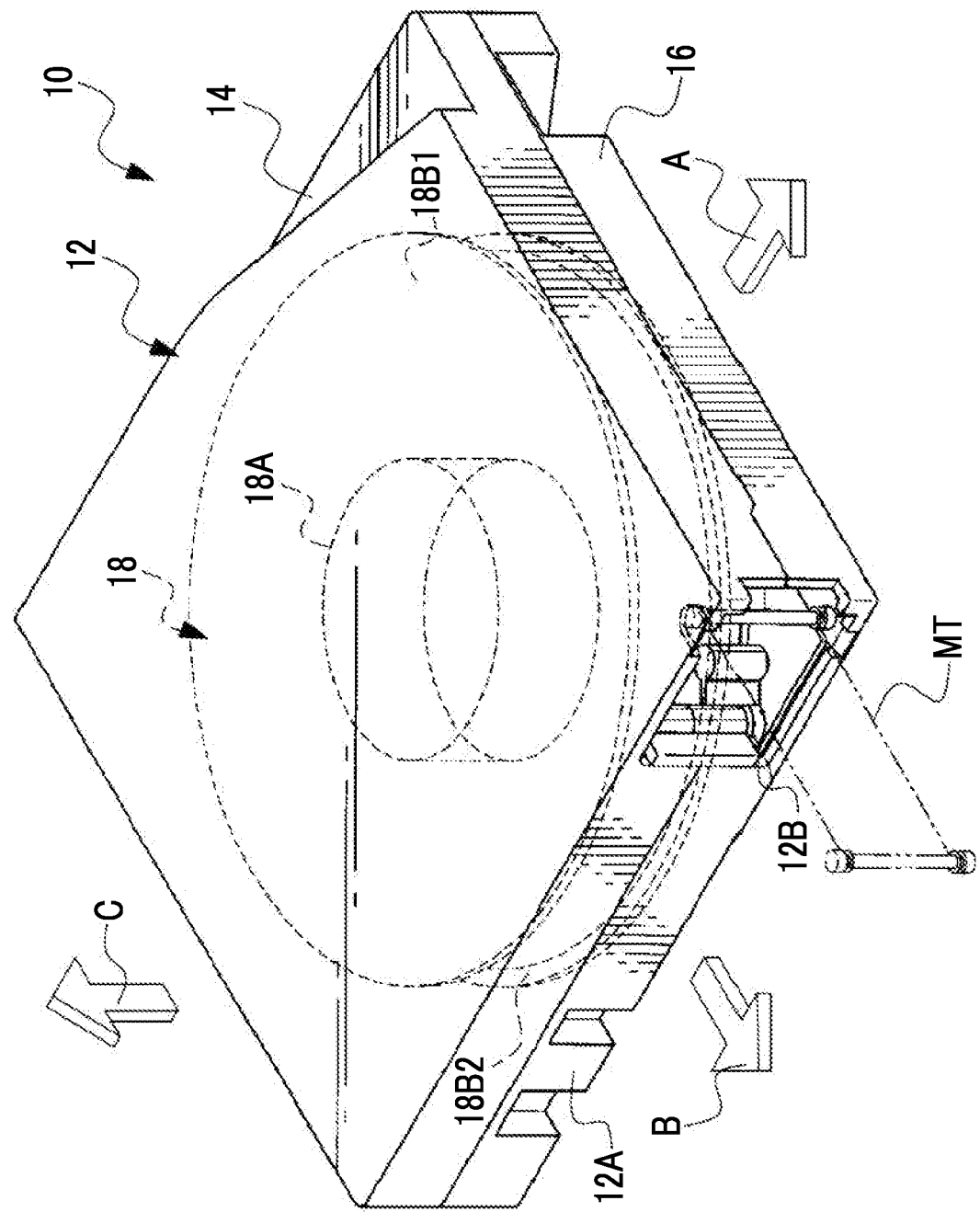
FIG. 2 is a schematic perspective view showing an example of the appearance of a magnetic tape cartridge.

As shown in FIG. 2 as an example, the magnetic tape cartridge 10 has a substantially rectangular shape in plan view, and comprises a box-shaped case 12. The case 12 is an example of a "case" according to the technique of the present disclosure. The magnetic tape MT is accommodated in the case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably accommodated. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. The reel hub 18A and the lower flange 18B2 may be molded integrally.

The magnetic tape MT is wound around an outer peripheral surface of the reel hub 18A, and an end portion in a width direction of the magnetic tape MT is held by the upper flange 18B1 and the lower flange 18B2.

An opening 12B is formed on a front side of a right wall 12A of the case 12. The magnetic tape MT is pulled out from the opening 12B.

Figure 3:
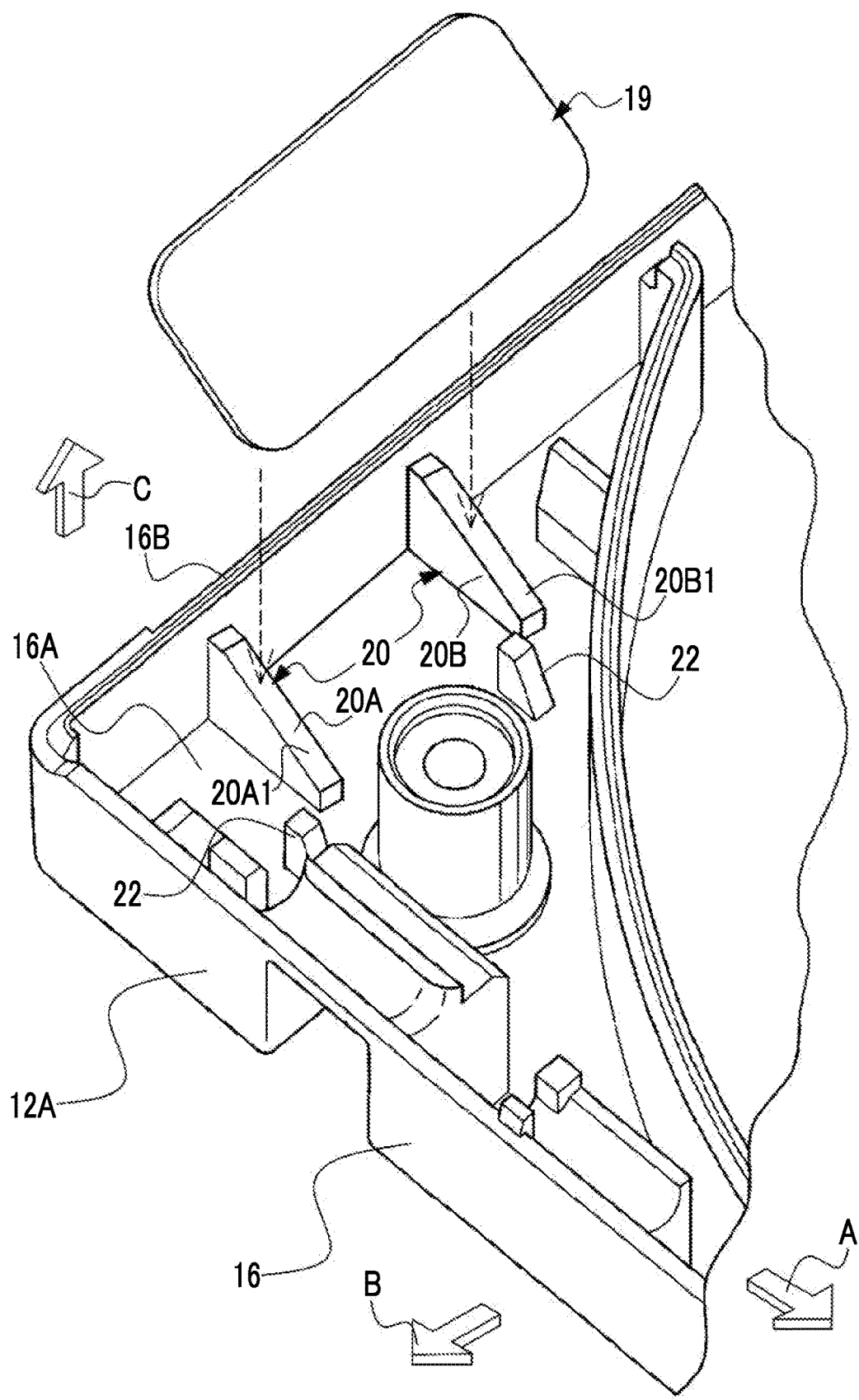
FIG. 3 is a schematic perspective view showing an example of the structure of a rear right end portion inside a lower case of the magnetic tape cartridge.

As shown in FIG. 3 as an example, a cartridge memory 19 is mounted in the magnetic tape cartridge 10. The cartridge memory 19 is provided in the lower case 16. More specifically, the cartridge memory 19 is accommodated in a rear right end portion of the lower case 16. The cartridge memory 19 is an example of a "noncontact communication medium" according to the technique of the present disclosure. In the present embodiment, a so-called passive type RFID tag is employed as the cartridge memory 19.

Information regarding the magnetic tape MT is stored in the cartridge memory 19. Information regarding the magnetic tape MT indicates, for example, management information (see FIG. 12) for managing the magnetic tape cartridge 10. The management information includes, for example, information regarding the cartridge memory 19, information capable of specifying the magnetic tape cartridge 10, and information indicating a storage capacity of the magnetic tape MT and the outline of data, items of data, and a recording format of data recorded on the magnetic tape MT.

The cartridge memory 19 performs noncontact communication with a noncontact reading and writing device. Examples of the noncontact reading and writing device include a noncontact reading and writing device (for example, a noncontact reading and writing device 50B shown in FIG. 36) that is used in a manufacturing step of the magnetic tape cartridge 10, and a noncontact reading and writing device (for example, a noncontact reading and writing device 50A shown in FIGS. 5 to 7, and the like) that is used in a magnetic tape drive (for example, the magnetic tape drive 30 shown in FIG. 5). The noncontact reading and writing device operates using power supplied from a battery (not shown) or a commercial power supply.

The noncontact reading and writing device is a device that is generally referred to as a reader/writer, and performs reading and writing of various kinds of information with respect to the cartridge memory 19 in a noncontact manner. Though details will be described below, the cartridge memory 19 generates power with electromagnetic application of the magnetic field MF (see FIG. 6 and the like) from the noncontact reading and writing device. Then, the cartridge memory 19 operates using the generated power and performs communication with the noncontact reading and writing device through the magnetic field MF to perform transfer of various kinds of information with the noncontact reading and writing device.

As shown in FIG. 3 as an example, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. The second inclined mount 20B has an inclined surface 20B1, and the inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 4:
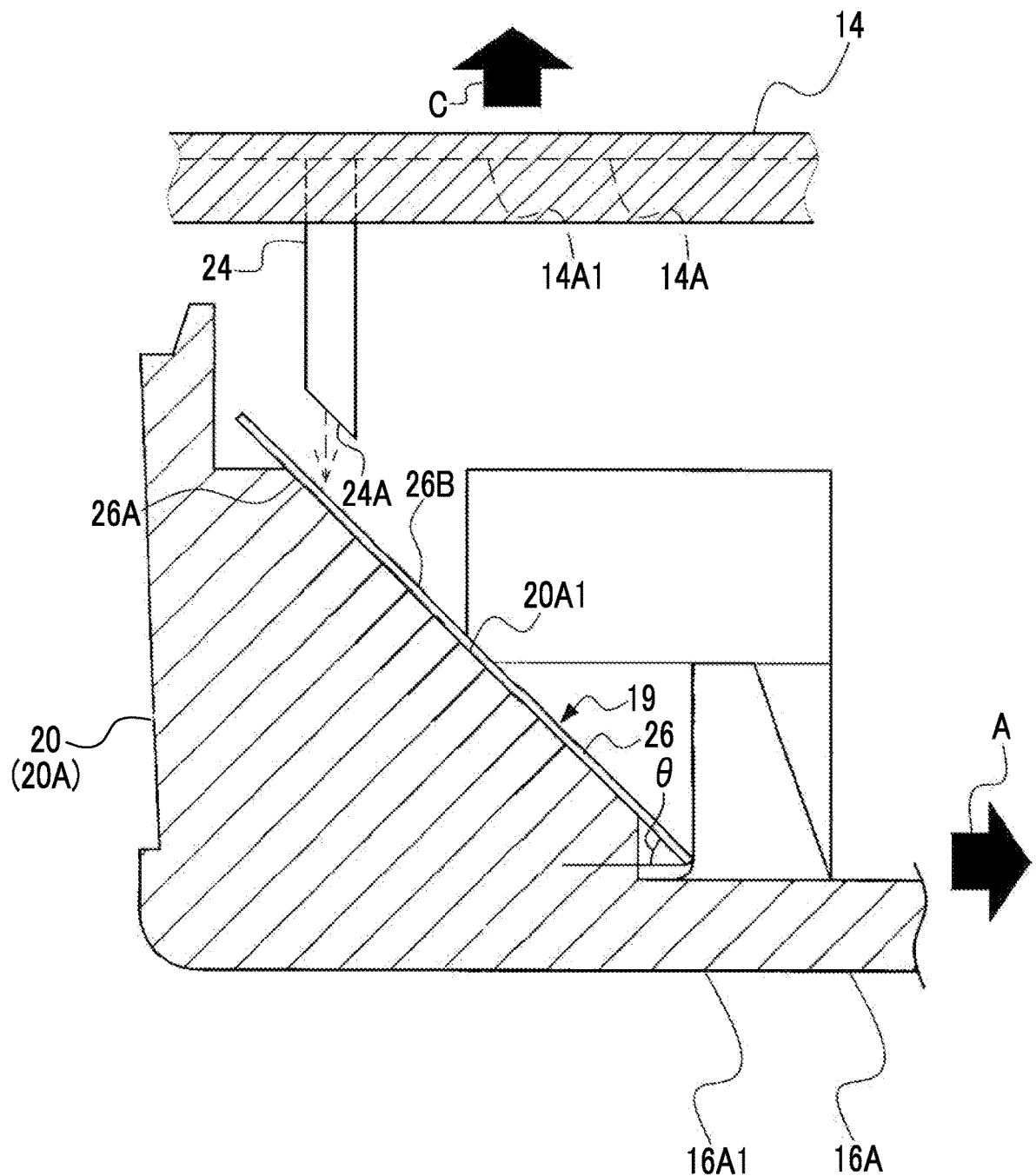
FIG. 4 is a side cross-sectional view showing an example of a support member provided on an inner surface of the lower case of the magnetic tape cartridge.

As shown in FIG. 4 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a downside. Here, "parallel" indicates parallel in a meaning including an error that is generally allowed in the technical field to which the technique of the present disclosure belongs, and an error to such an extent not contrary to the spirit and scope of the technique of that the present disclosure, in addition to completely parallel. An inclination angle θ of the support member 20, that is, an inclination angle of each of the inclined surface 20A1 and the inclined surface 20B1 (see FIG. 3) is 45 degrees with respect to the reference surface 16A1. The inclination angle of 45 degrees is merely an example, and may be in a range of "0 degrees<inclination angle θ<45 degrees" or may be equal to or greater than 45 degrees.

The cartridge memory 19 comprises a substrate 26. The substrate 26 is placed on the support member 20 such that a back surface 26A of the substrate 26 turns toward a downside, and the support member 20 supports the back surface 26A of the substrate 26 from below. A part of the back surface 26A of the substrate 26 is in contact with the inclined surface of the support member 20, that is, the inclined surfaces 20A1 and 20B1 (see FIG. 3), and a front surface 26B of the substrate 26 is exposed to an inner surface 14A1 side of a top plate 14A of the upper case 14.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1 (see FIG. 3). That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surfaces 20A1 and 20B1 (see FIG. 3) of the support member 20. With this, a position in an up-down direction of the cartridge memory 19 is restricted by the ribs 24.

Figure 5:
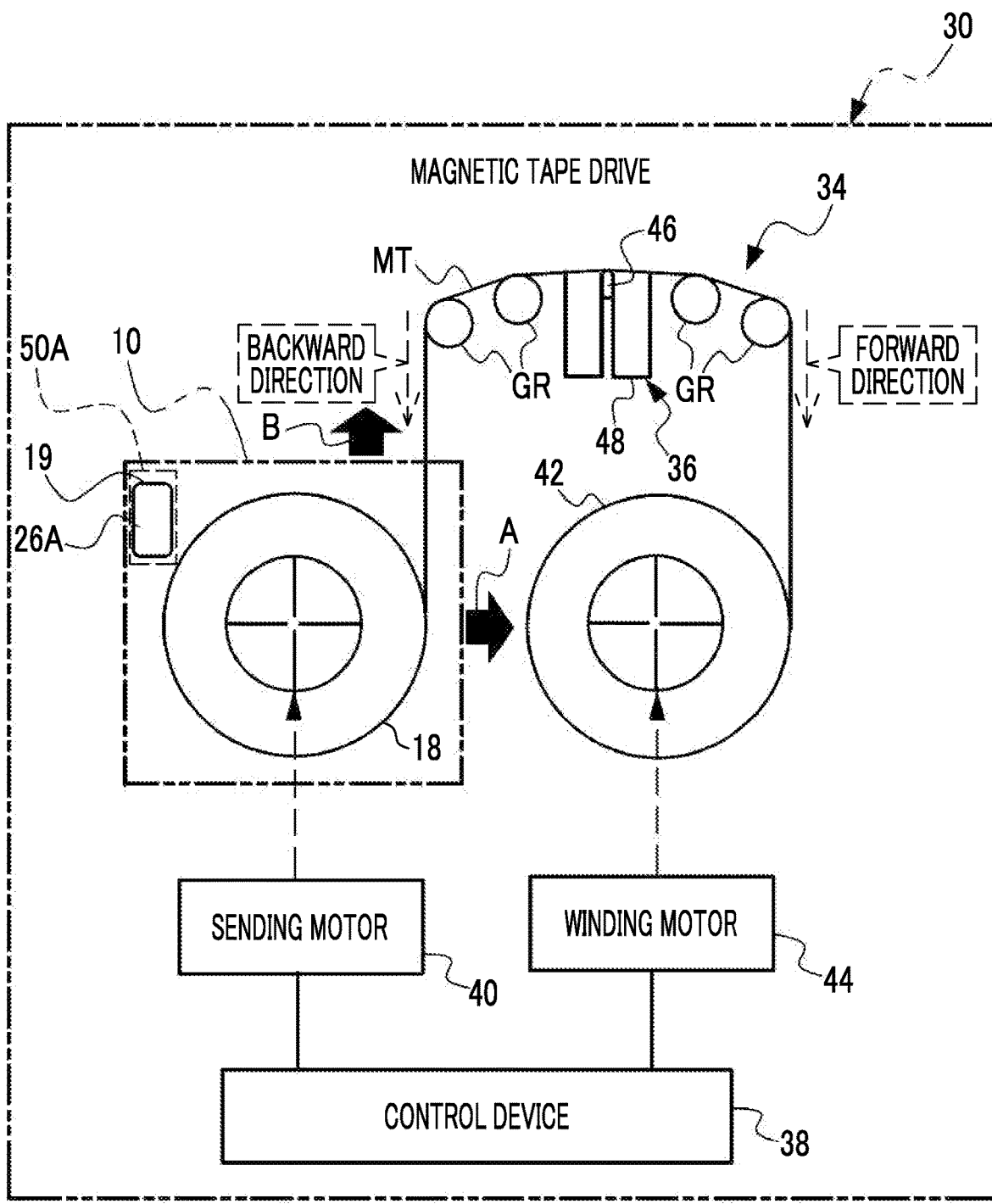
FIG. 5 is a schematic configuration diagram showing an example of the hardware configuration of a magnetic tape drive.

As shown in FIG. 5 as an example, the magnetic tape drive 30 comprises a transport device 34, a magnetic head 36, and a control device 38. The magnetic tape cartridge 10 is loaded into the magnetic tape drive 30. The magnetic tape drive 30 is a device that pulls out the magnetic tape MT from the magnetic tape cartridge 10, records data on the pulled-out magnetic tape MT using the magnetic head 36, and reads data from the pulled-out magnetic tape MT using the magnetic head 36 by a linear serpentine method. In the present embodiment, in other words, reading of data indicates reproduction of data.

The control device 38 controls the operation of the entire magnetic tape drive 30. In the present embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an ASIC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38. Here, the forward direction indicates a sending direction of the magnetic tape MT, and the backward direction indicates a rewinding direction of the magnetic tape MT.

The sending motor 40 rotates the cartridge reel 18 in the magnetic tape cartridge 10 under the control of the control device 38. The control device 38 controls the sending motor 40 to control a rotation direction, a rotation speed, rotation torque, and the like of the cartridge reel 18.

In a case where the magnetic tape MT is wound around the winding reel 42 (loaded), the control device 38 rotates the sending motor 40 such that the magnetic tape MT runs in the forward direction. A rotation speed, rotation torque, and the like of the sending motor 40 are adjusted depending on a speed of the magnetic tape MT wound around the winding reel 42.

The winding motor 44 rotates the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the control device 38 rotates the winding motor 44 such that the magnetic tape MT runs in the forward direction. In a case of rewinding (unloading) the magnetic tape MT to the cartridge reel 18, the control device 38 rotates the sending motor 40 and the winding motor 44 such that the magnetic tape MT runs in the backward direction. A rotation speed, rotation torque, and the like of the winding motor 44 are adjusted depending on the speed of the magnetic tape MT wound around the winding reel 42. The rotation speed, the rotation torque, and the like of each of the sending motor 40 and the winding motor 44 are adjusted by the control device 38 in this manner, whereby tension is applied to the magnetic tape MT.

In the present embodiment, although the rotation speed, the rotation torque, and the like of each of the sending motor 40 and the winding motor 44 are controlled such that the tension applied to the magnetic tape MT is controlled, the technique of the present disclosure is not limited thereto. For example, the tension applied to the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the magnetic head 36 between the magnetic tape cartridge 10 and the winding reel 42.

The magnetic head 36 comprises a magnetic element unit 46 and a holder 48. The magnetic element unit 46 is held by the holder 48 to come into contact with the magnetic tape MT during running. The magnetic element unit 46 records data on the magnetic tape MT transported by the transport device 34 or reads data from the magnetic tape MT transported by the transport device 34.

The magnetic tape drive 30 comprises the noncontact reading and writing device 50A. The noncontact reading and writing device 50A is an example of a "noncontact communication device" according to the technique of the present disclosure. The noncontact reading and writing device 50A is disposed to confront the back surface 26A of the cartridge memory 19 below the magnetic tape drive 30 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where reading of data from the magnetic tape MT by the magnetic head 36 starts.

Figure 6:
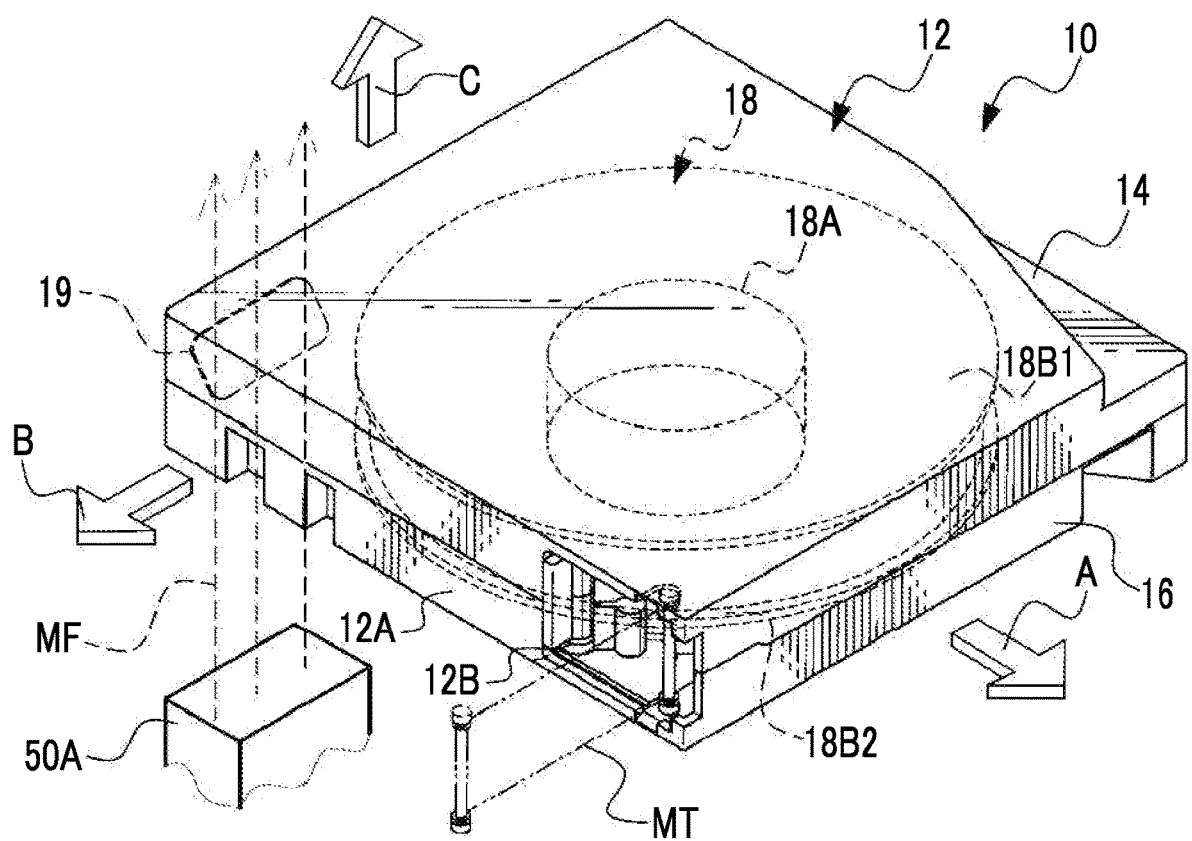
FIG. 6 is a schematic perspective view showing an example of an aspect in which a magnetic field is emitted from a downside of the magnetic tape cartridge by a noncontact reading and writing device.

As shown in FIG. 6 as an example, the noncontact reading and writing device 50A emits a magnetic field MF from below the magnetic tape cartridge 10 toward the cartridge memory 19. The magnetic field MF passes through the cartridge memory 19.

Figure 7:
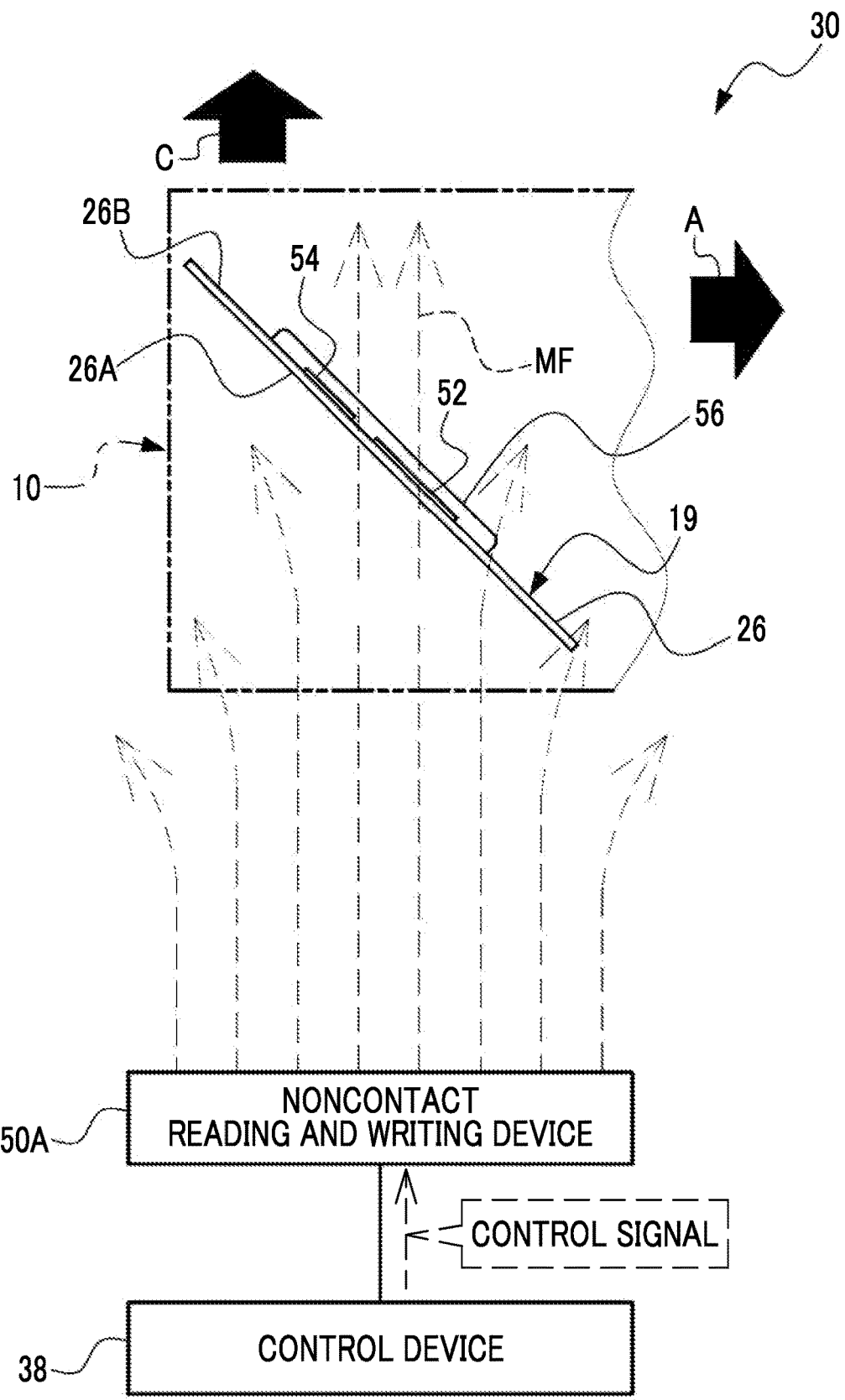
FIG. 7 is a conceptual diagram showing an example of an aspect in which a magnetic field is applied from the noncontact reading and writing device to a cartridge memory in the magnetic tape cartridge.

As shown in FIG. 7 as an example, the noncontact reading and writing device 50A is connected to the control device 38. The control device 38 outputs a control signal to the noncontact reading and writing device 50A. The control signal is a signal for controlling the cartridge memory 19. The noncontact reading and writing device 50A emits the magnetic field MF toward the cartridge memory 19 in response to the control signal input from the control device 38. The magnetic field MF passes through the cartridge memory 19 from the back surface 26A side to the front surface 26B side.

The noncontact reading and writing device 50A performs noncontact communication with the cartridge memory 19 to give a command depending on the control signal to the cartridge memory 19. In more detail, the noncontact reading and writing device 50A spatially transmits the command to the cartridge memory 19 under the control of the control device 38. The command is a signal indicating an order to the cartridge memory 19. In the present embodiment, the command conforms to any of a plurality of communication standards, and the command corresponding to any of a plurality of communication standards is spatially transmitted from the noncontact reading and writing device 50A.

Here, examples of a plurality of communication standards include ISO144343A (Type A), ISO14443B (Type B), ISO15693, and ISO18092. In the present embodiment, for convenience of description, the communication standard is generalized and also referred to as an "N-th communication standard" or simply referred to as a "communication standard". Here, "N" means a natural number equal to or greater than one.

Here, although a form example where the noncontact reading and writing device 50A spatially transmits the command to the cartridge memory 19 under the control of the control device 38 has been described, the technique of the present disclosure is not limited thereto. For example, in a stage where the magnetic tape cartridge 10 is manufactured, a stage where the magnetic tape cartridge 10 is inspected, or a stage where the magnetic tape cartridge 10 is shipped, a noncontact reading and writing device 50B (see FIG. 36) spatially transmits the command to the cartridge memory 19 under the control of a control device different from the control device 38.

In a case where the command is spatially transmitted from the noncontact reading and writing device 50A to the cartridge memory 19, the command depending on an instruction from the control device 38 is included in the magnetic field MF by the noncontact reading and writing device 50A. In other words, the command is superimposed on the magnetic field MF by the noncontact reading and writing device 50A. That is, the noncontact reading and writing device 50A transmits the command to the cartridge memory 19 through the magnetic field MF under the control of the control device 38.

The IC chip 52 and a capacitor 54 are mounted on the front surface 26B of the cartridge memory 19. The IC chip 52 and the capacitor 54 are bonded to the front surface 26B. The IC chip 52 and the capacitor 54 are sealed with a sealing material 56 on the front surface 26B of the cartridge memory 19. Here, as the sealing material 56, ultraviolet curable resin that is cured upon reaction with ultraviolet rays is employed. The ultraviolet curable resin is merely an example, and photocurable resin that is cured upon reaction with light in a wavelength range other than ultraviolet rays may be used as the sealing material 56, thermosetting resin may be used as the sealing material 56, or other adhesives may be used as the sealing material 56.

Figure 8:
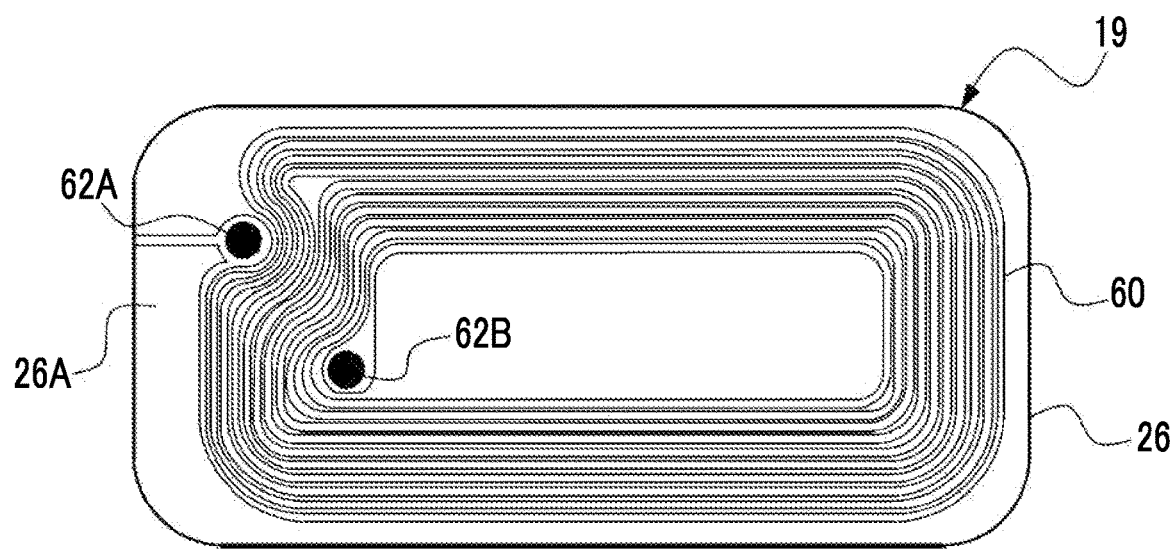
FIG. 8 is a schematic bottom view showing an example of the structure of a back surface of a substrate of the cartridge memory in the magnetic tape cartridge.

As shown in FIG. 8 as an example, an antenna coil 60 is formed in a loop shape on the back surface 26A of the cartridge memory 19. Here, as a material of the antenna coil 60, copper foil is employed. The copper foil is merely an example, and for example, other kinds of conductive materials, such as aluminum foil, may be used. The antenna coil 60 induces an induced current with application of the magnetic field MF (see FIGS. 6 and 7) from the noncontact reading and writing device 50A.

A first conduction portion 62A and a second conduction portion 62B are provided on the back surface 26A of the cartridge memory 19. The first conduction portion 62A and the second conduction portion 62B have solders and electrically connect both end portions of the antenna coil 60 to the IC chip 52 (see FIGS. 7 and 9) and the capacitor 54 (see FIGS. 7 and 9) on the front surface 26B.

Figure 9:
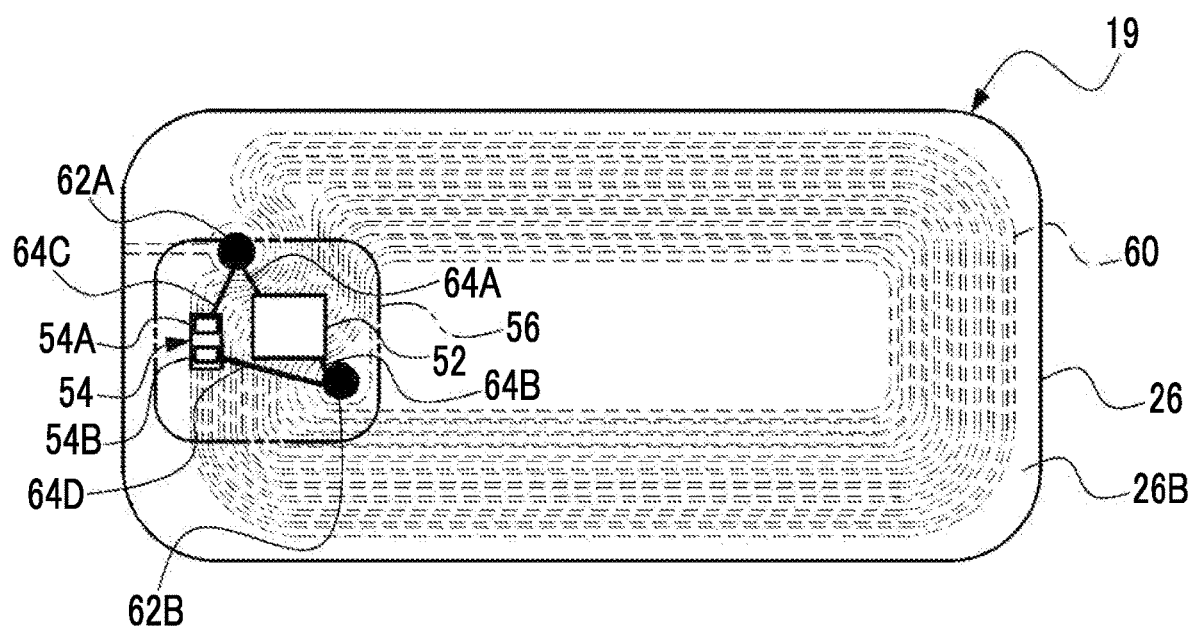
FIG. 9 is a schematic plan view showing an example of the structure of a front surface of the substrate of the cartridge memory in the magnetic tape cartridge.

As shown in FIG. 9 as an example, on the front surface 26B of the cartridge memory 19, the IC chip 52 and the capacitor 54 are electrically connected to each other by a wire connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 9, a pair of electrodes is electrodes 54A and 54B. The electrode 54A is connected to the first conduction portion 62A through a wiring 64C, and the electrode 54B is connected to the second conduction portion 62B through a wiring 64D. With this, the IC chip 52 and the capacitor 54 are connected in parallel with the antenna coil 60.

Figure 10:
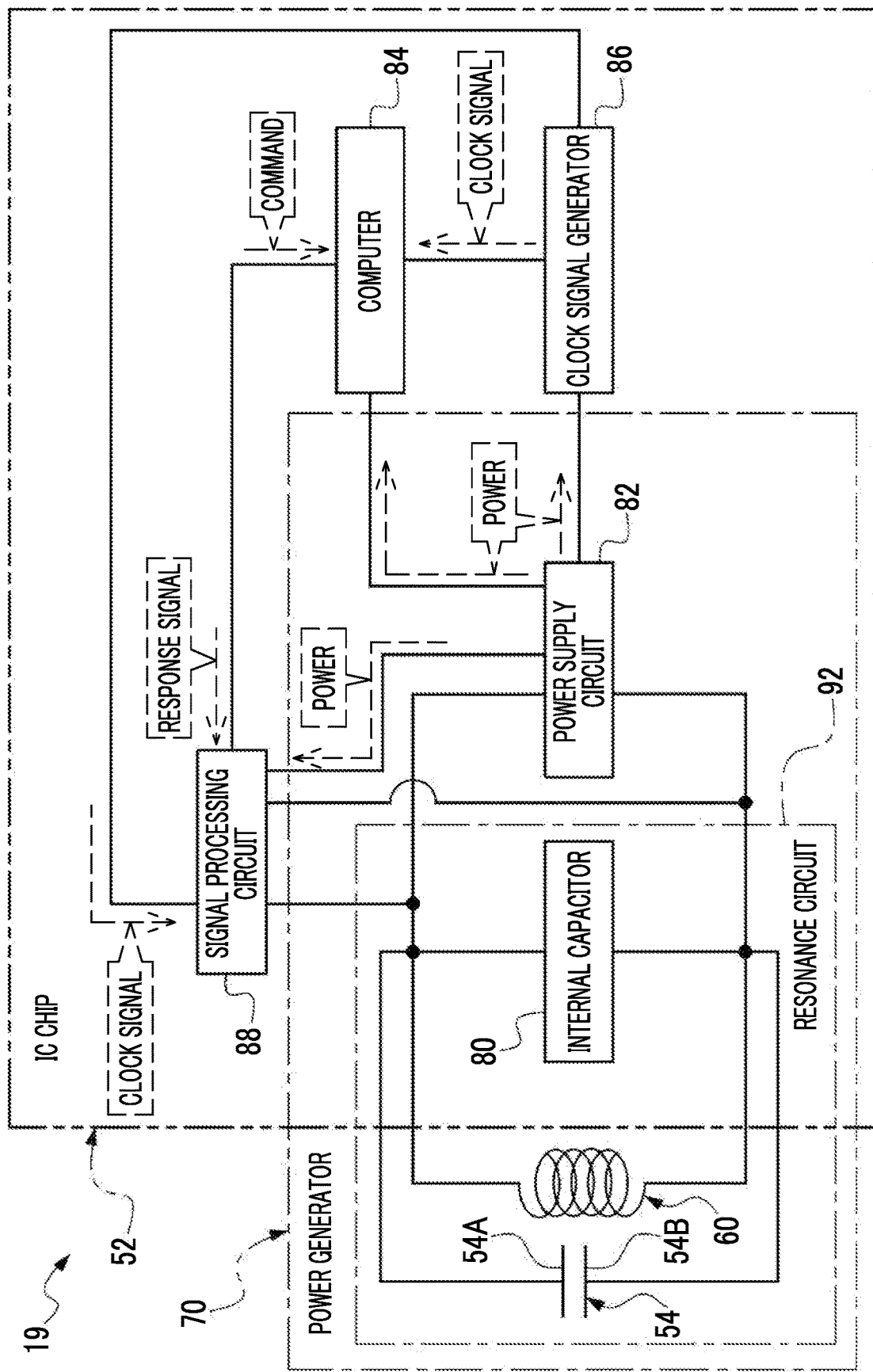
FIG. 10 is a schematic circuit diagram showing an example of the circuit configuration of the cartridge memory in the magnetic tape cartridge.

As shown in FIG. 10 as an example, the IC chip 52 comprises an internal capacitor 80, a power supply circuit 82, a computer 84, a clock signal generator 86, and a signal processing circuit 88. The IC chip 52 is a general-purpose IC chip that is also usable for purposes other than the magnetic tape cartridge 10.

The cartridge memory 19 comprises a power generator 70. The power generator 70 generates power with application of the magnetic field MF from the noncontact reading and writing device 50A to the antenna coil 60. Specifically, the power generator 70 generates alternating-current power using a resonance circuit 92, converts the generated alternating-current power into direct-current power, and outputs the direct-current power.

The power generator 70 has the power supply circuit 82 and the resonance circuit 92. The resonance circuit 92 comprises the capacitor 54, the antenna coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the antenna coil 60.

The capacitor 54 is a capacitor externally attached to the IC chip 52. The IC chip 52 is a general-use IC chip that is intrinsically usable for purposes different from the magnetic tape cartridge 10. For this reason, the capacitance of the internal capacitor 80 may not be enough to realize a resonance frequency required for the cartridge memory 19 used in the magnetic tape cartridge 10. Accordingly, in the cartridge memory 19, the capacitor 54 is post-attached to the IC chip 52 as a capacitor having a capacitance value necessary in making the resonance circuit 92 resonate at a resonance frequency determined in advance with the application of the magnetic field MF. The resonance frequency determined in advance is a frequency (for example, 13.56 MHz) corresponding to a frequency of the magnetic field MF, and may be suitably determined depending on the specification or the like of the cartridge memory 19 and/or the noncontact reading and writing device 50A. The capacitance of the capacitor 54 is determined based on a measured value of the capacitance of the internal capacitor 80. Here, although a form example where the capacitor 54 is externally attached has been described, the technique of the present disclosure is not limited thereto, and the capacitor 54 may be incorporated in advance into the IC chip 52.

The resonance circuit 92 generates an alternating-current power by generating a resonance phenomenon at the resonance frequency determined in advance using the induced current induced by the antenna coil 60 with the magnetic field MF passing through the antenna coil 60 and outputs the generated alternating-current power to the power supply circuit 82.

The power supply circuit 82 has a rectifier circuit, a smoothing circuit, and the like. The rectifier circuit is a full-wave rectifier circuit having a plurality of diodes. The full-wave rectifier circuit is merely an example, and a half-wave rectifier circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. The power generated by the power supply circuit 82 becomes greater within a limit range as the intensity of the magnetic field MF is greater.

Examples of various drive elements as a supply destination of power include the computer 84, the clock signal generator 86, and the signal processing circuit 88. The power is supplied to various drive elements in the IC chip 52 by the power generator 70, whereby the IC chip 52 operates with the power generated by the power generator 70.

The computer 84 controls the operation of the entire cartridge memory 19. The clock signal generator 86 generates a clock signal and outputs the clock signal to the signal processing circuit 88 and the like. The signal processing circuit 88 and the like operate in response to the clock signal input from the clock signal generator 86. The clock signal generator 86 changes a frequency of the clock signal in response to an instruction of the computer 84.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes the command from the magnetic field MF received by the antenna coil 60 and outputs the command to the computer 84. The computer 84 outputs a response signal to the command to the signal processing circuit 88. That is, the computer 84 executes processing depending on the command input from the signal processing circuit 88 and outputs a processing result as a response signal to the signal processing circuit 88. In a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50A through the magnetic field MF.

Figure 11:
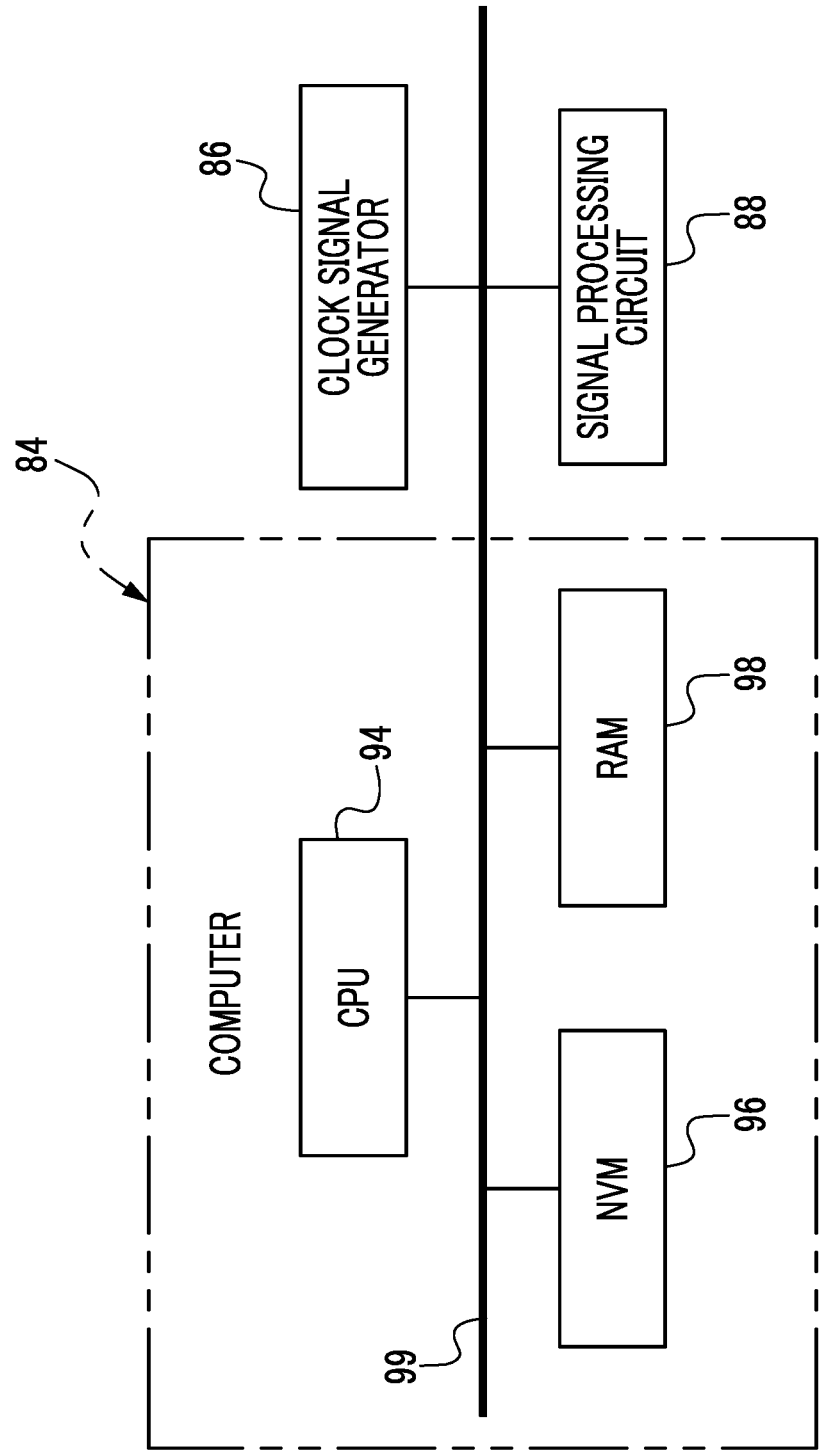
FIG. 11 is a block diagram showing an example of the hardware configuration of an electric system of a computer of an IC chip mounted on the cartridge memory in the magnetic tape cartridge.

As shown in FIG. 11 as an example, the computer 84 comprises a CPU 94, an NVM 96, and a RAM 98. The CPU 94, the NVM 96, and the RAM 98 are connected to a bus 99.

The CPU 94 controls the operation of the computer 84. An example of the NVM 96 is an EEPROM. The EEPROM is merely an example, and for example, a ferroelectric memory may be used instead of the EEPROM or any memory may be used as long as the memory is a non-volatile memory that can be mounted on the IC chip 52. The management information (see FIG. 12) and the like are stored in the NVM 96. The RAM 98 temporarily stores various kinds of information and is used as a work memory. An example of the RAM 98 is a DRAM or an SRAM.

The clock signal generator 86 and the signal processing circuit 88 are also connected to the bus 99. Accordingly, the CPU 94 can acquire the clock signal from the clock signal generator 86 or can perform transfer of signals with the signal processing circuit 88.

The CPU 94 executes processing depending on the command input from the signal processing circuit 88. Examples of the type of the command include a polling command, a readout command, and a write-in command. Here, the polling command is an example of a "command for requesting a response to a noncontact storage medium" according to the technique of the present disclosure".

Hereinafter, for convenience of description, a polling command corresponding to an N-th communication standard is also referred to as an "N-th communication standard polling command", and a polling command corresponding to any of a plurality of communication standards is also referred to as a "communication standard polling command" or a "polling command" in a case where there is no need for distinction.

The CPU 94 executes polling processing depending on the polling command input from the signal processing circuit 88. The polling processing is processing of establishing communication with the noncontact reading and writing device 50A, and is executed, for example, as preparation processing in a pre-stage of readout processing and write-in processing. The CPU 94 executes readout processing depending on the readout command input from the signal processing circuit 88. The readout processing is processing of reading out the management information (see FIG. 12) and the like from the NVM 96. The CPU 94 executes write-in processing depending on the write-in command input from the signal processing circuit 88. The write-in processing is processing of writing the management information (see FIG. 12) and the like into the NVM 96.

Figure 17:
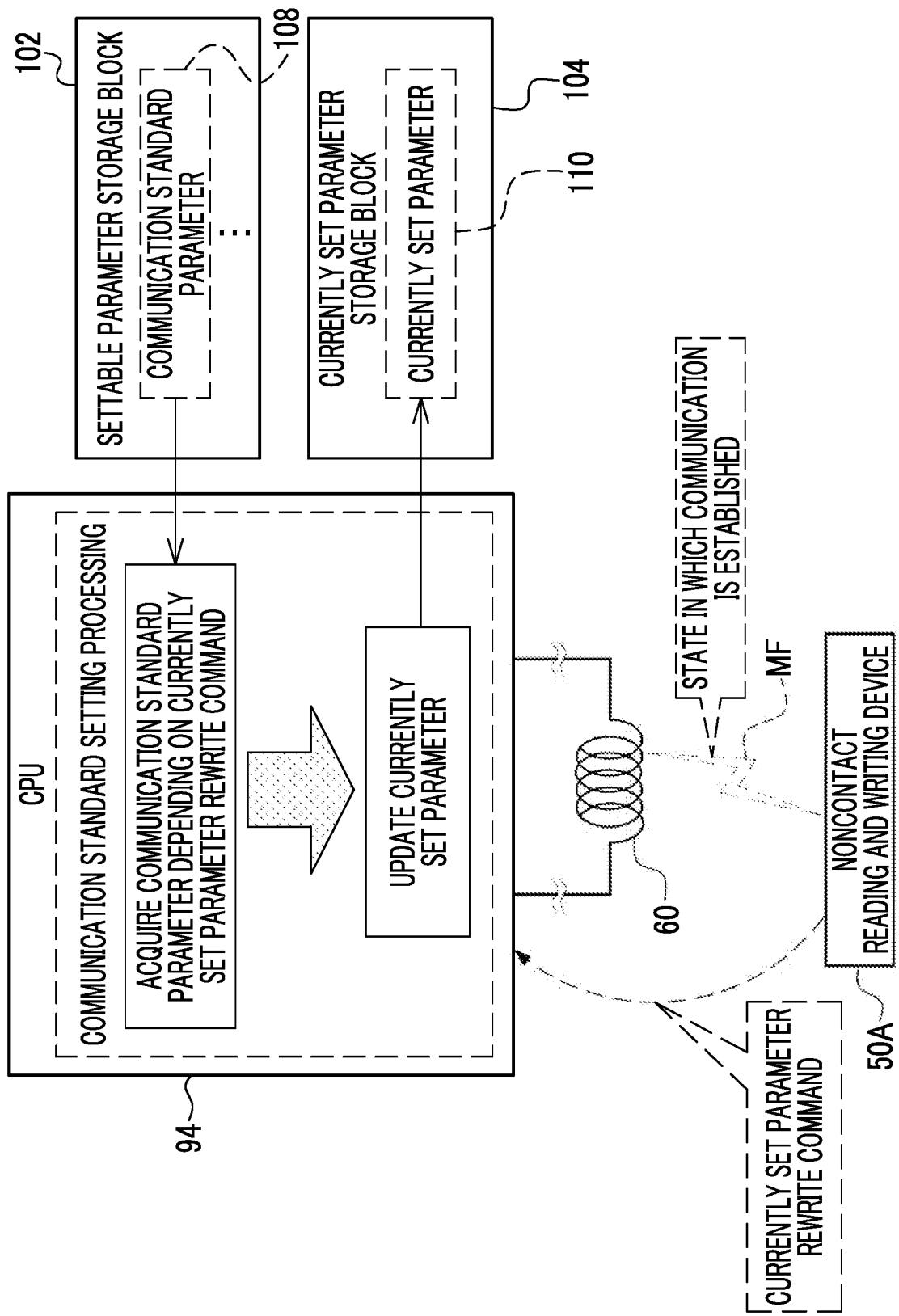
FIG. 17 is a conceptual diagram showing an example of contents of communication standard setting processing.
Figure 27:
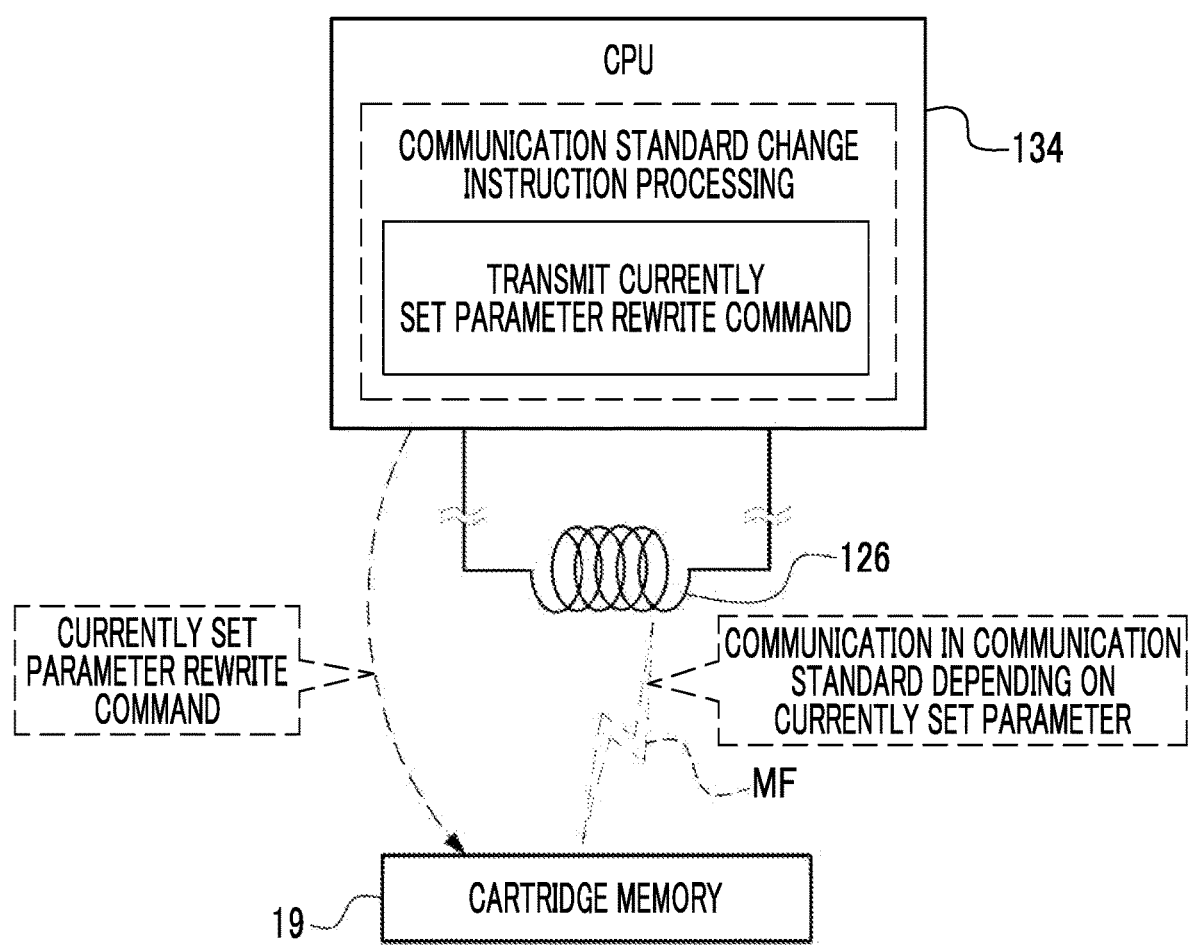
FIG. 27 is a conceptual diagram showing an example of contents of communication standard change instruction processing.

Examples of the type of the command other than the polling command, the readout command, and the write-in command include a currently set parameter rewrite command (see FIGS. 17 and 27). The CPU 94 executes currently set parameter rewrite processing depending on the currently set parameter rewrite command input from the signal processing circuit 88. Though details will be described below, the currently set parameter rewrite processing is processing of rewriting the currently set parameter 110 (see FIG. 17) set at this moment to a communication standard parameter 108 (see FIG. 17) depending on the currently set parameter rewrite command.

Figure 12:
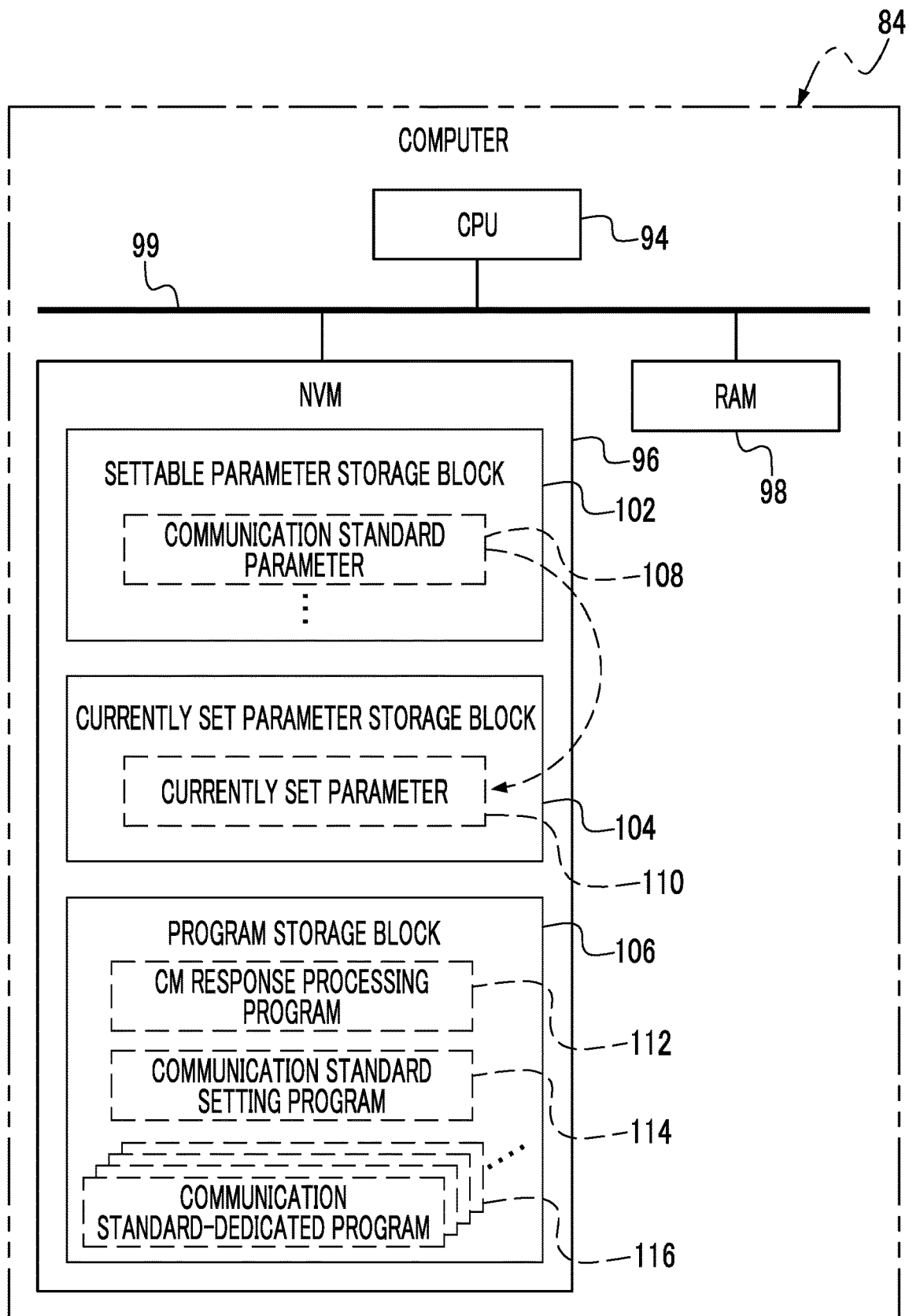
FIG. 12 is a conceptual diagram showing an example of storage contents of an NVM included in the computer of the IC chip mounted on the cartridge memory.

As shown in FIG. 12 as an example, the NVM 96 has a plurality of storage blocks including a settable parameter storage block 102, a currently set parameter storage block 104, and a program storage block 106.

A plurality of communication standard parameters 108 that are able to specify communication standards settable in the IC chip 52 are stored in the settable parameter storage block 102. A currently set parameter 110 is stored in the currently set parameter storage block 104. The currently set parameter 110 is a communication standard parameter 108 corresponding to a communication standard currently set in the IC chip 52 among a plurality of communication standard parameters 108. Hereinafter, for convenience of description, description will be provided on the premise that any communication standard parameter 108 is stored as the currently set parameter 110 in the currently set parameter storage block 104.

A CM response processing program 112, a communication standard setting program 114, and a plurality of communication standard-dedicated programs 116 are stored in the program storage block 106. A plurality of communication standard-dedicated programs 116 correspond to a plurality of communication standard parameters 108 on a one-to-one basis. The CPU 94 reads out the communication standard-dedicated program 116 corresponding to the currently set parameter 110 stored in the currently set parameter storage block 104 from the program storage block 106 and executes the read-out communication standard-dedicated program 116 to realize communication in the communication standard corresponding to the currently set parameter 110 stored in the currently set parameter storage block 104.

The communication standard that is specified from the currently set parameter 110 stored in the currently set parameter storage block 104 is the communication standard currently set in the IC chip 52. That is, the CPU 94 executes the communication standard-dedicated program 116 corresponding to the currently set parameter 110 stored in the currently set parameter storage block 104, whereby the IC chip 52 can perform communication with the noncontact reading and writing device 50A in the currently set communication standard through the antenna coil 60 (see FIG. 10).

Figure 13:
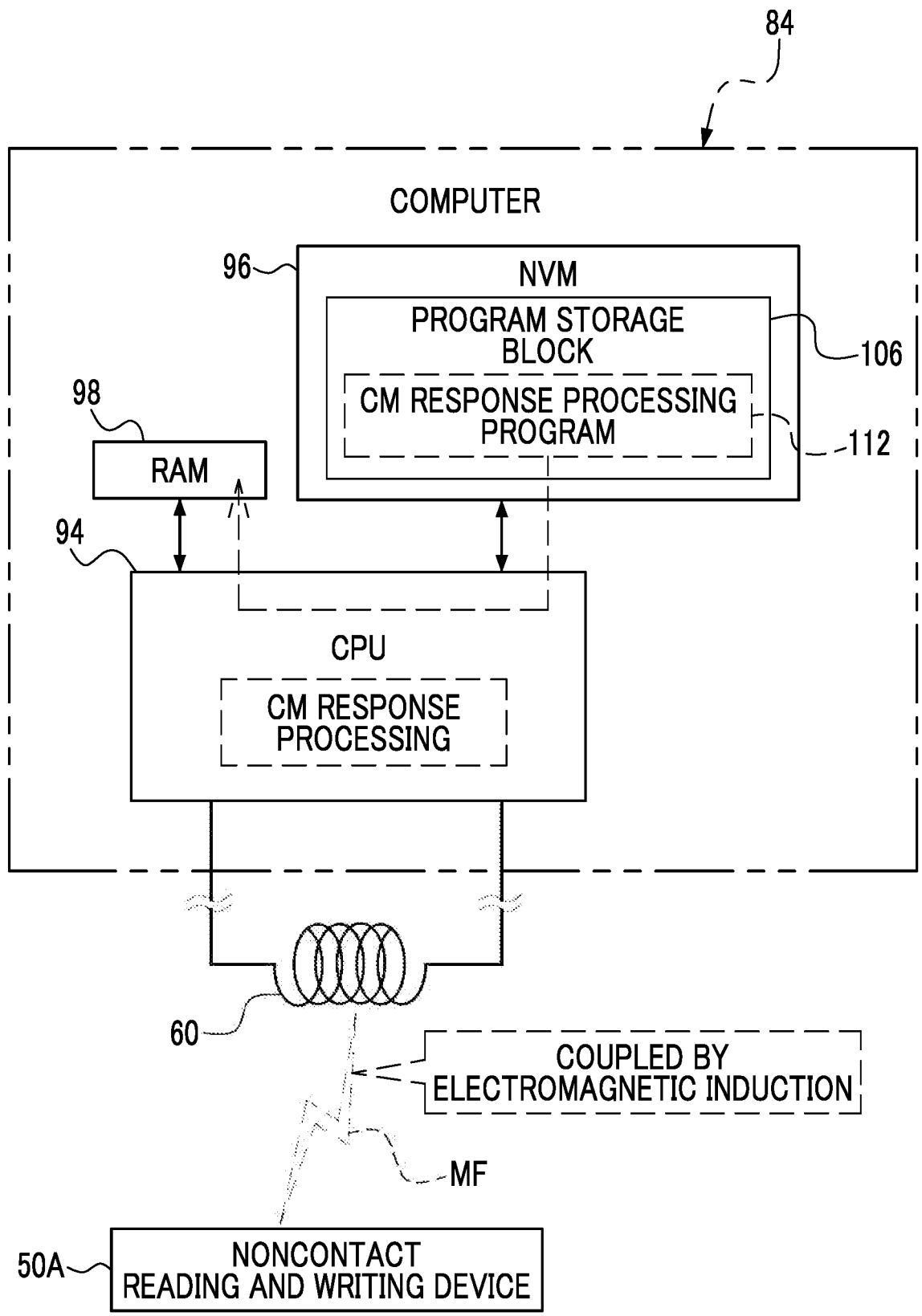
FIG. 13 is a block diagram showing an example of an aspect where a CM response processing program is executed by a CPU in the computer of the IC chip mounted on the cartridge memory.

As shown in FIG. 13 as an example, in a case where the noncontact reading and writing device 50A emits the magnetic field MF toward the antenna coil 60 such that the noncontact reading and writing device 50A and the antenna coil 60 are coupled by electromagnetic induction, the CPU 94 reads out the CM response processing program 112 from the program storage block 106 and executes the read-out CM response processing program 112 on the RAM 98. The CPU 94 executes CM response processing (see FIG. 30) following the CM response processing program 112 that is executed on the RAM 98. Though details will be described below, the CM response processing is processing in which the cartridge memory 19 responds to the communication standard polling command from the noncontact reading and writing device 50A.

Figure 14:
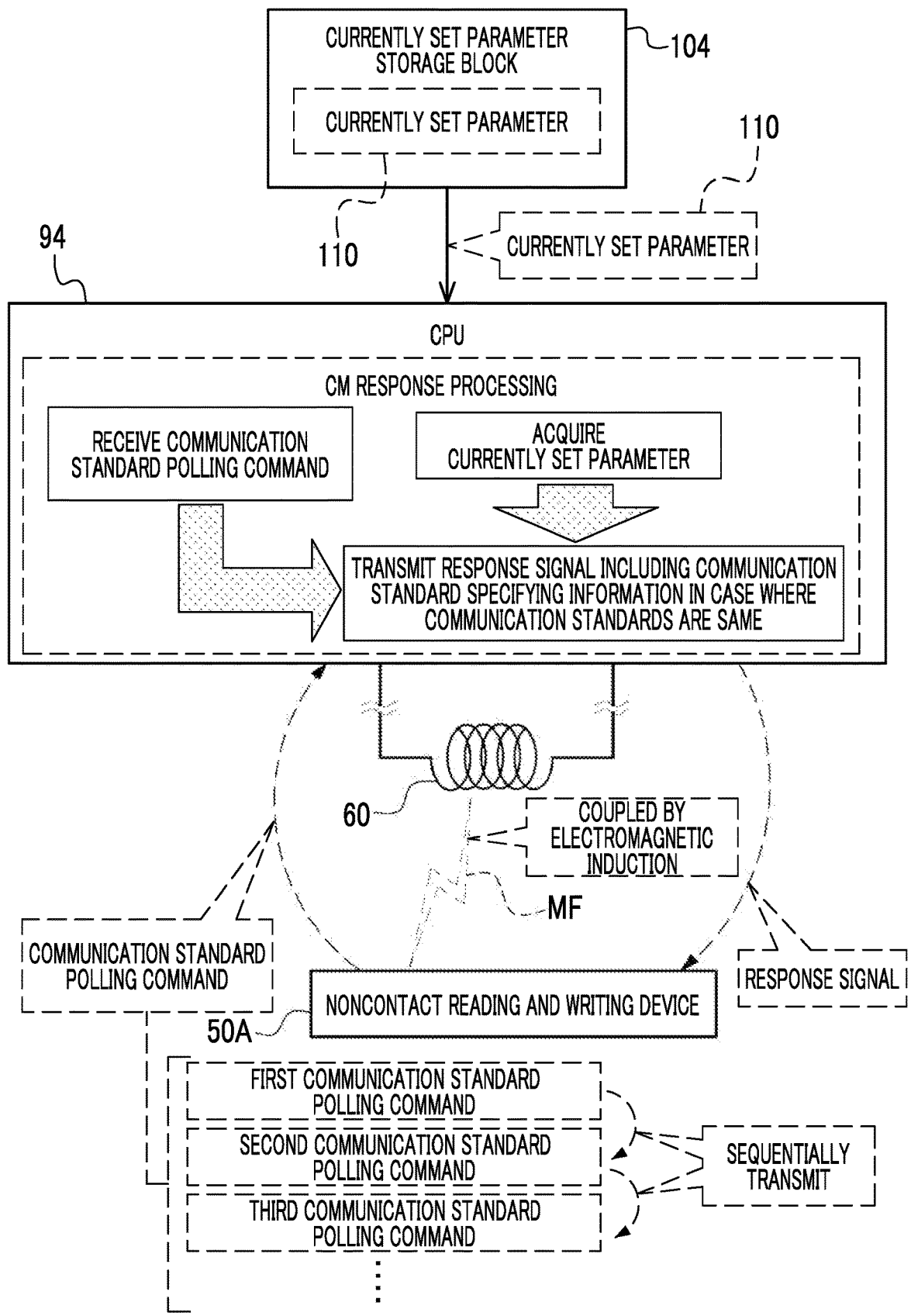
FIG. 14 is a conceptual diagram showing an example of contents of CM response processing.

As shown in FIG. 14 as an example, in a case where the noncontact reading and writing device 50A and the antenna coil 60 are coupled by electromagnetic induction, the noncontact reading and writing device 50A transmits the communication standard polling command to the cartridge memory 19. The noncontact reading and writing device 50A sequentially transmits the N-th communication standard polling commands of different communication standards.

In the CM response processing, the CPU 94 receives the communication standard polling command transmitted from the noncontact reading and writing device 50A through the antenna coil 60. In the CM response processing, the CPU 94 acquires the currently set parameter 110 from the currently set parameter storage block 104. Then, in the CM response processing, in a case where a communication standard that is specified from the communication standard polling command received through the antenna coil 60 is the same as the communication standard that is specified from the currently set parameter 110, the CPU 94 generates a response signal including communication standard specifying information capable of specifying the same communication standard, that is, a communication standard set for the cartridge memory 19 and transmits the generated response signal to the noncontact reading and writing device 50A through the antenna coil 60. In a case where the communication standard that is specified from the communication standard polling command received through the antenna coil 60 is not the same as the communication standard that is specified from the currently set parameter 110, the CPU 94 waits for transmission of the communication standard polling command from the noncontact reading and writing device 50A. The response signal including the communication standard specifying information is an example of a "response" according to the technique of the present disclosure.

Figure 15:
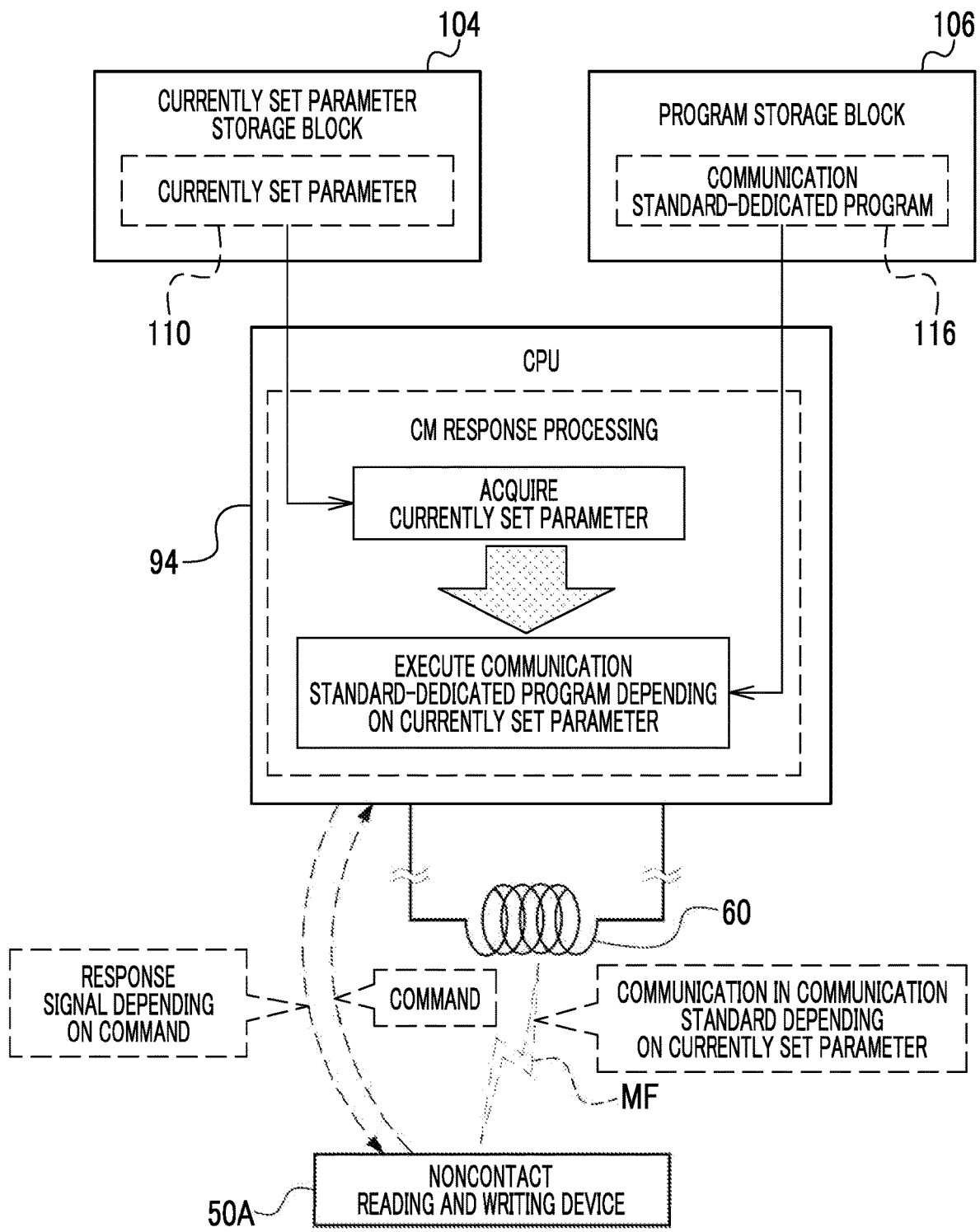
FIG. 15 is a conceptual diagram showing an example of contents of the CM response processing.

In a case where the response signal including the communication standard specifying information is transmitted to the noncontact reading and writing device 50A through the antenna coil 60 by the CPU 94, as shown in FIG. 15 as an example, in the CM response processing, the CPU 94 reads out the communication standard-dedicated program 116 depending on the currently set parameter 110 acquired from the currently set parameter storage block 104, from the program storage block 106 and executes the read-out communication standard-dedicated program 116. With this, the CPU 94 performs communication with the noncontact reading and writing device 50A in the communication standard depending on the currently set parameter 110 through the antenna coil 60. That is, the CPU 94 receives the command transmitted from the noncontact reading and writing device 50A, through the antenna coil 60 and transmits the response signal depending on the received command to the noncontact reading and writing device 50A through the antenna coil 60, based on the communication standard depending on the currently set parameter 110.

Figure 16:
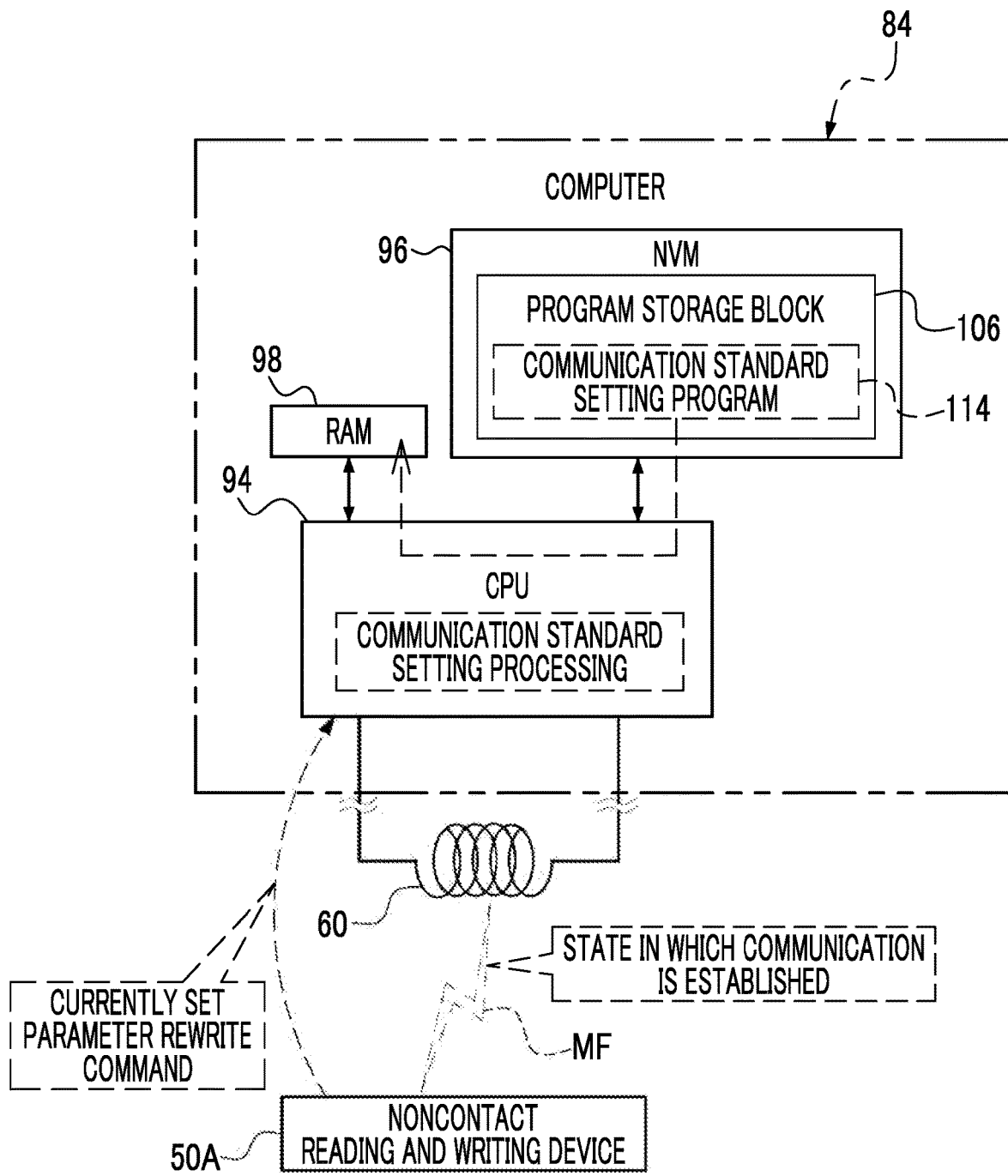
FIG. 16 is a block diagram showing an example of an aspect where a communication standard setting program is executed by the CPU in the computer of the IC chip mounted on the cartridge memory.

As shown in FIG. 16 as an example, in a state in which communication through the antenna coil 60 is established between the CPU 94 and the noncontact reading and writing device 50A based on the communication standard depending on the currently set parameter 110, the currently set parameter rewrite command is transmitted from the noncontact reading and writing device 50A, and the currently set parameter rewrite command is received by the CPU 94 through the antenna coil 60. In a case where the currently set parameter rewrite command is received through the antenna coil 60, the CPU 94 reads out the communication standard setting program 114 from the program storage block 106 and executes the read-out communication standard setting program 114 on the RAM 98. The CPU 94 executes communication standard setting processing (see FIG. 31) following the communication standard setting program 114 that is executed on the RAM 98. Though details will be described below, the communication standard setting processing is processing of setting one of a plurality of communication standards for the cartridge memory 19 in response to a request from the noncontact reading and writing device 50A.

The currently set parameter rewrite command is a signal for instructing the communication standard parameter 108 that is newly set as the currently set parameter 110. As shown in FIG. 17 as an example, in the communication standard setting processing, the CPU 94 acquires the communication standard parameter 108 depending on the currently set parameter rewrite command from the settable parameter storage block 102. Then, in the communication standard setting processing, the CPU 94 overwrites and saves the communication standard parameter 108 acquired from the settable parameter storage block 102 in the currently set parameter storage block 104 to update the currently set parameter 110 in the currently set parameter storage block 104. That is, the currently set parameter 110 in the currently set parameter storage block 104 is rewritten to a new currently set parameter 110 by the CPU 94, so that the currently set parameter 110 in the currently set parameter storage block 104 is updated.

The communication standard that is specified from the currently set parameter 110 stored in the currently set parameter storage block 104 is the communication standard currently set in the IC chip 52. The setting of the communication standard of the IC chip 52 is changed with the rewriting of the currently set parameter 110 in the currently set parameter storage block 104 by the CPU 94.

Figure 18:
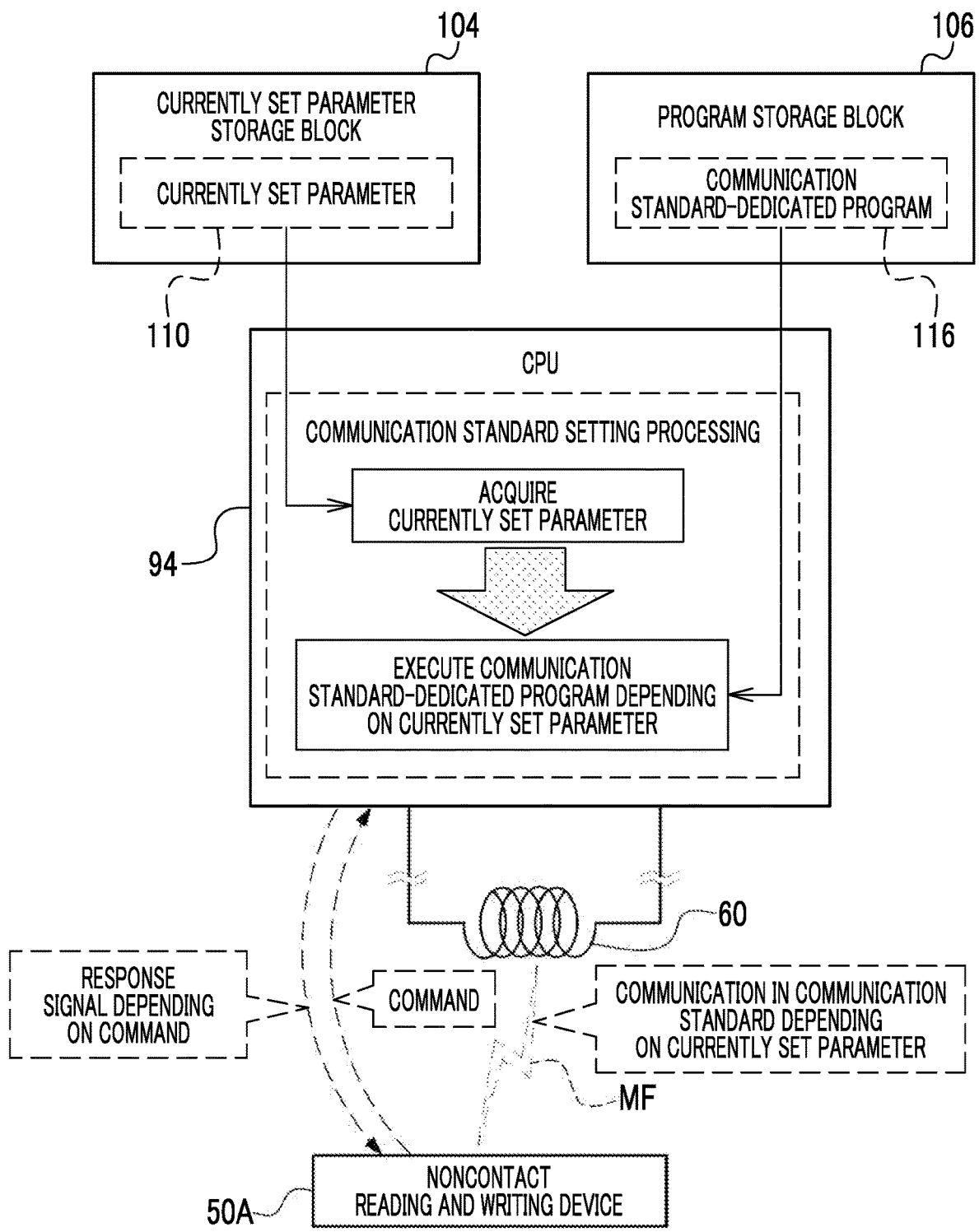
FIG. 18 is a conceptual diagram showing an example of contents of the communication standard setting processing.

As shown in FIG. 18 as an example, the CPU 94 acquires the currently set parameter 110 from the currently set parameter storage block 104. Then, the CPU 94 reads out the communication standard-dedicated program 116 depending on the currently set parameter 110 acquired from the currently set parameter storage block 104, from the program storage block 106 and executes the read-out communication standard-dedicated program 116. The CPU 94 executes the communication standard-dedicated program 116 depending on the currently set parameter 110 to perform communication with the noncontact reading and writing device 50A in the communication standard depending on the currently set parameter 110 through the antenna coil 60.

The CPU 94 communicates with the noncontact reading and writing device 50A in the communication standard depending on the currently set parameter 110 through the antenna coil 60 to transmit the response signal corresponding to the command transmitted from the noncontact reading and writing device 50A, to the noncontact reading and writing device 50A. Specifically, first, the CPU 94 receives the command transmitted from the noncontact reading and writing device 50A through the magnetic field MF, using the antenna coil 60 and decodes the received command. Then, the CPU 94 transmits a response signal corresponding to an order obtained by decoding the command to the noncontact reading and writing device 50 from the antenna coil 60 using the currently set communication standard through the magnetic field MF.

Figure 19:
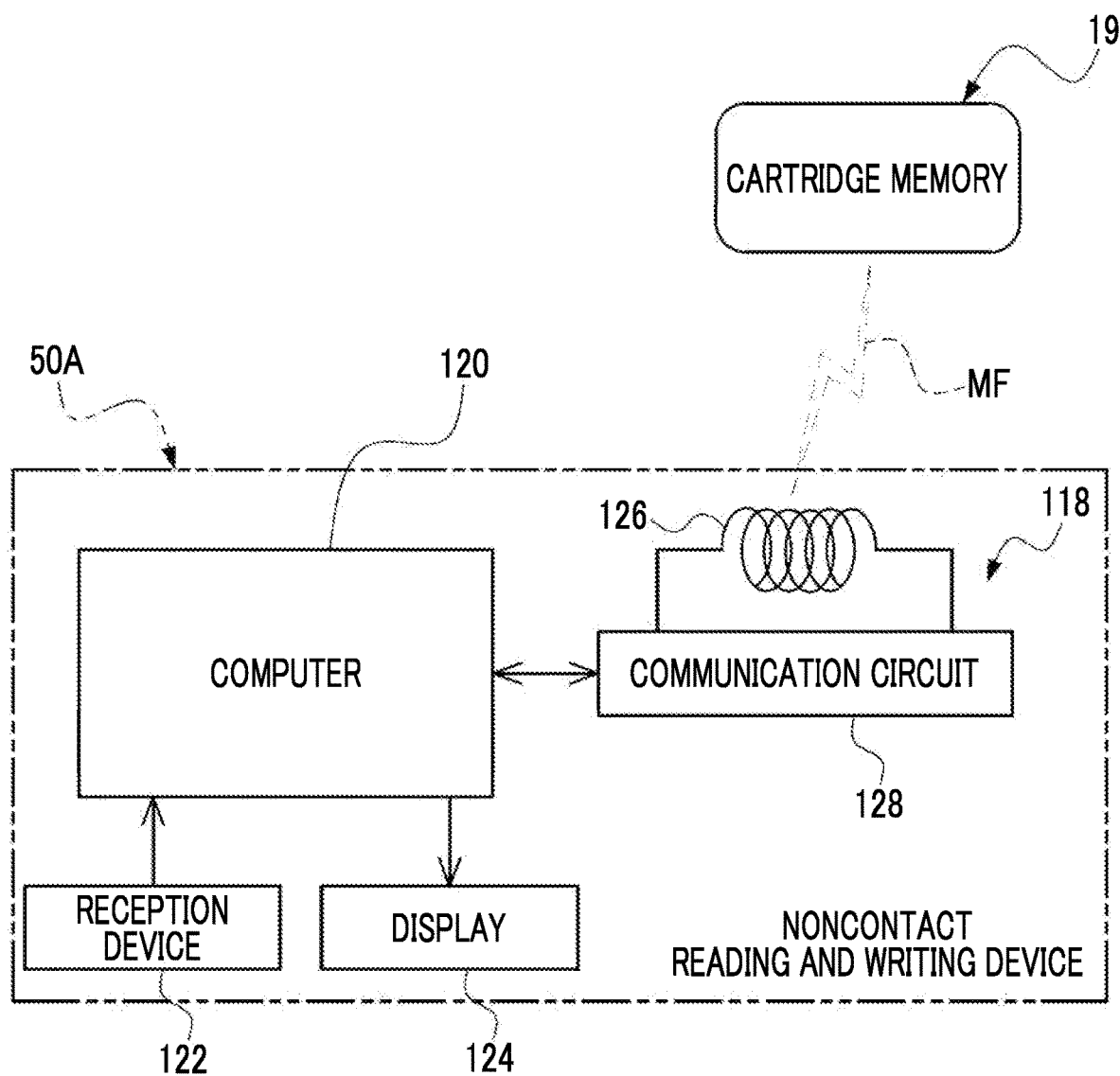
FIG. 19 is a block diagram showing an example of the hardware configuration of an electric system in the noncontact reading and writing device.

As shown in FIG. 19 as an example, the noncontact reading and writing device 50A comprises a transmission and reception device 118, a computer 120, a reception device 122, and a display 124.

The transmission and reception device 118 comprises an antenna coil 126 and a communication circuit 128. The antenna coil 126 is an example of "antenna" according to the technique of the present disclosure. The communication circuit 128 is connected to the computer 120 and operates in response to an instruction from the computer 120. The antenna coil 126 is connected to the communication circuit 128, and the communication circuit 128 emits the magnetic field MF from the antenna coil 126 in response to an instruction from the computer 120. The intensity of the magnetic field MF is adjusted by the communication circuit 128 in response to an instruction from the computer 120.

The communication circuit 128 superimposes the command on the magnetic field MF (also see FIGS. 6 and 7) in response to an instruction from the computer 120 to transmit the command to the cartridge memory 19. The communication circuit 128 receives a response signal superimposed on the magnetic field MF by the cartridge memory 19 through the antenna coil 126, decodes the received response signal, and outputs the response signal to the computer 120. The computer 120 operates in response to the response signal input from the communication circuit 128.

The reception device 122 and the display 124 are connected to the computer 120. The reception device 122 is a keyboard and/or a touch panel, and receives an instruction from a user or the like (hereinafter, simply referred to as a "user or the like") of the noncontact reading and writing device 50A. The computer 120 operates in response to the instruction received by the reception device 122. The display 124 displays various kinds of information under the control of the computer 120. An example of the display 120 is an EL display or a liquid crystal display. Here, although the display 120 has been illustrated as an example of specific means for presenting information, the technique of the present disclosure is not limited thereto, and a speaker, a vibrator, and/or a printer may be used instead of the display 120 or along with the display 120. Any presentation device may be used as long as necessary information can be presented to the user or the like.

Figure 20:
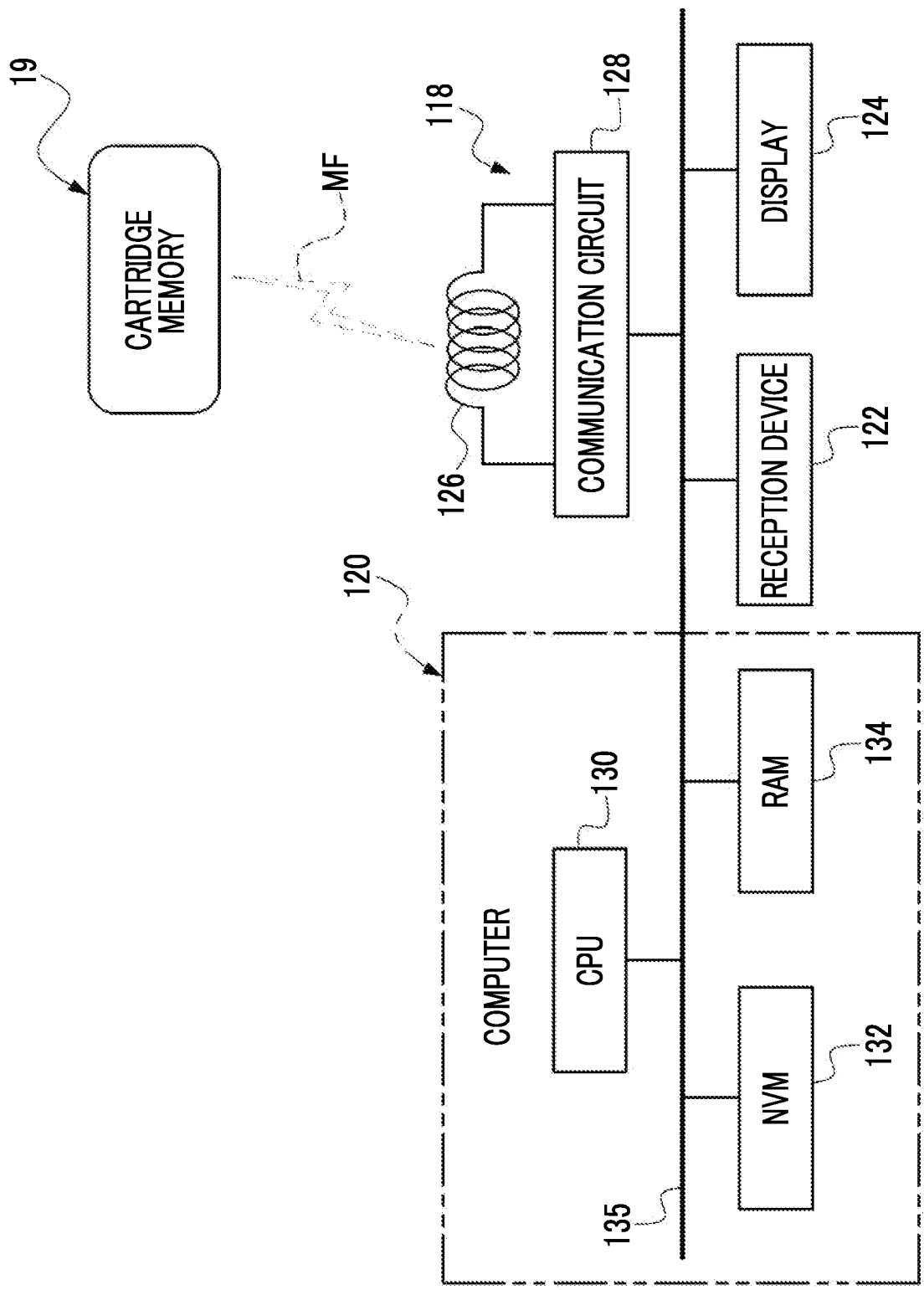
FIG. 20 is a block diagram showing an example of the hardware configuration of an electric system of a computer in the noncontact reading and writing device.

As shown in FIG. 20 as an example, the computer 120 comprises a CPU 130, an NVM 132, and a RAM 134. The CPU 130, the NVM 132, and the RAM 134 are connected to a bus 135.

The CPU 130 is an example of a "processor" according to the technique of the present disclosure, and controls the operation of the computer 120. An example of the NVM 132 is an EEPROM. The EEPROM is merely an example, and for example, a ferroelectric memory may be used instead of the EEPROM or any memory may be used as long as the memory is a non-volatile memory that can be mounted in the noncontact reading and writing device 50A. The RAM 134 temporarily stores various kinds of information and is used as a work memory. An example of the RAM 134 is a DRAM or an SRAM.

The reception device 122 and the display 124 are also connected to the bus 135. Accordingly, the CPU 130 can ascertain an instruction received by the reception device 122 or can control the display 124. The transmission and reception device 118 is also connected to the bus 135 through the communication circuit 128. The transmission and reception device 118 applies the magnetic field MF (also see FIGS. 6 and 7) to the cartridge memory 19 in response to an instruction from the CPU 130 to induce power in the cartridge memory 19, and is coupled to the antenna coil 60 (see FIGS. 10 and 13 to 18) of the cartridge memory 19 by electromagnetic induction. With this, the CPU 130 performs communication with the cartridge memory 19 through the transmission and reception device 118. Here, the communication that is performed between the CPU 130 and the cartridge memory 19 through the transmission and reception device 118 indicates, for example, transmission of the above-described command to the cartridge memory 19 and reception of the response signal from the cartridge memory 19.

By the way, as a communication standard that is generally known and is used in wireless communication between a cartridge memory mounted in a magnetic tape cartridge and a noncontact reading and writing device (a device called a reader/writer), there are a plurality of communication standards, such as ISO18092, ISO14443A, ISO14443B, and ISO15693.

Note that, in a case where there are a plurality of communication standards, since a communication standard may be different by product (for example, for each kind of magnetic tape cartridge of the related art), there is a need for mounting an IC chip corresponding to a communication standard on the cartridge memory. In regard to most of components (for example, a substrate, a wire, and a protective agent) other than the IC chip among a plurality of components used in the cartridge memory, while the same kinds of components can be used among the cartridge memories, in a case where the IC chip should be changed by product, manufacturing cost increases. The same also applied to a noncontact reading and writing device that is generally known. That is, in a case where communication standards that are set for cartridge memories are different, on each occasion, a noncontact reading and writing device of a communication standard conforming to a communication standard set for a cartridge memory should be manufactured or provided, and manufacturing cost increases after all.

In view of such a situation, the noncontact reading and writing device 50A according to the present embodiment is a device that is able to perform communication in each of a plurality of communication standards, and performs communication with the cartridge memory 19 in the communication standard corresponding to the cartridge memory 19 among a plurality of communication standards. Hereinafter, a configuration for realizing such communication will be described in detail.

Figure 21:
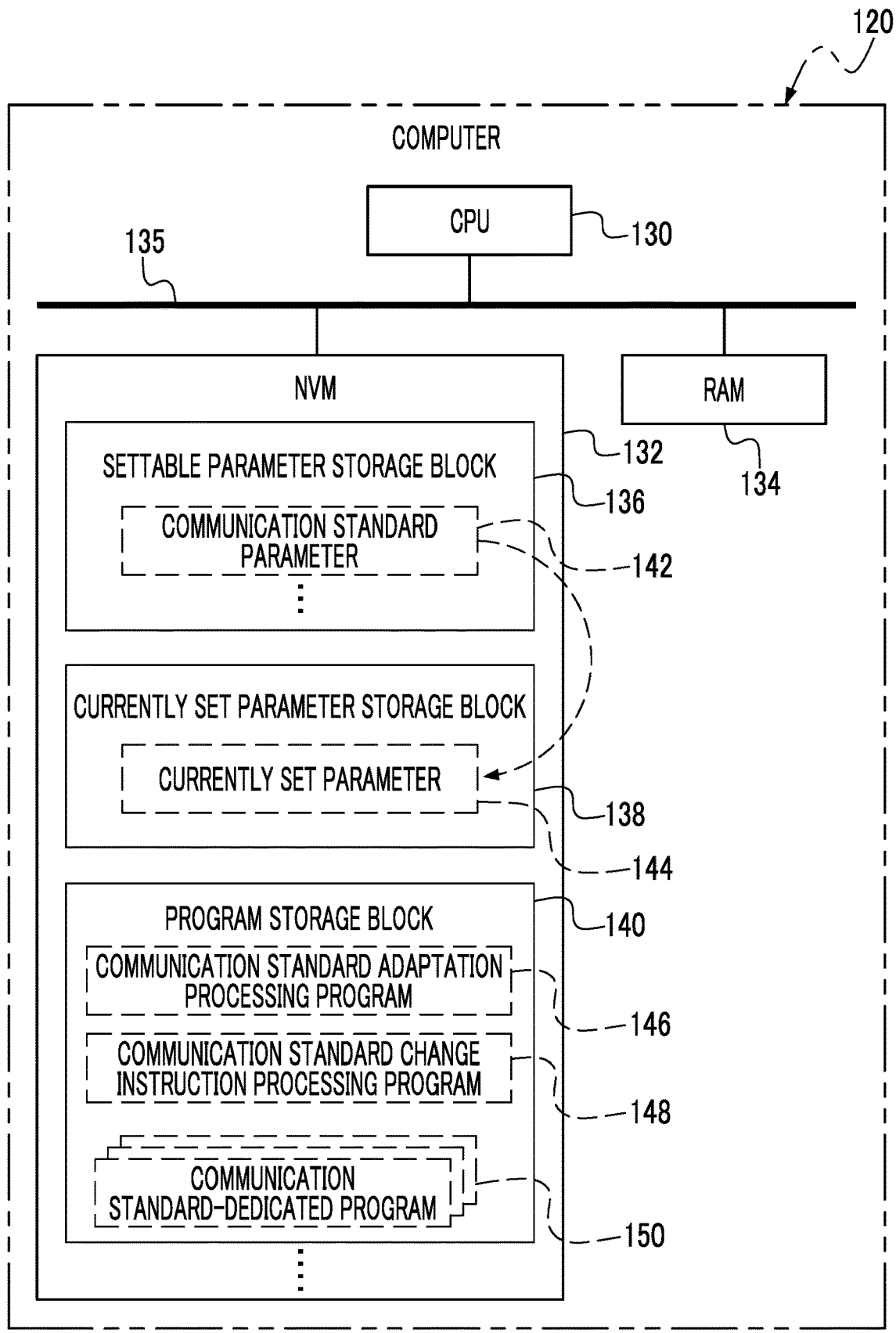
FIG. 21 is a conceptual diagram showing an example of storage contents of an NVM included in the computer in the noncontact reading and writing device.

As shown in FIG. 21 as an example, the NVM 132 has a plurality of storage blocks including a settable parameter storage block 136, a currently set parameter storage block 138, and a program storage block 140.

In the settable parameter storage block 136, a plurality of communication standard parameters 142 that are able to specify communication standards settable in the noncontact reading and writing device 50A are stored. The currently set parameter 144 is stored in the currently set parameter storage block 138. The currently set parameter 144 is the communication standard parameter 142 corresponding to the communication standard currently set in the noncontact reading and writing device 50A among a plurality of communication standard parameters 142. Hereinafter, for convenience of description, description will be provided on the premise that any communication standard parameter 142 is stored as the currently set parameter 144 in the currently set parameter storage block 138.

In the program storage block 140, a communication standard adaptation processing program 146, a communication standard change instruction processing program 148, and a plurality of communication standard-dedicated programs 150 are stored. The communication standard adaptation processing program 146 is an example of a "program" according to the technique of the present disclosure.

A plurality of communication standard-dedicated programs 150 correspond to a plurality of communication standard parameters 142 on a one-to-one basis. The CPU 130 reads out the communication standard-dedicated program 150 corresponding to the currently set parameter 144 stored in the currently set parameter storage block 138 from the program storage block 140 and executes the read-out communication standard-dedicated program 150 to realize communication in the communication standard corresponding to the currently set parameter 144 stored in the currently set parameter storage block 138.

The communication standard that is specified from the currently set parameter 144 stored in the currently set parameter storage block 138 is the communication standard that is currently set in the noncontact reading and writing device 50A. That is, the CPU 130 executes the communication standard-dedicated program 150 corresponding to the currently set parameter 144 stored in the currently set parameter storage block 138, whereby the noncontact reading and writing device 50A can perform communication with the cartridge memory 19 in the currently set communication standard through the antenna coil 126 (see FIGS. 19 and 20).

Figure 22:
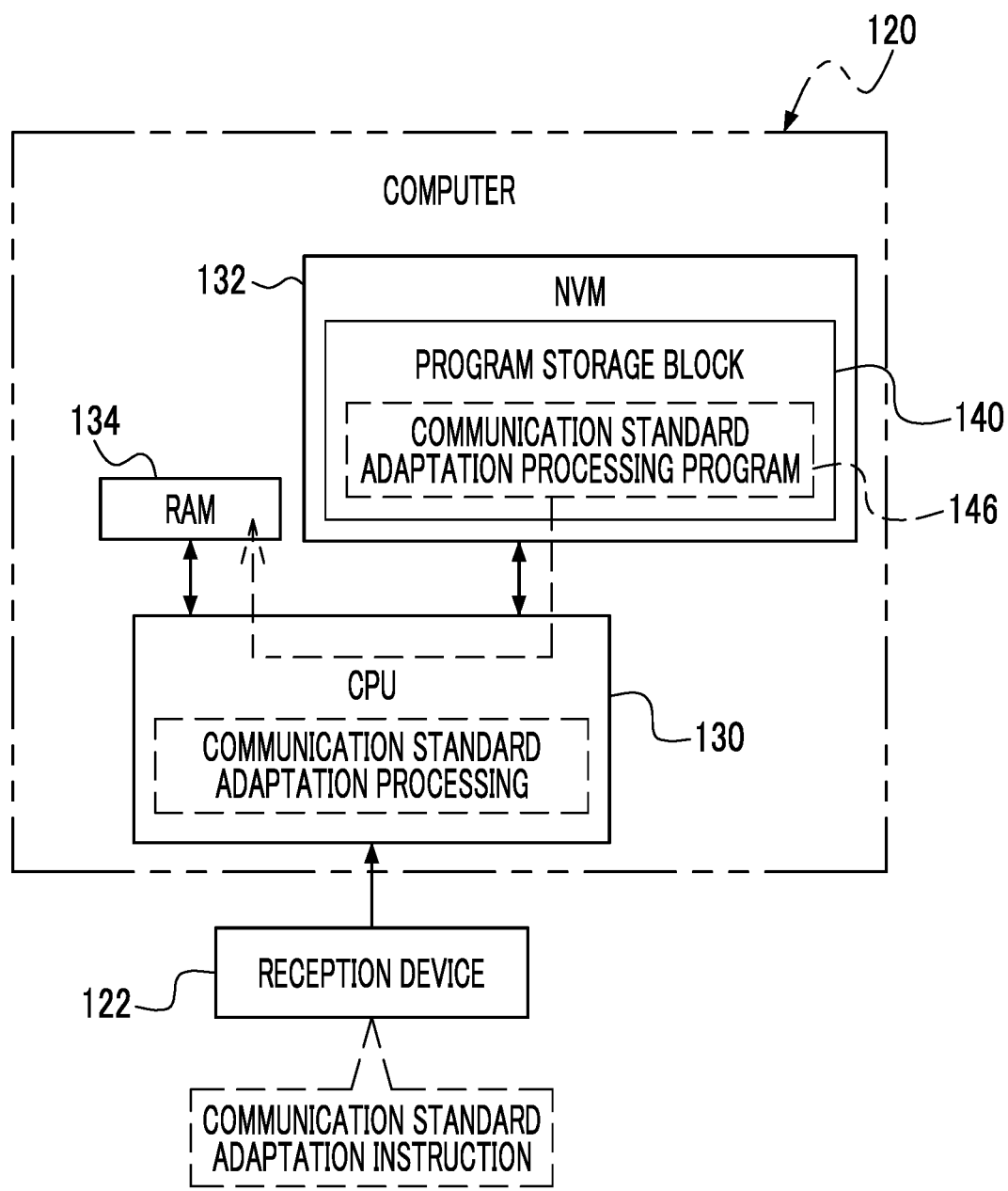
FIG. 22 is a block diagram showing an example of an aspect where a communication standard adaptation processing program is executed by a CPU in the computer in the noncontact reading and writing device.

As shown in FIG. 22 as an example, in a case where an instruction (in the example shown in FIG. 22, "communication standard adaptation instruction") to start communication standard adaptation processing is received by the reception device 122, the CPU 130 reads out the communication standard adaptation processing program 146 from the program storage block 140 and executes the read-out communication standard adaptation processing program 146 on the RAM 134. The CPU 130 executes communication standard adaptation processing following the communication standard adaptation processing program 146 that is executed on the RAM 134. The communication standard adaptation processing is processing of adapting the communication standard set for the noncontact reading and writing device 50A to the communication standard set in the cartridge memory 19. The communication standard adaptation processing is an example of "specific processing" according to the technique of the present disclosure.

The CPU 130 is able to communicate with the cartridge memory 19 in each of a plurality of communication standards, and executes the communication standard adaptation processing to perform communication with the cartridge memory 19 in the communication standard corresponding to the cartridge memory 19 among a plurality of communication standards.

The CPU 130 transmits the communication standard polling command to the cartridge memory 19 through the antenna coil 126 to specify the communication standard set for the cartridge memory 19 among a plurality of communication standards based on the response signal obtained from the cartridge memory 19. Then, the CPU 130 performs communication with the cartridge memory 19 in the specified communication standard. Hereinafter, this will be described in more detail.

Figure 23:
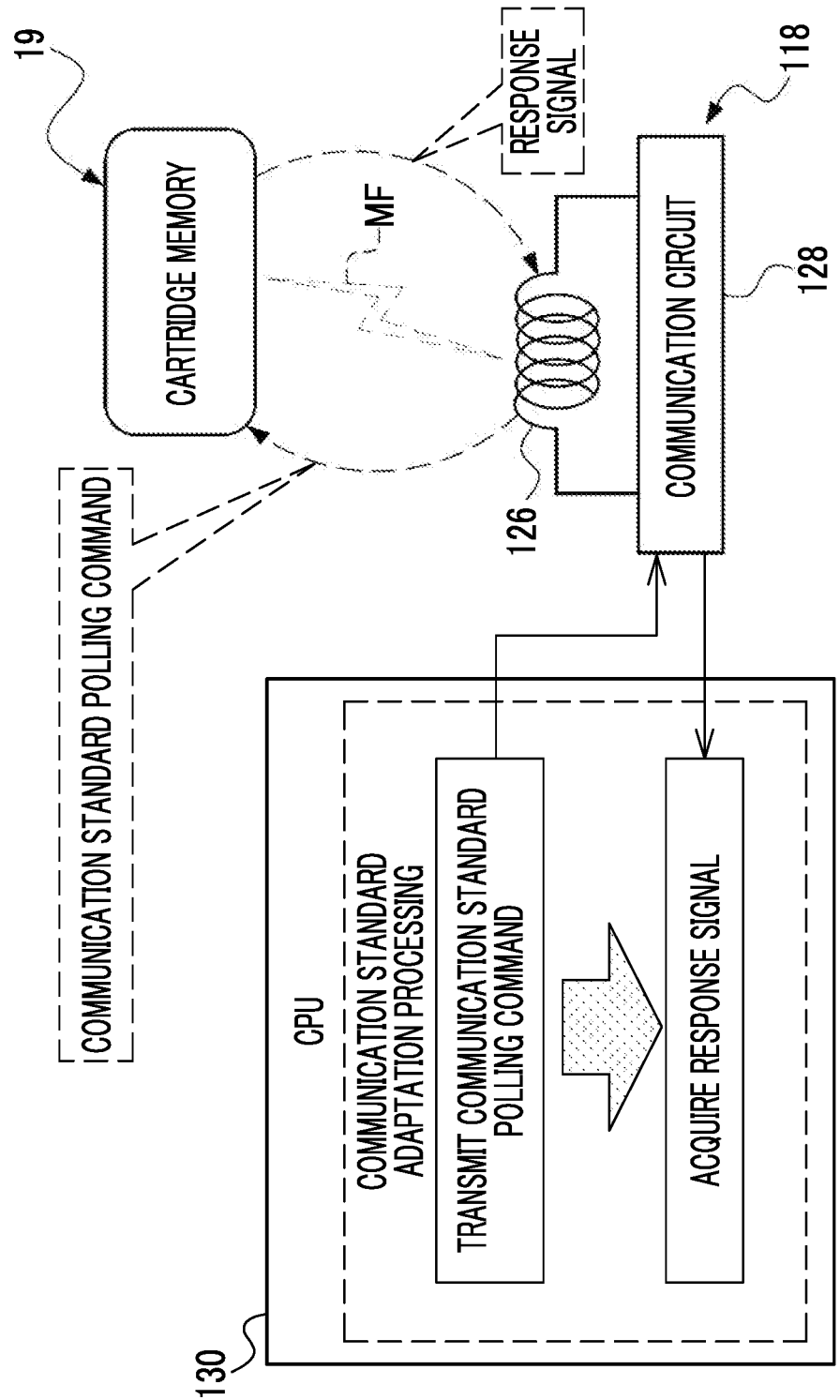
FIG. 23 is a conceptual diagram showing an example of contents of communication standard adaptation processing.

As shown in FIG. 23 as an example, in the communication standard adaptation processing, first, the CPU 130 causes the transmission and reception device 118 to transmit the communication standard polling command to the cartridge memory 19. The transmission of the polling command is performed in an order of a first communication standard polling command, a second communication standard polling command, a third communication standard polling command, . . . as described above. Then, in a case where the response signal transmitted from the cartridge memory is received by the transmission and reception device 118 with the transmission of the communication standard polling command to the cartridge memory 19, the CPU 130 acquires the response signal received by the transmission and reception device 118, from the transmission and reception device 118.

Figure 24:
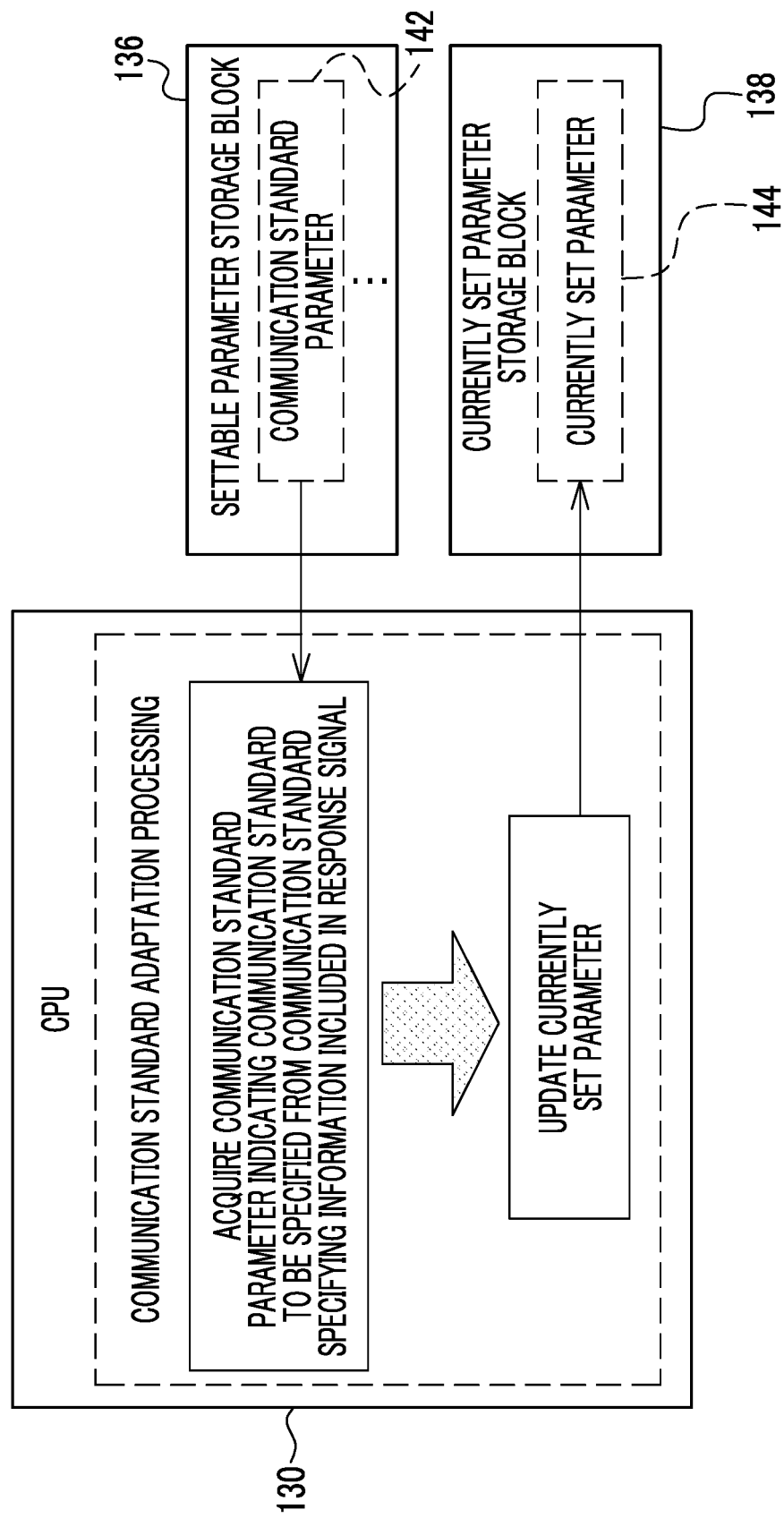
FIG. 24 is a conceptual diagram showing an example of contents of the communication standard adaptation processing.

As shown in FIG. 24 as an example, in the communication standard adaptation processing, the CPU 130 acquires the communication standard parameter 142 indicating the communication standard that is specified from the communication standard specifying information included in the response signal acquired from the transmission and reception device 118, from the settable parameter storage block 136. Then, in the communication standard adaptation processing, the CPU 130 overwrites and saves the communication standard parameter 142 acquired from the settable parameter storage block 136 in the currently set parameter storage block 138 to update the currently set parameter 144 in the currently set parameter storage block 138. That is, the currently set parameter 144 in the currently set parameter storage block 138 is rewritten to a new currently set parameter 144 by the CPU 130, so that the currently set parameter 144 in the currently set parameter storage block 138 is updated.

The communication standard that is specified from the currently set parameter 144 stored in the currently set parameter storage block 138 is the communication standard that is currently set in the noncontact reading and writing device 50A. The setting of the communication standard of the noncontact reading and writing device 50A is changed by rewriting of the currently set parameter 144 in the currently set parameter storage block 138 by the CPU 130.

Figure 25:
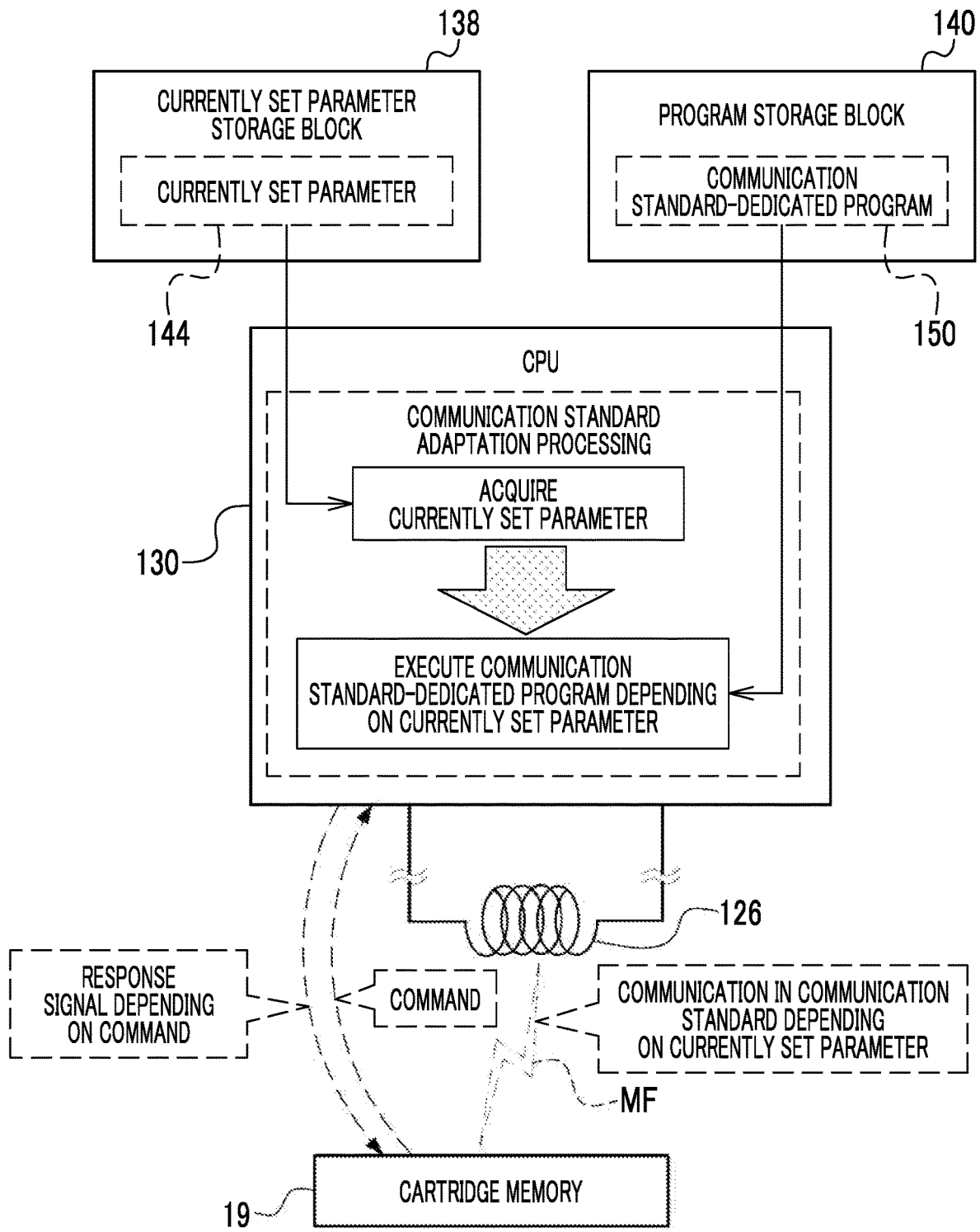
FIG. 25 is a conceptual diagram showing an example of contents of the communication standard adaptation processing.

As shown in FIG. 25 as an example, in the communication standard adaptation processing, the CPU 130 acquires the currently set parameter 144 from the currently set parameter storage block 138. Then, the CPU 130 reads out the communication standard-dedicated program 150 depending on the currently set parameter 144 acquired from the currently set parameter storage block 138, from the program storage block 140 and executes the read-out communication standard-dedicated program 150. The CPU 130 executes the communication standard-dedicated program 150 depending on the currently set parameter 144 to perform communication with the cartridge memory 19 in the communication standard depending on the currently set parameter 144 through the antenna coil 126.

The CPU 130 communicates with the cartridge memory 19 in the communication standard depending on the currently set parameter 144 through the antenna coil 126 to transmit the command to the cartridge memory 19. As described above, the cartridge memory 19 receives the command transmitted from the noncontact reading and writing device 50A through the magnetic field MF and decodes the received command. Then, the cartridge memory 19 transmits a response signal corresponding to an order obtained by decoding the command to the noncontact reading and writing device 50 in the currently set communication standard through the magnetic field MF. The CPU 130 receives the response signal transmitted from the cartridge memory 19 through the magnetic field MF, through the antenna coil 126.

Figure 26:
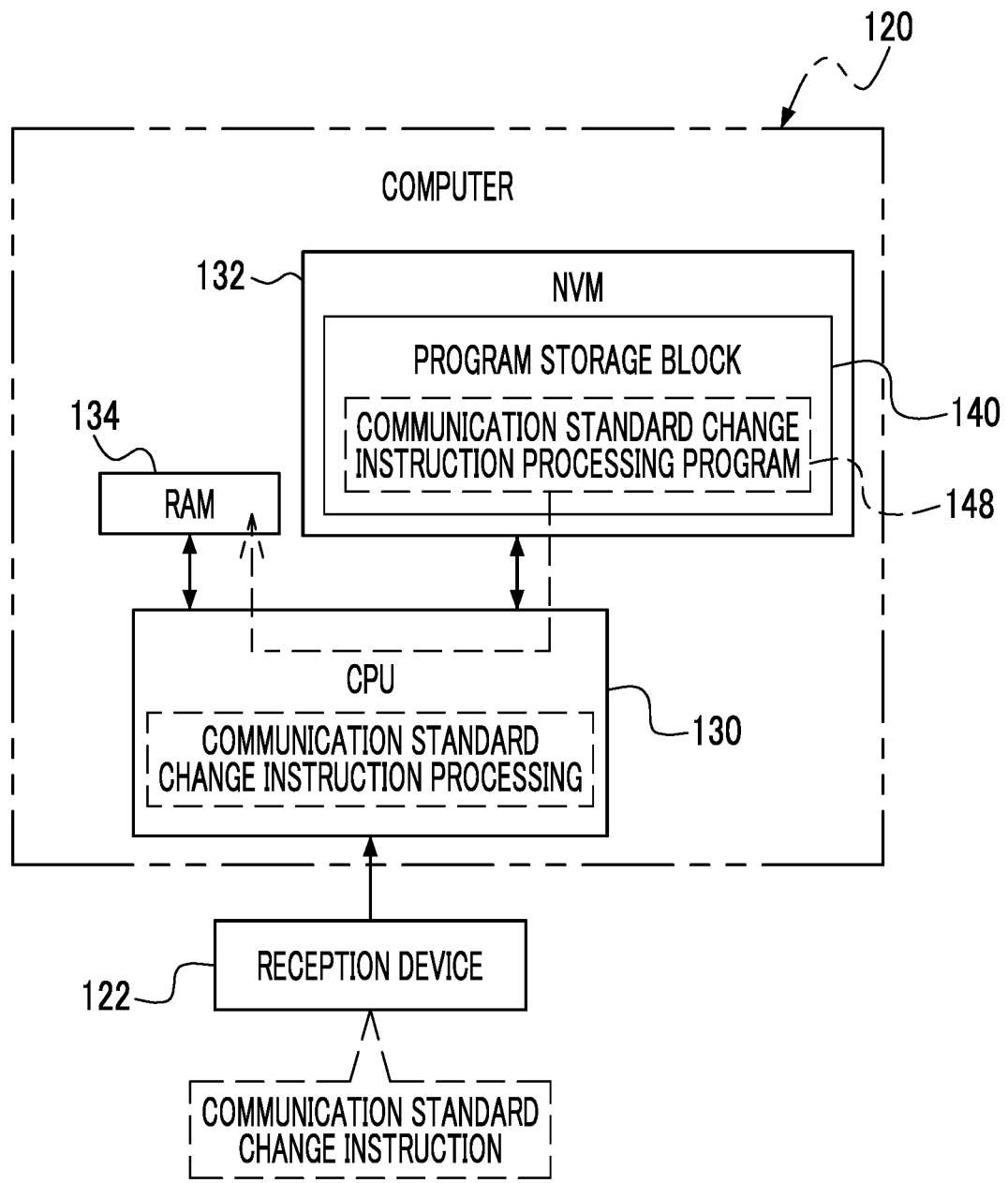
FIG. 26 is a block diagram showing an example of an aspect where a communication standard change instruction processing program is executed by the CPU in the computer in the noncontact reading and writing device.

As shown in FIG. 26 as an example, in a case where an instruction (in the example shown in FIG. 26, "communication standard change instruction") to change the communication standard is received by the reception device 122, the CPU 130 reads out the communication standard change instruction processing program 148 from the program storage block 140 and executes the read-out communication standard change instruction processing program 148 on the RAM 134. The CPU 130 executes communication standard change instruction processing following the communication standard change instruction processing program 148 that is executed on the RAM 134. The communication standard change instruction includes an instruction (for example, an instruction of a communication standard requested by the user or the like) of a communication standard after change.

The communication standard change instruction processing is processing of instructing the cartridge memory 19 to change the communication standard. In a case where the communication standard adaptation processing is executed by the CPU 130, first, as shown in FIG. 27 as an example, communication is performed between the CPU 130 and the cartridge memory 19 in the communication standard depending on the currently set parameter 144 (see FIG. 25). That is, the communication standard adaptation processing is executed by the CPU 130, whereby communication between the CPU 130 and the cartridge memory 19 is established in the communication standard set for the cartridge memory 19 among a plurality of communication standards. Then, in a state in which communication between the CPU 130 and the cartridge memory 19 is established, in the communication standard change instruction processing, the CPU 130 transmits the above-described currently set parameter rewrite command to the cartridge memory 19 through the antenna coil 126.

Figure 28:
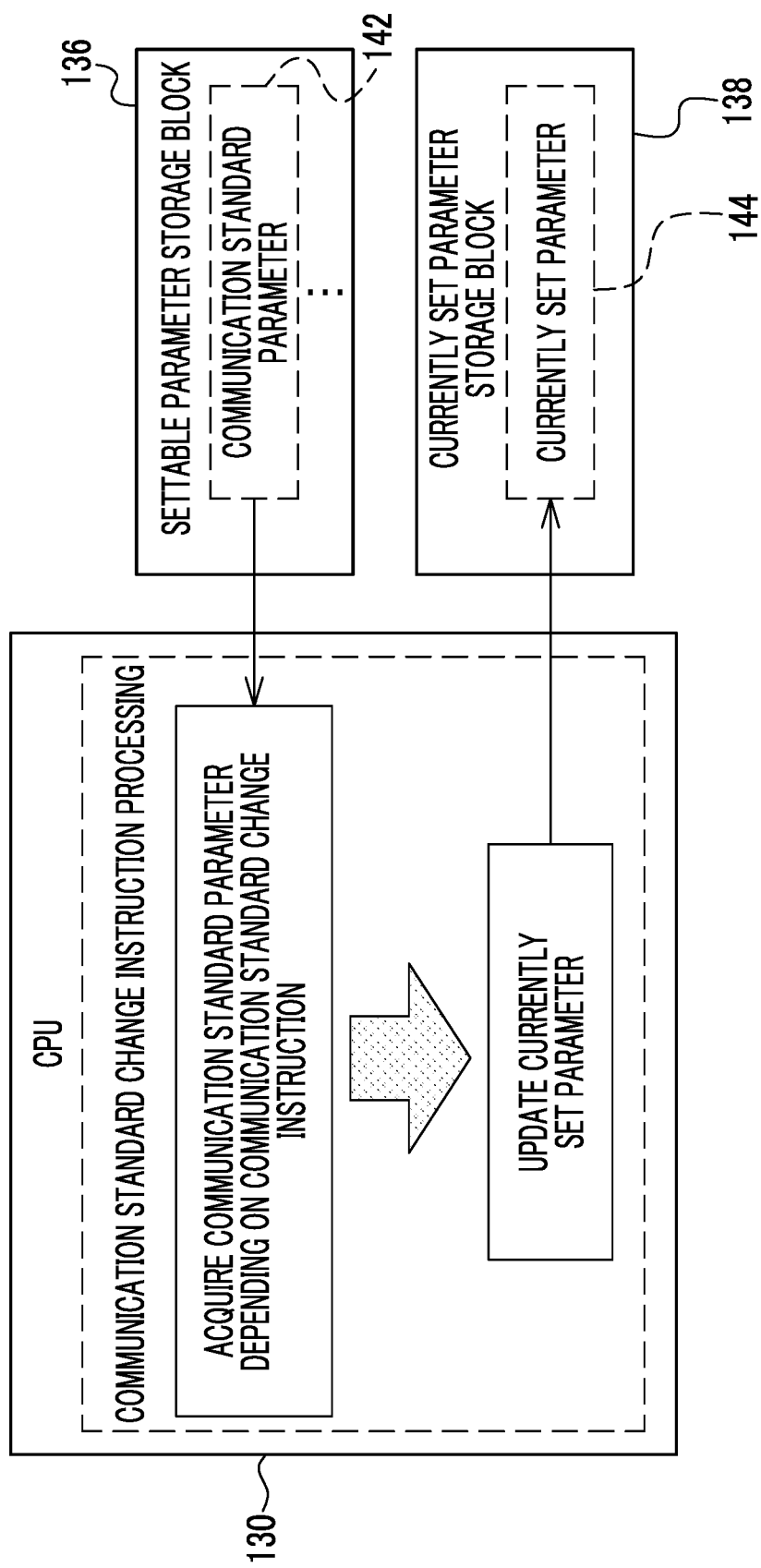
FIG. 28 is a conceptual diagram showing an example of contents of the communication standard change instruction processing.

As shown in FIG. 28 as an example, in the communication standard change instruction processing, the CPU 130 acquires the communication standard parameter 142 corresponding to the communication standard depending on the communication standard change instruction received by the reception device 122, from the settable parameter storage block 136. Then, in the communication standard change instruction processing, the CPU 130 overwrites and saves the communication standard parameter 142 acquired from the settable parameter storage block 136 in the currently set parameter storage block 138 to update the currently set parameter 144 in the currently set parameter storage block 138.

In the cartridge memory 19, a plurality of communication standards are selectively set in response to an instruction given from the outside, that is, the currently set parameter rewrite command (see FIG. 17). In the magnetic tape system 2, in a case where a plurality of communication standards are selectively set for the cartridge memory 19 in response to the instruction given from the outside, the CPU 130 performs communication with the cartridge memory 19 in the communication standard set for the cartridge memory 19 among a plurality of communication standards.

Figure 29:
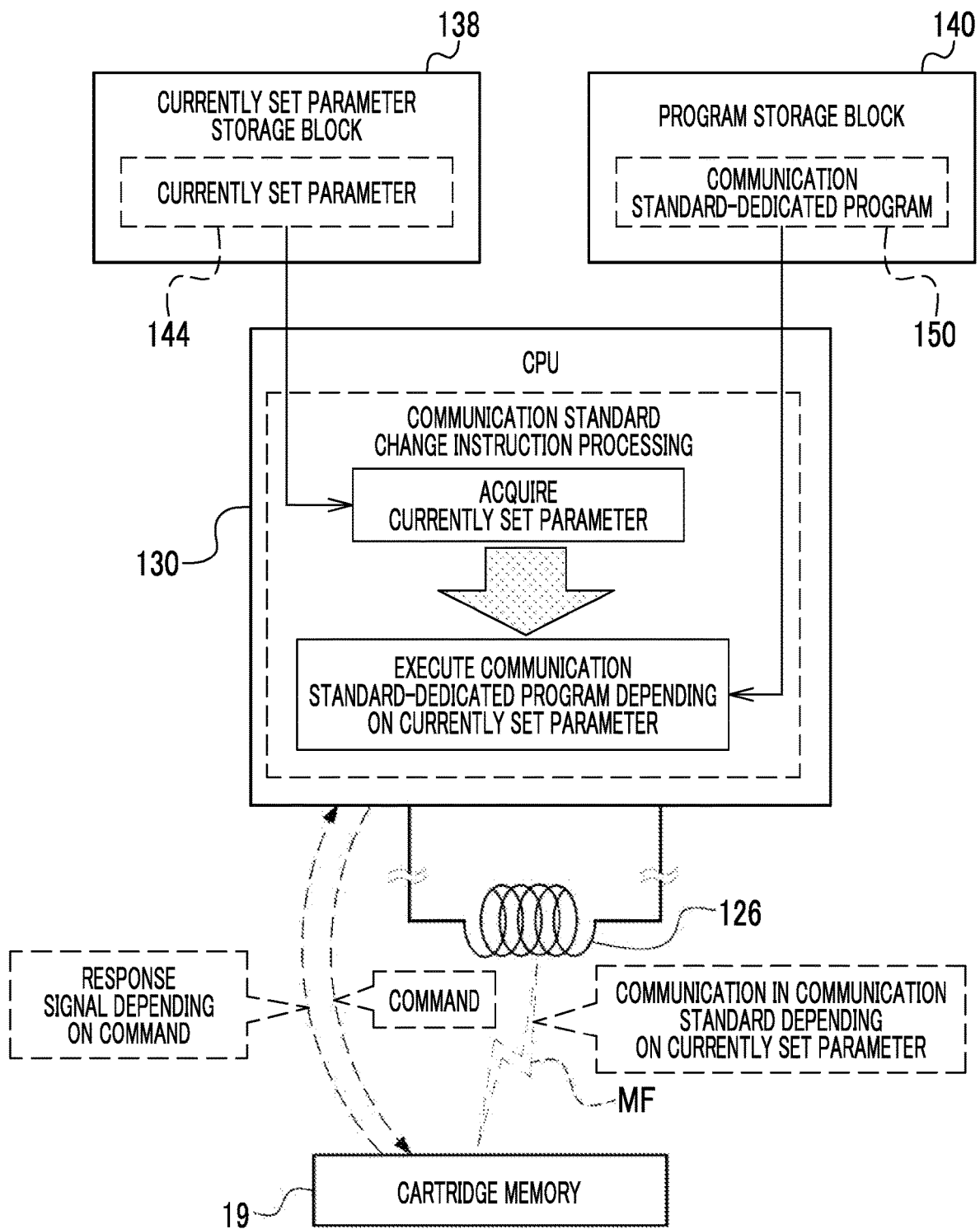
FIG. 29 is a conceptual diagram showing an example of contents of the communication standard change instruction processing.

To realize such communication, as shown in FIG. 29 as an example, in the communication standard change instruction processing, the CPU 130 acquires the currently set parameter 144 from the currently set parameter storage block 138. Then, the CPU 130 reads out the communication standard-dedicated program 150 depending on the currently set parameter 144 acquired from the currently set parameter storage block 138, from the program storage block 140 and executes the read-out communication standard-dedicated program 150. The CPU 130 executes the communication standard-dedicated program 150 depending on the currently set parameter 144 to perform communication with the cartridge memory 19 in the communication standard depending on the currently set parameter 144 through the antenna coil 126.

The CPU 130 communicates with the cartridge memory 19 in the communication standard depending on the currently set parameter 144 through the antenna coil 126 to transmit the command to the cartridge memory 19. As described above, the cartridge memory 19 receives the command transmitted from the noncontact reading and writing device 50A through the magnetic field MF and decodes the received command. Then, the cartridge memory 19 transmits a response signal corresponding to an order obtained by decoding the command to the noncontact reading and writing device 50 in the currently set communication standard through the magnetic field MF. The CPU 130 receives the response signal transmitted from the cartridge memory 19 through the magnetic field MF, through the antenna coil 126.

Next, the operations of the magnetic tape system 2 will be described referring to FIGS. 30 to 33.

Figure 30:
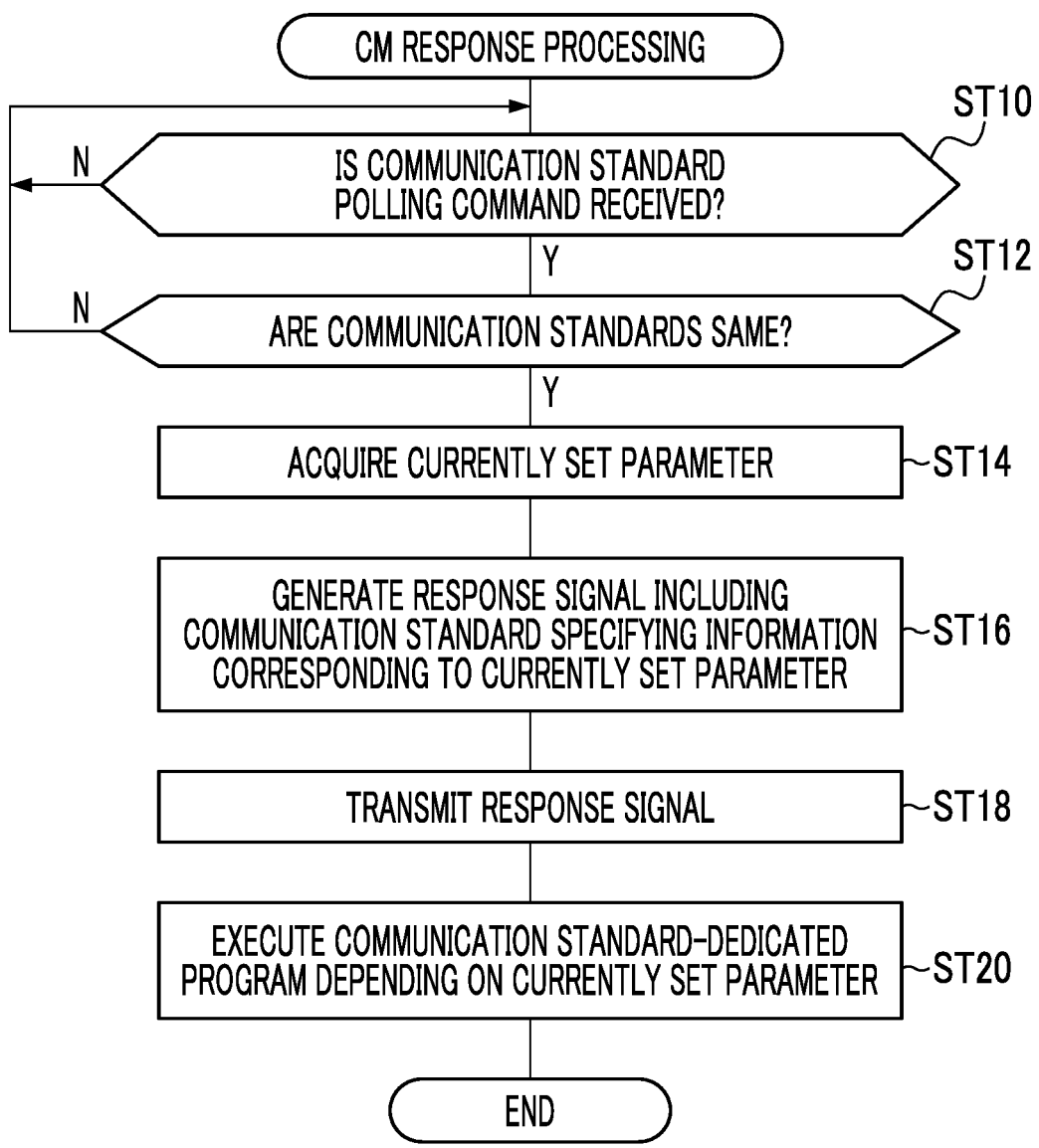
FIG. 30 is a flowchart illustrating an example of a flow of the CM response processing.
Figure 31:
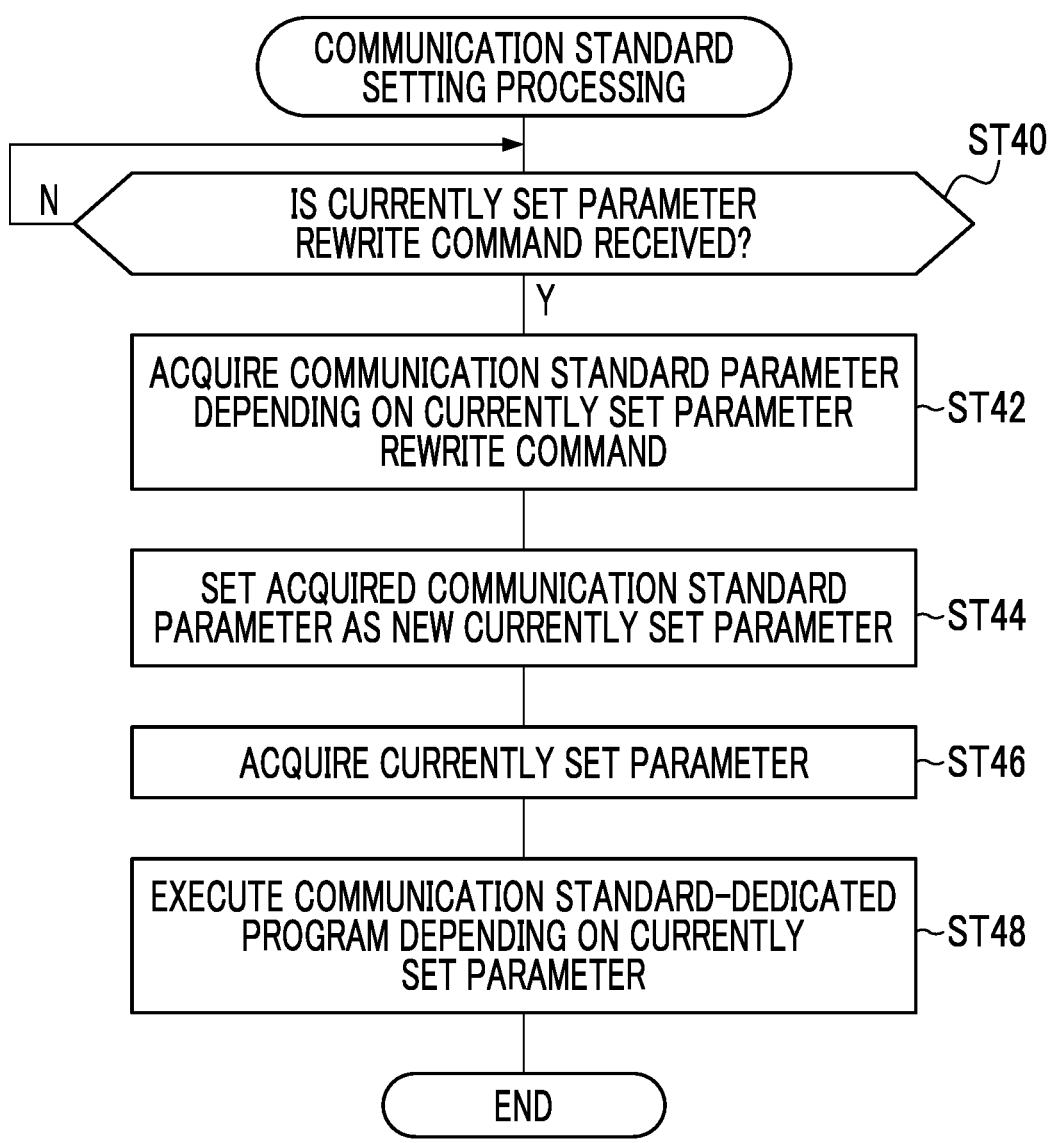
FIG. 31 is a flowchart illustrating an example of a flow of the communication standard setting processing.
Figure 32:
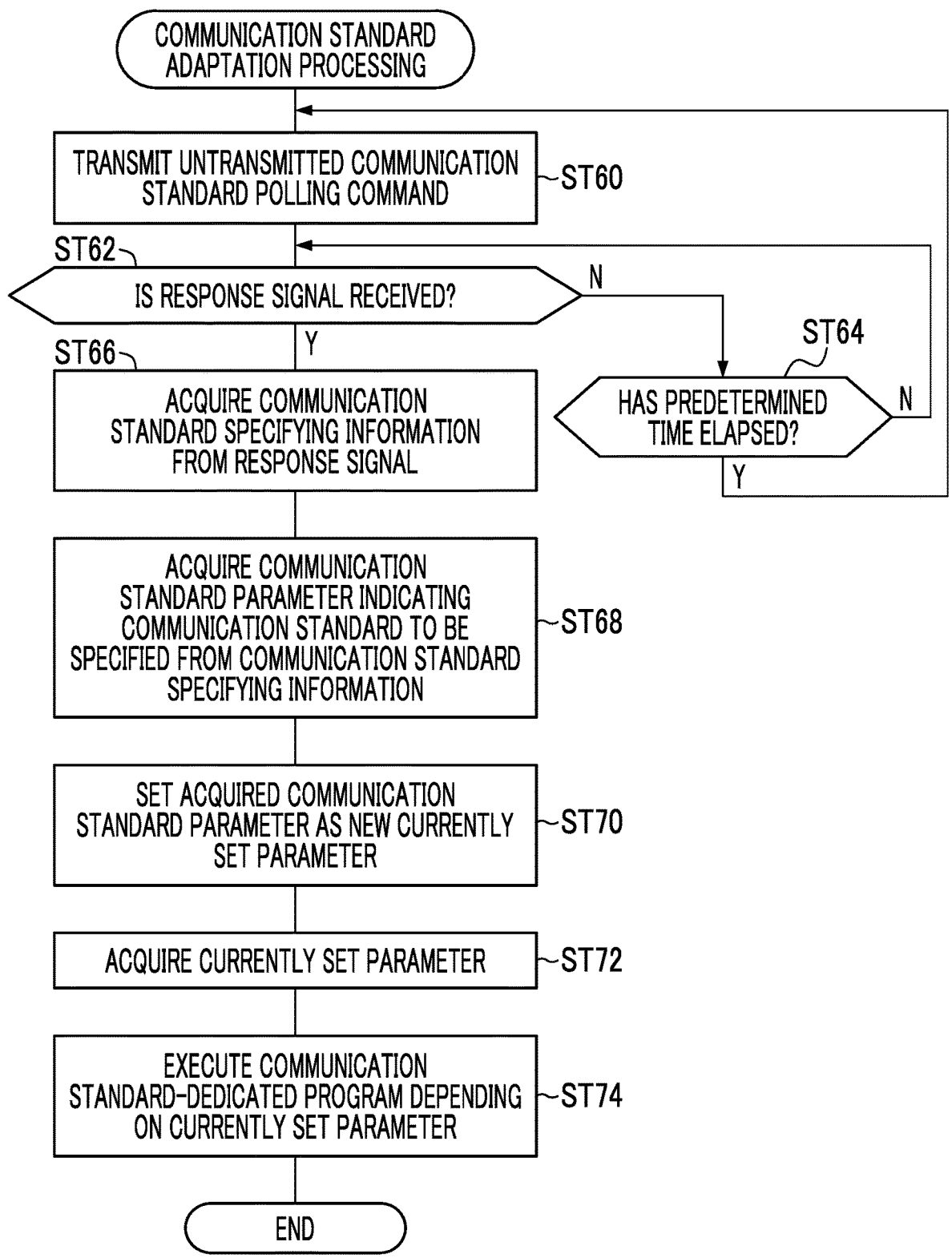
FIG. 32 is a flowchart illustrating an example of a flow of the communication standard adaptation processing.
Figure 33:
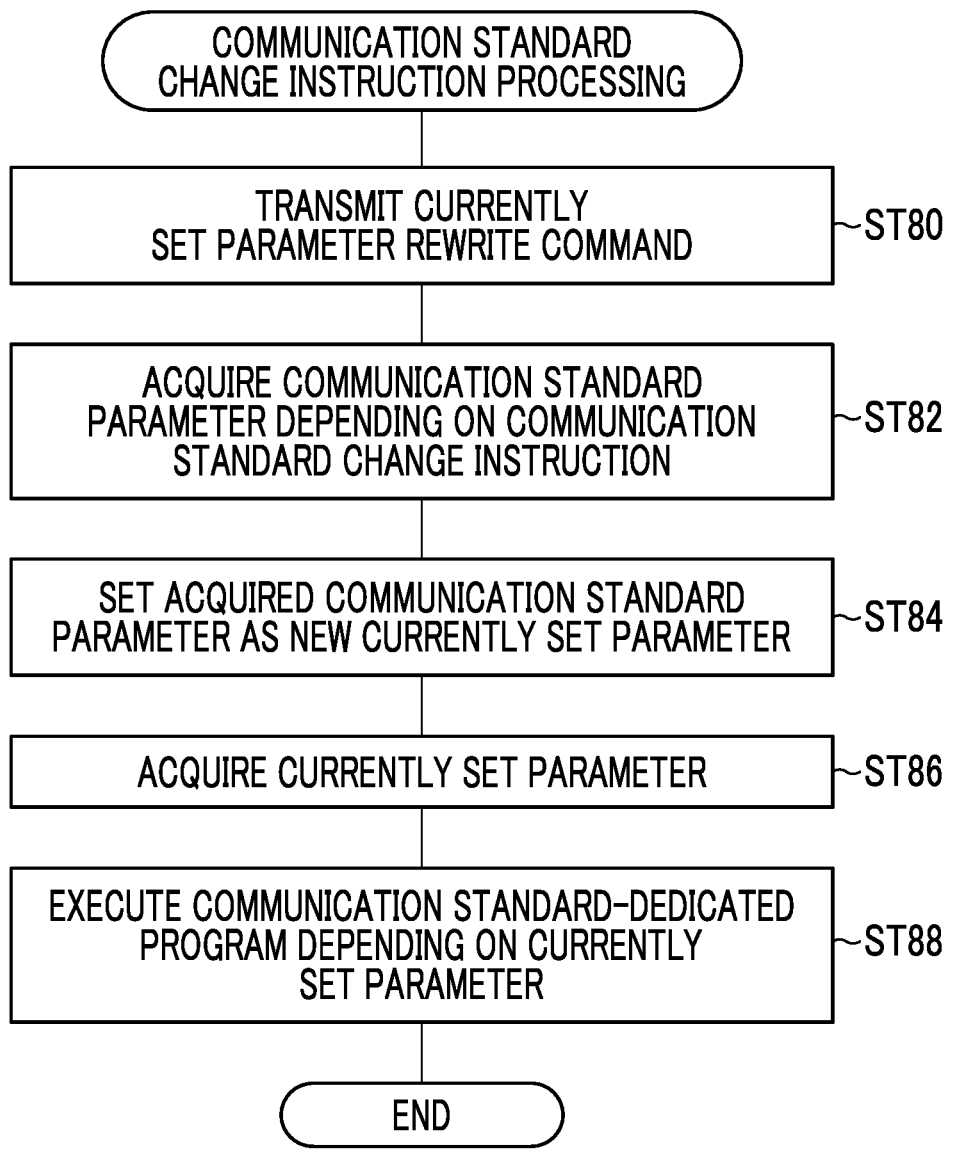
FIG. 33 is a flowchart illustrating an example of a flow of the communication standard change instruction processing.

In FIG. 30, an example of a flow of the CM response processing that is executed by the CPU 94 of the cartridge memory 19 is illustrated by a flowchart. In FIG. 31, an example of a flow of the communication standard setting processing that is executed by the CPU 94 of the cartridge memory 19 is illustrated by a flowchart. In FIG. 32, an example of a flow of the communication standard adaptation processing that is executed by the CPU 130 of the noncontact reading and writing device 50A is illustrated by a flowchart. The flow of the communication standard adaptation processing shown in FIG. 32 is an example of a "method for operating a noncontact communication device" according to the technique of the present disclosure. In FIG. 33, an example of a flow of the communication standard change instruction processing that is executed by the CPU 130 of the noncontact reading and writing device 50A is illustrated by a flowchart.

In the CM response processing shown in FIG. 30, first, in Step ST10, the CPU 94 determines whether or not the communication standard polling command (see Step ST60 shown in FIG. 32) transmitted from the noncontact reading and writing device 50A is received by the antenna coil 60. In Step ST10, in a case where the communication standard polling command transmitted from the noncontact reading and writing device 50A is not received by the antenna coil 60, determination is made to be negative, and the determination of Step ST10 is performed again. In Step ST10, in a case where the communication standard polling command transmitted from the noncontact reading and writing device 50A is received by the antenna coil 60, determination is made to be affirmative, and the CM response processing proceeds to Step ST12.

In Step ST12, the CPU 94 determines whether or not the communication standard that is specified from the communication standard polling command received by the antenna coil 60 is the same as the communication standard that is specified from the currently set parameter 110 stored in the currently set parameter storage block 104. In Step ST12, in a case where the communication standard that is specified from the communication standard polling command received by the antenna coil 60 is different from the communication standard that is specified from the currently set parameter 110 stored in the currently set parameter storage block 104, determination is made to be negative, and the CM response processing proceeds to Step ST10. In Step ST12, in a case where the communication standard that is specified from the communication standard polling command received by the antenna coil 60 is the same as the communication standard that is specified from the currently set parameter 110 stored in the currently set parameter storage block 104, determination is made to be affirmative, and the CM response processing proceeds to Step ST14.

In Step ST14, the CPU 94 acquires the currently set parameter 110 from the currently set parameter storage block 104, and thereafter, the CM response processing proceeds to Step ST16.

In Step ST16, the CPU 94 generates the response signal including the communication standard specifying information capable of specifying the communication standard that is specified from the currently set parameter 110 acquired in Step ST14, and thereafter, CM response processing proceeds to Step ST18.

In Step ST18, the CPU 94 transmits the response signal generated in Step ST16 to the noncontact reading and writing device 50A through the antenna coil 60, and thereafter, CM response processing proceeds to Step ST20.

In Step ST20, the CPU 94 reads out the communication standard-dedicated program 116 depending on the currently set parameter 110 acquired in Step ST14 from the program storage block 106 and executes the read-out communication standard-dedicated program 116. The CPU 94 executes the communication standard-dedicated program 116 to perform communication with the noncontact reading and writing device 50A in the communication standard depending on the currently set parameter 110. After the processing of Step ST20 is executed, the CM response processing ends.

In the communication standard setting processing shown in FIG. 31, first, in Step ST40, the CPU 94 determines whether or not the currently set parameter rewrite command (see Step ST80 shown in FIG. 33) transmitted from the noncontact reading and writing device 50A is received by the antenna coil 60. In Step ST40, in a case where the currently set parameter rewrite command transmitted from the noncontact reading and writing device 50A is not received by the antenna coil 60, determination is made to be negative, and the determination of Step ST40 is performed again. In Step ST40, in a case where the currently set parameter rewrite command transmitted from the noncontact reading and writing device 50A is received by the antenna coil 60, determination is made to be affirmative, and the communication standard setting processing proceeds to Step ST42.

In Step ST42, the CPU 94 acquires the communication standard parameter 108 depending on the currently set parameter rewrite command received by the antenna coil 60, from the settable parameter storage block 102, and thereafter, communication standard setting processing proceeds to Step ST44.

In Step ST44, the CPU 94 overwrites and saves the communication standard parameter 108 acquired in Step ST42 in the currently set parameter storage block 104 to set the communication standard parameter 108 acquired in Step ST42 as a new currently set parameter 110, and thereafter, communication standard setting processing proceeds to Step ST48.

In Step ST46, the CPU 94 acquires the currently set parameter 110 from the currently set parameter storage block 104, and thereafter, communication standard setting processing proceeds to Step ST48.

In Step ST48, the CPU 94 reads out the communication standard-dedicated program 116 depending on the currently set parameter 110 acquired in Step ST46 from the program storage block 106 and executes the read-out communication standard-dedicated program 116. The CPU 94 executes the communication standard-dedicated program 116 to perform communication with the noncontact reading and writing device 50A in the communication standard depending on the currently set parameter 110. After the processing of Step ST48 is executed, the communication standard setting processing ends.

In the communication standard adaptation processing shown in FIG. 32, first, in Step ST60, the CPU 130 transmits the untransmitted communication standard polling command among a plurality of communication standard polling commands corresponding to a plurality of communication standards to the cartridge memory 19 through the transmission and reception device 118, and thereafter, communication standard adaptation processing proceeds to Step ST62.

In Step ST62, the CPU 130 determines whether or not the response signal (see Step ST18 shown in FIG. 30) transmitted from the cartridge memory 19 is received by the transmission and reception device 118. In Step ST62, in a case where the response signal transmitted from the cartridge memory 19 is not received by the transmission and reception device 118, determination is made to be negative, and the communication standard adaptation processing proceeds to Step ST64. In Step ST62, in a case where the response signal transmitted from the cartridge memory 19 is received by the transmission and reception device 118, determination is made to be affirmative, and the communication standard adaptation processing proceeds to Step ST66.

In Step ST64, the CPU 130 determines whether or not a predetermined time (for example, a time designated in advance in a range of several seconds to tens of seconds) has elapsed after the processing of Step ST60 is executed. In Step ST64, in a case where the predetermined time has not elapsed after the processing of Step ST60 is executed, determination is made to be negative, and the communication standard adaptation processing proceeds to Step ST62. In Step ST64, in a case where the predetermined time has elapsed after the processing of Step ST60 is executed, determination is made to be affirmative, and the communication standard adaptation processing proceeds to Step ST60.

In Step ST66, the CPU 130 acquires the communication standard specifying information from the response signal received by the transmission and reception device 118 in Step ST62, and thereafter, communication standard adaptation processing proceeds to Step ST68.

In Step ST68, the CPU 130 acquires the communication standard parameter 142 indicating the communication standard that is specified from the communication standard specifying information acquired in Step ST66, from the settable parameter storage block 136, and thereafter, communication standard adaptation processing proceeds to Step ST70.

In Step ST70, the CPU 130 overwrites and saves the communication standard parameter 142 acquired in Step ST68 in the currently set parameter storage block 138 to set the communication standard parameter 142 acquired in Step ST68 as a new currently set parameter 144, and thereafter, communication standard adaptation processing proceeds to Step ST72.

In Step ST72, the CPU 130 acquires the currently set parameter 144 from the currently set parameter storage block 138, and thereafter, communication standard adaptation processing proceeds to Step ST74.

In Step ST74, the CPU 130 reads out the communication standard-dedicated program 150 depending on the currently set parameter 144 acquired in Step ST72, from the program storage block 140 and executes the read-out communication standard-dedicated program 150. The CPU 130 executes the communication standard-dedicated program 150 to perform communication with the cartridge memory 19 in the communication standard depending on the currently set parameter 144. After the processing of Step ST74 is executed, the communication standard adaptation processing ends.

In the communication standard change instruction processing shown in FIG. 33, first, in Step ST80, the CPU 130 transmits the currently set parameter rewrite command to the cartridge memory 19 in response to the communication standard change instruction received by the reception device 122. Here, the currently set parameter rewrite command indicates a signal for instructing rewriting to the currently set parameter 110 indicating the communication standard corresponding to the communication standard change instruction received by the reception device 122. After the processing of Step ST80 is executed, the communication standard change instruction processing proceeds to Step ST82.

In Step ST82, the CPU 130 acquires the communication standard parameter 142 depending on the communication standard change instruction received by the reception device 122, from the settable parameter storage block 136, and thereafter, communication standard change instruction processing proceeds to Step ST84.

In Step ST84, the CPU 130 overwrites and saves the communication standard parameter 142 acquired in Step ST82 in the currently set parameter storage block 138 to set the communication standard parameter 142 acquired in Step ST68 as the new currently set parameter 144, and thereafter, communication standard change instruction processing proceeds to Step ST86.

In Step ST86, the CPU 130 acquires the currently set parameter 144 from the currently set parameter storage block 138, and thereafter, communication standard change instruction processing proceeds to Step ST88.

In Step ST88, the CPU 130 reads out the communication standard-dedicated program 150 depending on the currently set parameter 144 acquired in Step ST86, from the program storage block 140 and executes the read-out communication standard-dedicated program 150. The CPU 130 executes the communication standard-dedicated program 150 to perform communication with the cartridge memory 19 in the communication standard depending on the currently set parameter 144. After the processing of Step ST88 is executed, the communication standard change instruction processing ends.

As described above, in the magnetic tape system 2, the CPU 130 of the noncontact reading and writing device 50A is a device that is able to perform communication in each of a plurality of communication standards, and performs communication with the cartridge memory 19 in the communication standard corresponding to the cartridge memory 19 among a plurality of communication standards. Therefore, according to this configuration, compared to a case where the noncontact reading and writing device 50A performs noncontact communication with the cartridge memory 19 using only one communication standard, it is possible to allow the noncontact reading and writing device 50A to perform noncontact communication with the cartridge memories 19 of various communication standards.

In the magnetic tape system 2, the communication standard set for the cartridge memory 19 is specified based on the response signal obtained from the cartridge memory 19 with the transmission of the communication standard polling command to the cartridge memory 19 by the CPU 130 of the noncontact reading and writing device 50A, and communication with the cartridge memory 19 is performed in the specified communication standard. Therefore, according to this configuration, even though the user or the like does not ascertain the communication standard set for the cartridge memory 19 in advance, it is possible to allow the noncontact reading and writing device 50A to perform noncontact communication with the cartridge memory 19 in the communication standard set for the cartridge memory 19.

In the magnetic tape system 2, the communication standard specifying information is included in the response signal, and the communication standard specifying information is acquired from the response signal transmitted from the cartridge memory 19 by the CPU 130 of the noncontact reading and writing device 50A. Then, the CPU 130 of the noncontact reading and writing device 50A performs communication with the cartridge memory 19 in the communication standard that is specified from the communication standard specifying information. Therefore, according to this configuration, the noncontact reading and writing device 50A can ascertain the communication standard set for the cartridge memory 19 using the response signal transmitted from the cartridge memory 19.

In the magnetic tape system 2, a plurality of communication standards are selectively set for the cartridge memory 19 in response to the currently set parameter rewrite command transmitted from the noncontact reading and writing device 50A. In this case, the CPU 130 of the noncontact reading and writing device 50A performs communication with the cartridge memory 19 in the communication standard set for the cartridge memory 19 among a plurality of communication standards. Therefore, according to this configuration, even in a case where a plurality of communication standards are selectively set for the cartridge memory 19 in response to the currently set parameter rewrite command transmitted from the noncontact reading and writing device 50A, it is possible to allow the noncontact reading and writing device 50A to perform noncontact communication with the cartridge memory 19 in the communication standard set for the cartridge memory 19.

In the above-described embodiment, although a form example where the communication standard specifying information is included in the response signal, and communication is performed in the communication standard that is specified from the communication standard specifying information acquired from the response signal has been described, the technique of the present disclosure is not limited thereto. For example, in a case where the response signal to the communication standard polling command is received by the transmission and reception device 118, communication between the cartridge memory 19 and the noncontact reading and writing device 50A may be performed in the communication standard that is specified from the communication standard polling command corresponding to the received response signal.

In the above-described embodiment, although a form example of a case where a plurality of communication standards can be selectively set for the cartridge memory 19 has been described, the technique of the present disclosure is not limited thereto, and the communication standard set for the cartridge memory 19 may be fixed to one communication standard. Even in such a case, the communication standard adaptation processing described in the above-described embodiment is executed by the CPU 130 of the noncontact reading and writing device 50, whereby the noncontact reading and writing device 50A can perform communication with the cartridge memory 19 in the same communication standard as the communication standard set for the cartridge memory 19.

In the above-described embodiment, although the noncontact reading and writing device 50A performs communication with the cartridge memory 19 to acquire the communication standard specifying information from the cartridge memory 19 and specifies the communication standard set for the cartridge memory 19 from the acquired communication standard specifying information, the technique of the present disclosure is not limited thereto. For example, the CPU 130 of the noncontact reading and writing device 50A may acquire a feature that is physically given to the magnetic tape cartridge 10 and is able to specify the communication standard set for the cartridge memory 19. In this case, the CPU 130 of the noncontact reading and writing device 50A may specify the communication standard corresponding to the cartridge memory 19 among a plurality of communication standards based on the acquired feature and may perform communication with the cartridge memory 19 in the specified communication standard. Here, the feature that is physically given to the magnetic tape cartridge 10 indicates, for example, at least a shape between a shape and a size of the magnetic tape cartridge 10.

Figure 34:
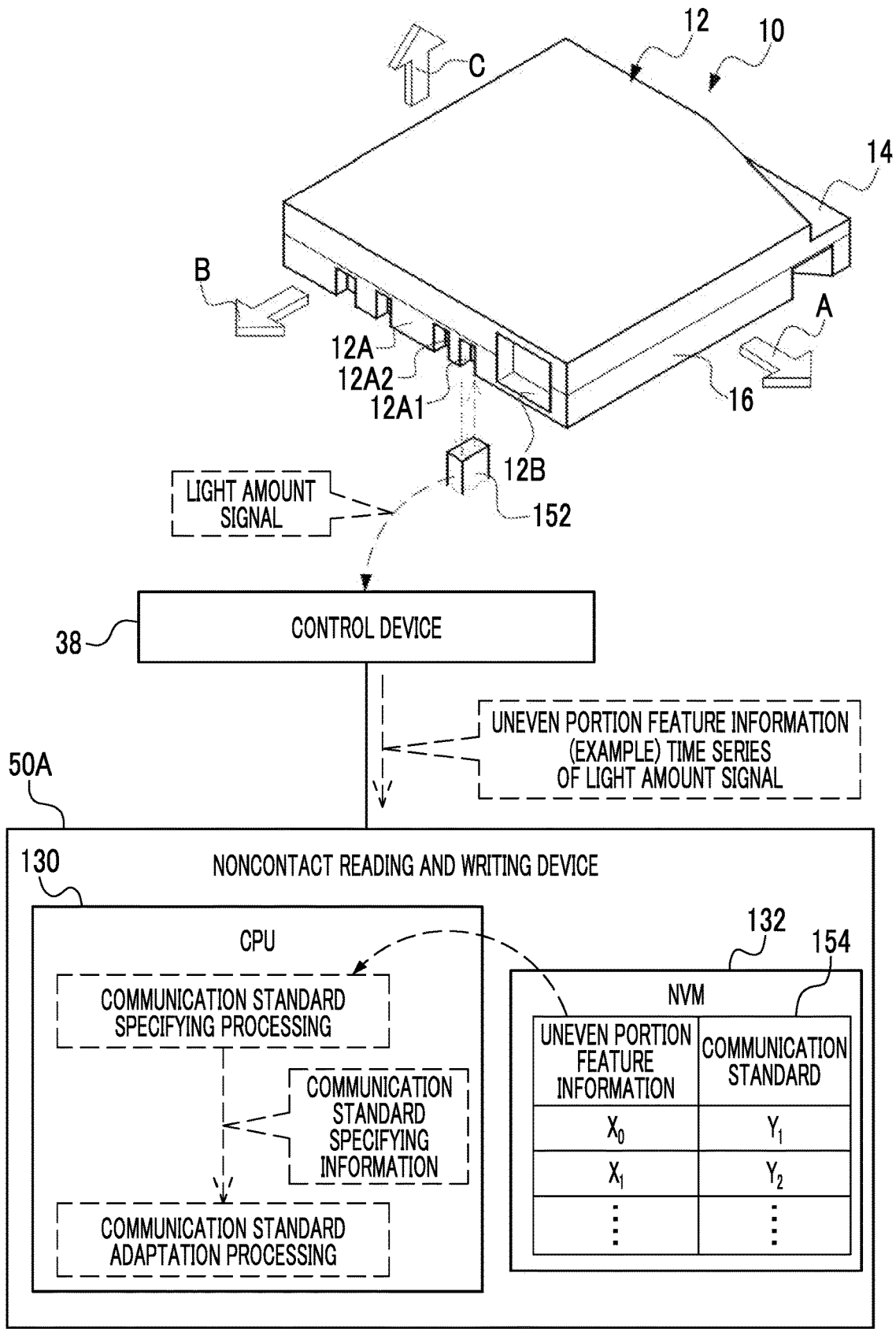
FIG. 34 is a conceptual diagram showing a form example of a case of specifying a communication standard set for a cartridge memory from a plurality of cutouts formed in an outer wall of a magnetic tape cartridge.

In an example shown in FIG. 34, as the feature that is given to the magnetic tape cartridge 10, rectangular parallelepiped cutouts 12A1 and 12A2 with a right side and a downside of the right wall 12A opened are formed in the right wall 12A. Here, although the cutouts 12A1 and 12A2 have been illustrated, at least one of the shape of the cutout, the size of the cutout, or the number of cutouts is different for each communication standard.

Here, although a form example where the cutouts 12A1 and 12A2 are formed in the right wall 12A has been described, the cutouts 12A1 and 12A2 are merely an example, and uneven portions may be formed at positions designated in advance in the outer wall of the magnetic tape cartridge 10. Even in this case, at least one of the shape of the uneven portion, the shape of the uneven portion, or the number of uneven portions is different for each communication standard.

As shown in FIG. 34 as an example, the magnetic tape drive 30 (see FIGS. 1 and 5) comprises an optical sensor 152. The optical sensor 152 is an example of "physical sensor" according to the technique of the present disclosure. The optical sensor 152 is disposed below the right wall 12A. The optical sensor 152 optically detects the cutouts 12A1 and 12A2 in a process in which the magnetic tape cartridge 10 is loaded into the magnetic tape drive 30 along a direction of an arrow A. To specify the geometrical feature of the cutouts 12A1 and 12A2 with excellent accuracy, it is preferable that a speed at which the magnetic tape cartridge 10 is loaded into the magnetic tape drive 30 along the direction of the arrow A is a constant speed.

The optical sensor 152 is, for example, a reflective photosensor, irradiates the cutouts 12A1 and 12A2 with light, and detects a light amount of reflected light reflected from surfaces forming the cutouts 12A1 and 12A2. Here, although the reflective photosensor has been illustrated, the technique of the present disclosure is not limited thereto, and a transmissive photosensor may be employed or other sensors may be employed.

The optical sensor 152 is connected to the control device 38 and outputs a light amount signal indicating the detected light amount to the control device 38. The control device 38 outputs uneven portion feature information based on the input light amount signal to the noncontact reading and writing device 50A. The uneven portion feature information is, for example, a time series of the light amount signal. The time series of the light amount signal represents a feature that is given to the magnetic tape cartridge 10, that is, the size, the shape, an interval, and the like of the cutouts 12A1 and 12A2.

A communication standard table 154 is stored in the NVM 132. The communication standard table 154 is a table in which the uneven portion feature information and the communication standard are associated with each other. That is, in the communication standard table 154, a different communication standard is associated with each of a plurality of kinds of uneven portion feature information.

The CPU 130 of the noncontact reading and writing device 50A derives the communication standard corresponding to the uneven portion feature information input from the control device 38, from the communication standard table 154. The CPU 130 executes the communication standard adaptation processing using the communication standard specifying information capable of specifying the communication standard derived from the communication standard table 154. With this, transmission of the communication standard specifying information to the noncontact reading and writing device 50A by the cartridge memory 19 is not required.

In the example shown in FIG. 34, although a form example where a physical feature, such as the cutouts 12A1 and the 12A2, is given to the magnetic tape cartridge 10 has been shown, the technique of the present disclosure is not limited thereto, and a feature that is physically given to the magnetic tape cartridge 10 may be a mark capable of specifying the communication standard set for the cartridge memory 19. For example, in an example shown in FIG. 35, a matrix type two-dimensional code (for example, a QR code (Registered Trademark)) 156 is attached to the right wall 12A. The communication standard specifying information is included in the matrix type two-dimensional code 156.

Figure 35:
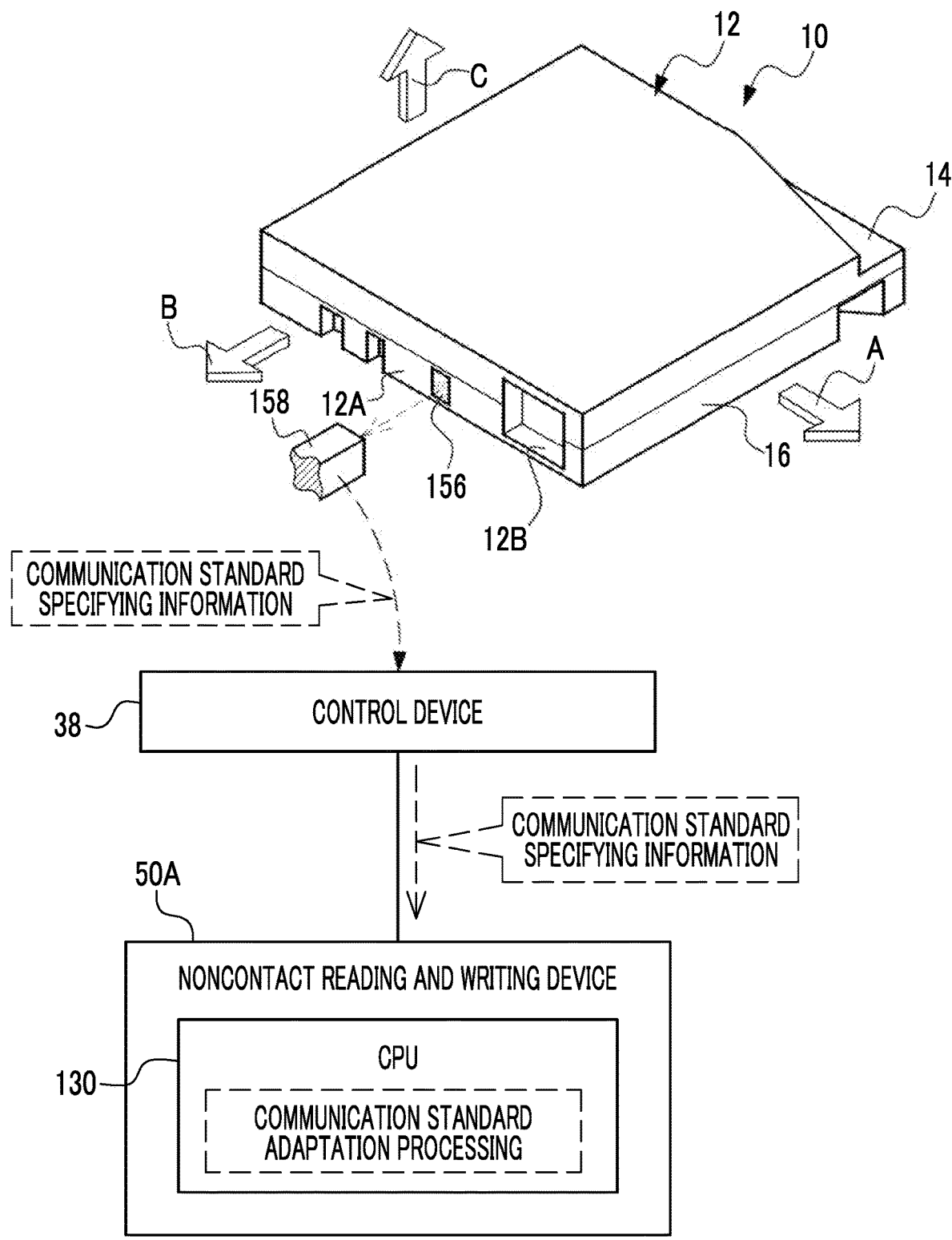
FIG. 35 is a conceptual diagram showing a form example of a case of specifying a communication standard set for a cartridge memory from a mark attached to an outer wall of a magnetic tape cartridge.

As shown in FIG. 35 as an example, the magnetic tape drive 30 (see FIGS. 1 and 5) comprises a QR code reader 158. The QR code reader 158 is disposed at a place facing an attachment position of the matrix type two-dimensional code 156. In a case where the magnetic tape cartridge 10 is loaded into the magnetic tape drive 30, the QR code reader 158 reads the communication standard specifying information from the matrix type two-dimensional code 156.

The QR code reader 158 is connected to the control device 38, and the CPU 130 of the noncontact reading and writing device 50A acquires the communication standard specifying information from the QR code reader 158 through the control device 38 and executes the communication standard adaptation processing using the acquired communication standard specifying information.

Here, although a form example where the CPU 130 of the noncontact reading and writing device 50A acquires the communication standard specifying information from the QR code reader 158 through the control device 38 has been described, the technique of the present disclosure is not limited thereto, and the QR code reader 158 may be directly connected to the noncontact reading and writing device 50A, and the CPU 130 of the noncontact reading and writing device 50A may directly acquire the communication standard specifying information from the QR code reader 158 without passing through the control device 38.

In this way, the matrix type two-dimensional code 156 is used as the feature that is physically given to the magnetic tape cartridge 10, whereby transmission of the communication standard specifying information to the noncontact reading and writing device 50A by the cartridge memory 19 is not required.

In the example shown in FIG. 35, although the matrix type two-dimensional code 156 has been shown, the technique of the present disclosure is not limited thereto, and a two-dimensional barcode and/or any image or a symbol capable of specifying a communication standard may be employed.

In the above-described embodiment, although a form example where various kinds of processing including the communication standard adaptation processing, the communication standard change instruction processing, and the like are executed by the CPU 130 has been described, a processor (for example, the control device 38 or a processor other than the control device 38) of an external device that can communicate with the noncontact reading and writing device 50A may be used as a hardware resource of the noncontact reading and writing device 50A along with the CPU 130 or instead of the CPU 130.

In the above-described embodiment, although a form example where the magnetic tape drive 30 pulls out the magnetic tape MT from the magnetic tape cartridge 10, records data on the pulled-out magnetic tape MT using the magnetic head 36, and reads data from the pulled-out magnetic tape MT using the magnetic head 36 has been described, the technique of the present disclosure is not limited thereto. For example, a magnetic head (not shown) that performs only recording or reading of data with respect to the magnetic tape MT pulled out from the magnetic tape cartridge 10 may be used.

Figure 36:
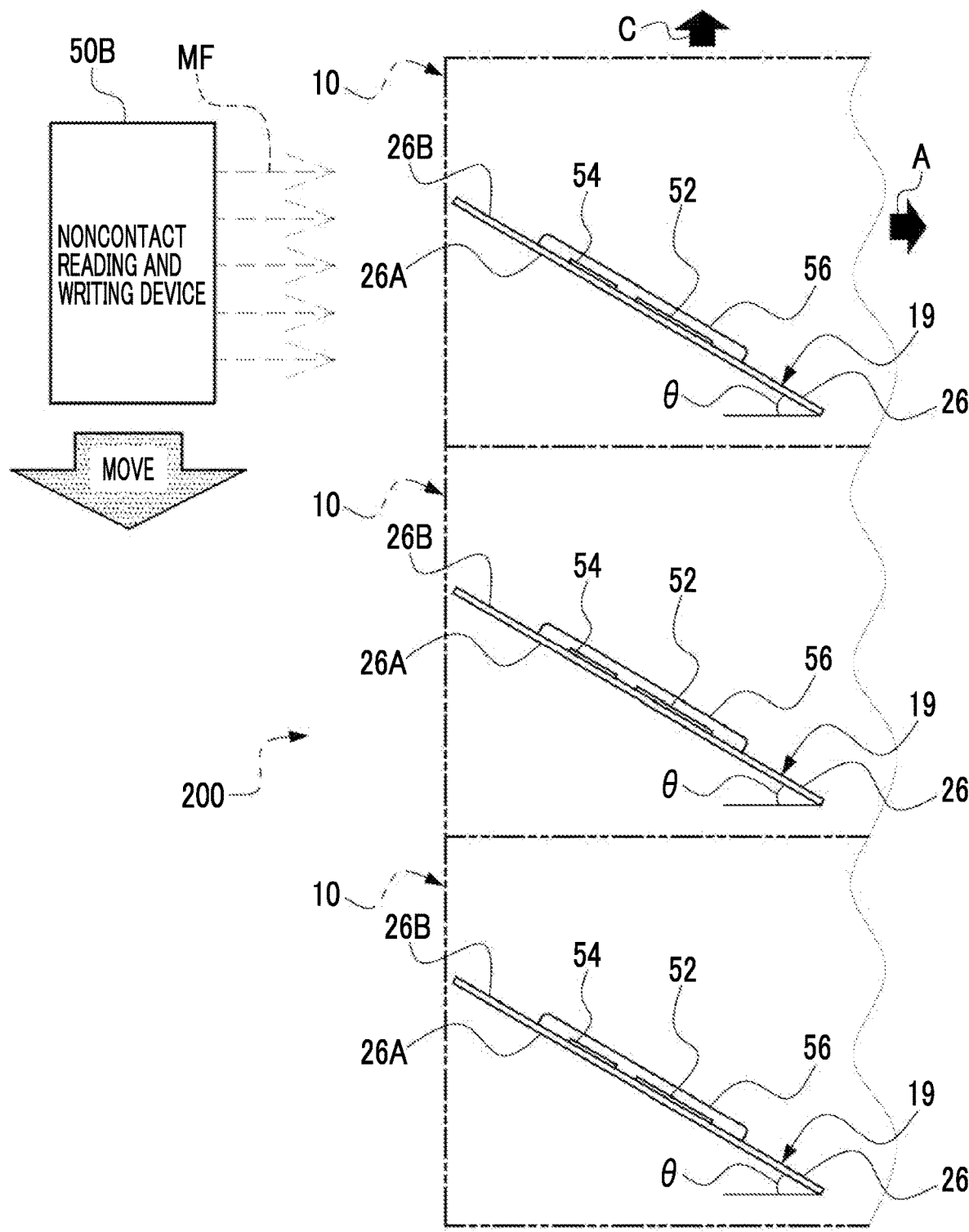
FIG. 36 is a conceptual diagram showing an example of an aspect where a magnetic field is applied to a package of a plurality of magnetic tape cartridges by a noncontact reading and writing device.

In the above-described embodiment, although a form example where the noncontact reading and writing device 50A is mounted in the magnetic tape drive 30 has been shown, the technique of the present disclosure is not limited thereto. In a stage where the magnetic tape cartridge 10 is manufactured, a stage where the magnetic tape cartridge 10 is inspected, a stage where the magnetic tape cartridge 10 is diagnosed, a stage where the production management (for example, the management of a history of the magnetic tape cartridge 10 passing through a plurality of manufacturing steps) of the magnetic tape cartridge 10 is performed, or a stage where the magnetic tape cartridge 10 is shipped, as shown in FIG. 36 as an example, a noncontact reading and writing device 50B is used. In this case, even in a stage where the magnetic tape cartridge 10 is manufactured, a stage where the magnetic tape cartridge 10 is inspected, a stage where the magnetic tape cartridge 10 is diagnosed, a stage where the production management (for example, the management of a history of the magnetic tape cartridge 10 passing through a plurality of manufacturing steps) of the magnetic tape cartridge 10 is performed, or a stage where the magnetic tape cartridge 10 is shipped, the same effects as in the above-described embodiment are obtained.

The noncontact reading and writing device 50B is an example of a "noncontact communication device", a "reader/writer for inspection of a magnetic tape cartridge", a "reader/writer for diagnosis of a magnetic tape cartridge", a "reader/writer for production management of a magnetic tape cartridge", and a "reader/writer that is used for management of a history of a magnetic tape cartridge passing through a plurality of manufacturing steps" according to the technique of the present disclosure, and is, for example, a stationary or portable reader/writer.

In the example shown in FIG. 36, transmission and reception of information are performed between the cartridge memory 19 of each magnetic tape cartridge 10 in a package 200 in which a plurality of magnetic tape cartridges 10 that overlap in an up-down direction are shrunk with a plastic film, and the noncontact reading and writing device 50B. Transmission and reception of information between the cartridge memory 19 and the noncontact reading and writing device 50B are performed while moving the noncontact reading and writing device 50B along a direction in which a plurality of magnetic tape cartridges 10 overlap, on the rear side of the magnetic tape cartridge 10. In this case, for example, the noncontact reading and writing device 50B sequentially emits the magnetic field MF to each of the magnetic tape cartridges 10 while repeating the on and off of the magnetic field MF, thereby performing transmission and reception of information with the cartridge memory 19.

In the above-described embodiment, although the currently set parameter 144 of the currently set parameter storage block 138 is updated such that a plurality of communication standards are selectively set in the noncontact reading and writing device 50A, the technique of the present disclosure is not limited thereto. The CPU 130 of the noncontact reading and writing device 50A may fix a communication standard that is used in communication with the cartridge memory 19, among a plurality of communication standards in response to an instruction given from the outside.

Figure 37:
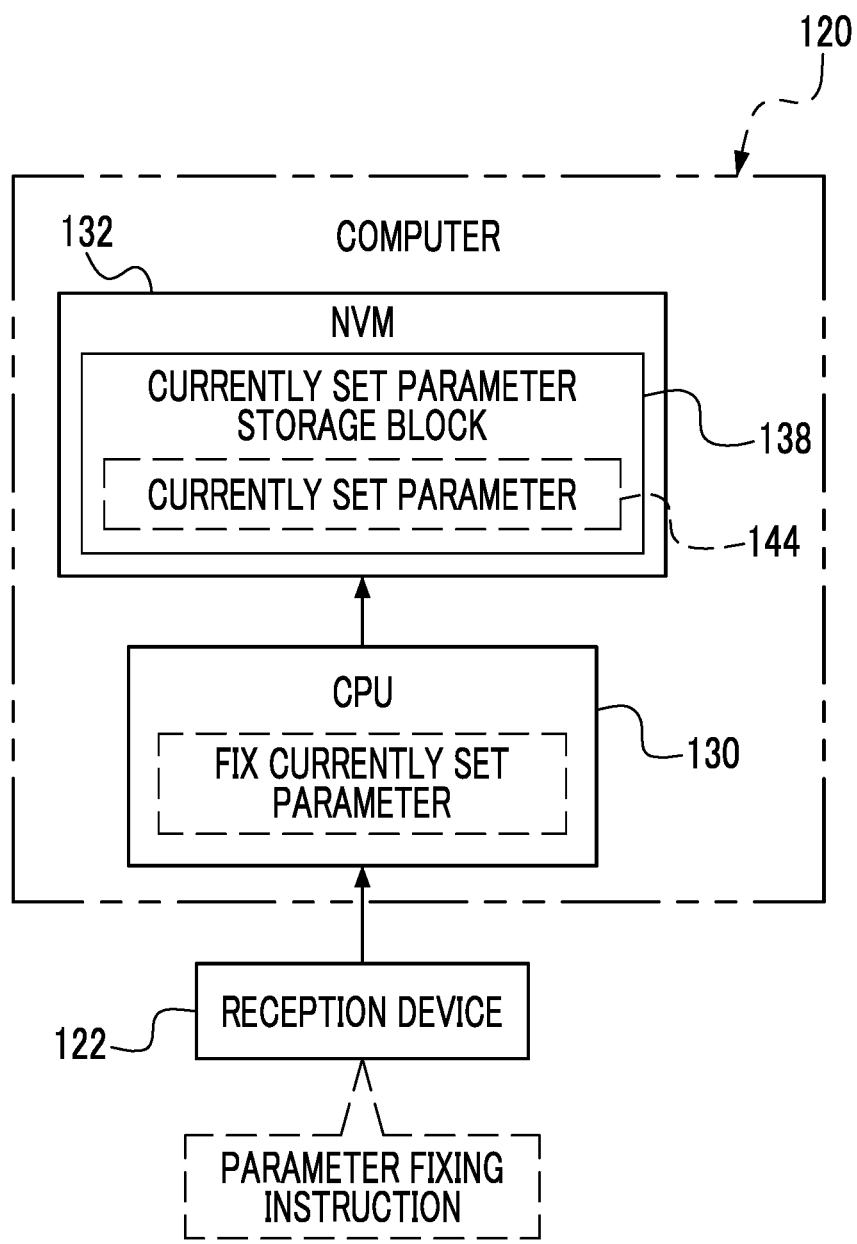
FIG. 37 is a block diagram showing a form example of a case where a currently set parameter 144 is fixed into a currently set parameter storage block 138 in the noncontact reading and writing device.

In this case, for example, as shown in FIG. 37, in a case where an instruction (in an example shown in FIG. 37, "parameter fixing instruction") to fix the currently set parameter 144 is received by the reception device 122, the CPU 130 fixes the currently set parameter 144 into the currently set parameter storage block 138 in response to the parameter fixing instruction (an example of an "instruction given from an outside" according to the technique of the present disclosure) to fix the communication standard set at this moment in an unchangeable state. With this, it is possible to avoid change to a communication standard not intended by the user or the like.

The CPU 130 of the noncontact reading and writing device 50A may give an instruction (communication standard fixing instruction) to fix the communication standard set for the cartridge memory 19 to the cartridge memory 19, so that the currently set parameter 110 of the cartridge memory 19 is fixed into the currently set parameter storage block 104 by the CPU 94 of the cartridge memory 19. In this way, the currently set parameter 110 is fixed into the currently set parameter storage block 104, whereby the communication standard set for the cartridge memory 19 is fixed in an unchangeable state.

At least one of a state in which the currently set parameter 144 of the noncontact reading and writing device 50A is fixed or a state in which the currently set parameter 110 of the cartridge memory 19 is fixed may be released in response to an instruction given from the outside or under a condition determined in advance or the fixed state may be maintained.

A first example of the condition determined in advance is a condition that the intensity of the magnetic field MF falls below a threshold value. In this case, for example, the power that is generated by the power supply circuit 82 may be measured by a power measurement circuit (not shown), and under a condition that the measured power falls below the threshold value, the CPU 130 of the noncontact reading and writing device 50A may release the fixed state of the currently set parameter 144, and the CPU 94 of the cartridge memory 19 may release the fixed state of the currently set parameter 110. On the contrary, under a condition that the measured power is equal to or greater than the threshold value, the CPU 130 of the noncontact reading and writing device 50A may fix the currently set parameter 144 and the CPU 94 of the cartridge memory 19 may fix the currently set parameter 110. The threshold value may be a fixed value or may be a variable value that is changed in response to a given instruction (for example, an instruction received by the reception device 122) or under a condition (for example, an installation place and/or a use status of the noncontact reading and writing device 50A) given in advance.

A second example of the condition determined in advance is a condition that the magnetic tape cartridge 10 enters a stage determined in advance. Examples of the stage determined in advance include a stage where the magnetic tape cartridge 10 is manufactured, a stage where the magnetic tape cartridge 10 is inspected, a stage where the magnetic tape cartridge 10 is diagnosed, a stage where the production management (the management of the history of the magnetic tape cartridge 10 passing through a plurality of manufacturing steps) of the magnetic tape cartridge 10 is performed, a stage where the magnetic tape cartridge 10 is shipped, or a stage where the magnetic tape cartridge 10 is loaded into the magnetic tape drive 30.

Only in a case where a flag (cartridge memory-side fixing flag) is set by the CPU 94 of the cartridge memory 19 in response to an instruction given from the outside, fixing of the communication standard set for the cartridge memory 19 may be permitted, and only in a case where a flag (noncontact reading and writing device-side fixing flag) is set by the CPU 140 of the noncontact reading and writing device 50A in response to an instruction given from the outside, fixing of the communication standard set for the noncontact reading and writing device 50A may be permitted.

Only in a case where a flag (cartridge memory-side release flag) is set by the CPU 94 of the cartridge memory 19 in response to an instruction given from the outside, release of the fixed state of the communication standard set for the cartridge memory 19 may be permitted, and only in a case where a flag (noncontact reading and writing device-side release flag) is set by the CPU 140 of the noncontact reading and writing device 50A in response to an instruction given from the outside, release of the fixed state of the communication standard set for the noncontact reading and writing device 50A may be permitted.

The CPU 130 of the noncontact reading and writing device 50A may differ the intensity of the magnetic field MF for each set communication standard, instead of making the intensity of the magnetic field MF uniform regardless of the communication standard.

Figure 38:
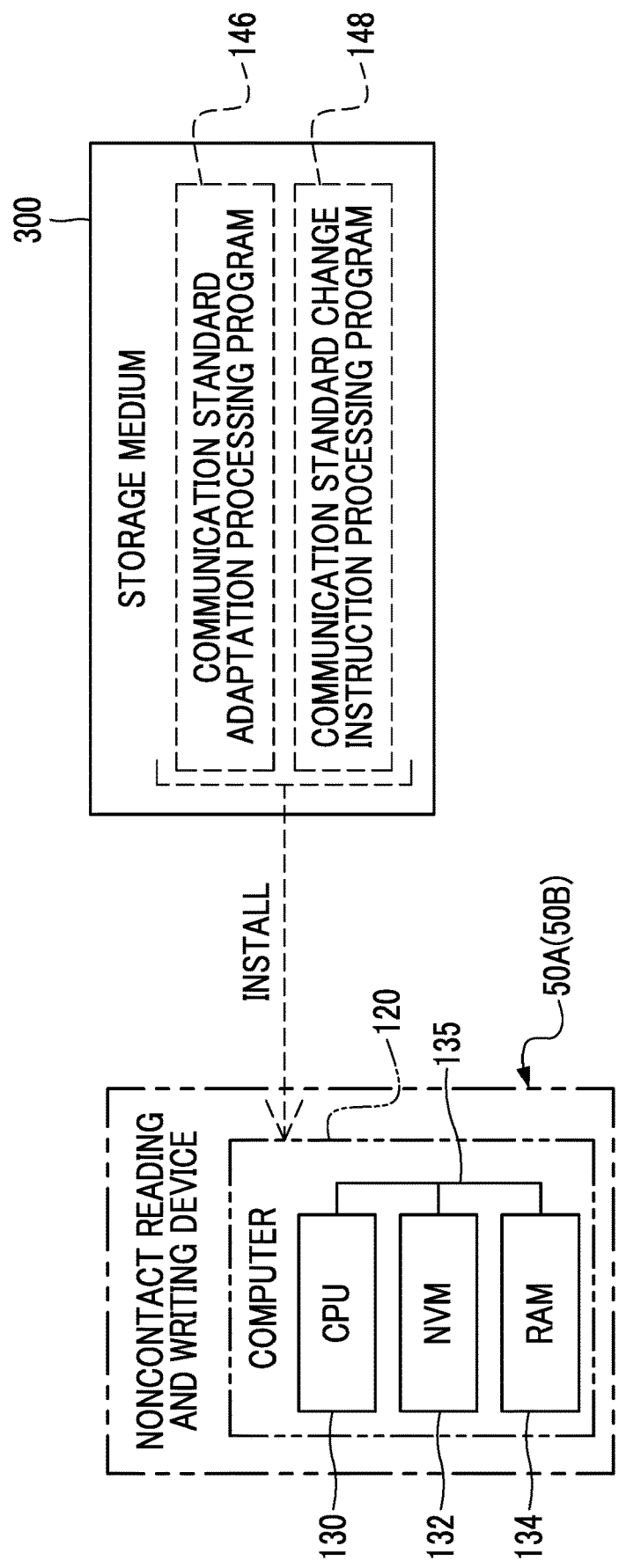
FIG. 38 is a block diagram showing an example of an aspect where the communication standard adaptation processing program and the communication standard change instruction processing program are installed on the computer of the noncontact reading and writing device from a storage medium.

In the above-described embodiment, although a form example where the communication standard adaptation processing program 146 and the communication standard change instruction processing program 148 (hereinafter, referred to as "programs" with no reference numeral in a case where there is no need for distinction therebetween) are stored in the NVM 132 has been described, the technique of the present disclosure is not limited thereto. For example, as shown in FIG. 38, the programs may be stored in a storage medium 300. The storage medium 300 is a non-transitory storage medium. An example of the storage medium 300 is any portable storage medium, such as an SSD or a USB memory.

The programs stored in the storage medium 300 are installed on the computer 120. The CPU 130 executes the communication standard adaptation processing and the communication standard change instruction processing (hereinafter, referred to as "noncontact reading and writing device-side processing" in a case where there is no need for distinction therebetween) following the programs. In an example shown in FIG. 38, the CPU 130 is a single CPU, but may be a plurality of CPUs.

The programs may be stored in a storage device of another computer, a server apparatus, or the like connected to the computer 120 through a communication network (not shown), and the programs may be downloaded in response to a request from the cartridge memory 19 and may be installed on the computer 120.

In the example shown in FIG. 38, although the computer 120 has been illustrated, the technique of the present disclosure is not limited thereto, and a device including an ASIC, an FPGA, and/or a PLD may be applied instead of the computer 120. Alternatively, a combination of a hardware configuration and a software configuration may be used instead of the computer 120.

As the hardware resource that executes the noncontact reading and writing device-side processing, various processors described below can be used. Examples of the processors include a CPU that is a general-use processor executing software, that is, a program to function as a hardware resource that executes the noncontact reading and writing device-side processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor executes the noncontact reading and writing device-side processing using the memory.

The hardware resource that executes the noncontact reading and writing device-side processing may be configured with one of various processors or may be configured with a combination of two or more processors (for example, a combination of a plurality of FPGAs or a combination of a CPU and an FPGA) of the same type or different types. The hardware resource that executes the noncontact reading and writing device-side processing may be one processor.

As an example where the hardware resource is configured with one processor, first, there is a form in which one processor is configured with a combination of one or more CPUs and software, and the processor functions as the hardware resource that executes the noncontact reading and writing device-side processing. Second, as represented by SoC or the like, there is a form in which a processor that realizes all functions of a system including a plurality of hardware resources executing the noncontact reading and writing device-side processing with one IC chip is used. In this way, the noncontact reading and writing device-side processing is realized using one or more of various processors described above as a hardware resource.

In addition, as the hardware structures of various processors, more specifically, an electric circuit into which circuit elements, such as semiconductor elements, are combined can be used. The above-described noncontact reading and writing device-side processing is merely an example. Accordingly, it is needless to say that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A noncontact communication device, comprising:
   an antenna; and
   a processor configured to couple a noncontact storage medium mounted in a magnetic tape cartridge and the antenna by electromagnetic induction to perform communication with the noncontact storage medium,
   wherein the processor is configured to:
   perform communication in each of a plurality of communication standards;
   perform communication with the noncontact storage medium in a communication standard corresponding to the noncontact storage medium among the plurality of communication standards;
   acquire a feature that is physically given to the magnetic tape cartridge and is able to specify a communication standard set for the noncontact storage medium;
   specify a communication standard corresponding to the noncontact storage medium among the plurality of communication standards based on the acquired feature; and
   perform communication with the noncontact storage medium in the specified communication standard, and
   wherein the feature is detected by a physical sensor.

2. The noncontact communication device according to claim 1,
   wherein the feature is a mark that is able to specify the communication standard set for the noncontact storage medium.

3. The noncontact communication device according to claim 1,
   wherein the noncontact communication device is a reader/writer that is mounted in a drive into which the magnetic tape cartridge is loaded.

4. The noncontact communication device according to claim 1,
   wherein the noncontact communication device is a reader/writer for inspection of the magnetic tape cartridge.

5. The noncontact communication device according to claim 1,
   wherein the noncontact communication device is a reader/writer for diagnosis of the magnetic tape cartridge.

6. The noncontact communication device according to claim 1,
   wherein the noncontact communication device is a reader/writer for production management of the magnetic tape cartridge.

7. The noncontact communication device according to claim 6, wherein the reader/writer for production management is a reader/writer that is used for management of a history of the magnetic tape cartridge passing through a plurality of manufacturing steps.

8. The noncontact communication device according to claim 1,
wherein the processor is configured to fix the communication standard used in the communication among the plurality of communication standards in response to an instruction given from an outside.

9. A magnetic tape drive comprising:
the noncontact communication device according to claim 1; and
a magnetic head,
wherein the noncontact storage medium is mounted in a magnetic tape cartridge,
the magnetic tape cartridge accommodates a magnetic tape, and
the magnetic head performs at least one of recording or reading of data with respect to the magnetic tape pulled out from the magnetic tape cartridge.

10. A noncontact communication system comprising:
the noncontact communication device according to claim 1; and
the noncontact storage medium.

11. The noncontact communication device according to claim 1,
wherein the processor is configured to:
specify a communication standard set for the noncontact storage medium among the plurality of communication standards based on a response obtained from the noncontact storage medium with a command for requesting the response to the noncontact storage medium being transmitted to the noncontact storage medium through the antenna; and
perform communication with the noncontact storage medium in the specified communication standard.

12. The noncontact communication device according to claim 11,
wherein the response includes information that is able to specify the communication standard set for the noncontact storage medium.

13. The noncontact communication device according to claim 1,
wherein the processor is configured to perform, in a case where the plurality of communication standards are selectively set for the noncontact storage medium in response to an instruction given from an outside, communication with the noncontact storage medium in a communication standard set for the noncontact storage medium among the plurality of communication standards.

14. The noncontact communication device according to claim 1,
wherein the processor is configured to:
acquire a feature that is physically given to the magnetic tape cartridge and is able to specify a communication standard set for the noncontact storage medium;
specify a communication standard corresponding to the noncontact storage medium among the plurality of communication standards based on the acquired feature; and
perform communication with the noncontact storage medium in the specified communication standard.

15. A noncontact communication device, comprising:
an antenna; and
a processor configured to couple a noncontact storage medium mounted in a magnetic tape cartridge and the antenna by electromagnetic induction to perform communication with the noncontact storage medium,
wherein the processor is configured to:
perform communication in each of a plurality of communication standards;
perform communication with the noncontact storage medium in a communication standard corresponding to the noncontact storage medium among the plurality of communication standards;
acquire a feature that is physically given to the magnetic tape cartridge and is able to specify a communication standard set for the noncontact storage medium;
specify a communication standard corresponding to the noncontact storage medium among the plurality of communication standards based on the acquired feature; and
perform communication with the noncontact storage medium in the specified communication standard, and
wherein the feature is at least a shape between a shape and a size of the magnetic tape cartridge.

16. A method for operating a noncontact communication device including an antenna, and a processor configured to couple a noncontact storage medium mounted in a magnetic tape cartridge and the antenna by electromagnetic induction to perform communication with the noncontact storage medium,
the processor being configured to perform communication in each of a plurality of communication standards,
the method comprising:
dynamically identifying, among the plurality of communication standards, a communication standard corresponding to the noncontact storage medium;
performing communication with the noncontact storage medium in the communication standard corresponding to the noncontact storage medium among the plurality of communication standards;
acquiring a feature that is physically given to the magnetic tape cartridge and is able to specify a communication standard set for the noncontact storage medium;
specifying a communication standard corresponding to the noncontact storage medium among the plurality of communication standards based on the acquired feature; and
performing communication with the noncontact storage medium in the specified communication standard,
wherein the feature is detected by a physical sensor.

17. A non-transitory computer-readable storage medium storing a program executable by a computer, which is applied to a noncontact communication device including an antenna, and a processor configured to couple a noncontact storage medium mounted in a magnetic tape cartridge and the antenna by electromagnetic induction to perform communication with the noncontact storage medium, to perform specific processing,
the processor being configured to perform communication in each of a plurality of communication standards,
the specific processing comprising:
dynamically identifying, among the plurality of communication standards, a communication standard corresponding to the noncontact storage medium;
performing communication with the noncontact storage medium in the communication standard corresponding to the noncontact storage medium among the plurality of communication standards;

acquiring a feature that is physically given to the magnetic tape cartridge and is able to specify a communication standard set for the noncontact storage medium;

specifying a communication standard corresponding to the noncontact storage medium among the plurality of communication standards based on the acquired feature; and performing communication with the noncontact storage medium in the specified communication standard, wherein the feature is detected by a physical sensor.

18. A method for operating a noncontact communication device including an antenna, and a processor configured to couple a noncontact storage medium mounted in a magnetic tape cartridge and the antenna by electromagnetic induction to perform communication with the noncontact storage medium, the processor being configured to perform communication in each of a plurality of communication standards, the method comprising:

performing communication with the noncontact storage medium in a communication standard corresponding to the noncontact storage medium among the plurality of communication standards;

acquiring a feature that is physically given to the magnetic tape cartridge and is able to specify a communication standard set for the noncontact storage medium;

specifying a communication standard corresponding to the noncontact storage medium among the plurality of communication standards based on the acquired feature; and performing communication with the noncontact storage medium in the specified communication standard, wherein the feature is at least a shape between a shape and a size of the magnetic tape cartridge.

19. A non-transitory computer-readable storage medium storing a program executable by a computer, which is applied to a noncontact communication device including an antenna, and a processor configured to couple a noncontact storage medium mounted in a magnetic tape cartridge and the antenna by electromagnetic induction to perform communication with the noncontact storage medium, to perform specific processing, the processor being configured to perform communication in each of a plurality of communication standards, the specific processing comprising:

performing communication with the noncontact storage medium in a communication standard corresponding to the noncontact storage medium among the plurality of communication standards;

acquiring a feature that is physically given to the magnetic tape cartridge and is able to specify a communication standard set for the noncontact storage medium;

specifying a communication standard corresponding to the noncontact storage medium among the plurality of communication standards based on the acquired feature; and performing communication with the noncontact storage medium in the specified communication standard, wherein the feature is at least a shape between a shape and a size of the magnetic tape cartridge.

* * * * *